(12) United States Patent
Kovacich et al.

(10) Patent No.: US 7,193,557 B1
(45) Date of Patent: Mar. 20, 2007

(54) RANDOM SET-BASED CLUSTER TRACKING

(75) Inventors: Michael A Kovacich, Fremont, CA (US); Thomas R Casaletto, Lake Barrington, IL (US)

(73) Assignee: Lockheed Martin Corporation, Bethesda, MD (US)

(*) Notice: Subject to any disclaimer, the term of this patent is extended or adjusted under 35 U.S.C. 154(b) by 205 days.

(21) Appl. No.: 10/835,968

(22) Filed: Apr. 29, 2004

Related U.S. Application Data

(60) Provisional application No. 60/466,817, filed on Apr. 29, 2003.

(51) Int. Cl.
   *G01S 13/66* (2006.01)
(52) U.S. Cl. .................. 342/89; 342/90; 342/95; 342/96; 342/97; 342/107; 342/108; 342/189; 342/195
(58) Field of Classification Search ............. 342/89–99, 342/107, 108, 115, 189, 194, 195
   See application file for complete search history.

(56) References Cited

U.S. PATENT DOCUMENTS

| | | | | |
|---|---|---|---|---|
| 4,891,762 A | * | 1/1990 | Chotiros ................. | 701/223 |
| 5,341,142 A | * | 8/1994 | Reis et al. ............... | 342/64 |
| 5,379,044 A | * | 1/1995 | Carlson et al. ........... | 342/90 |
| 5,381,150 A | * | 1/1995 | Hawkins et al. .......... | 342/13 |
| 5,414,643 A | * | 5/1995 | Blackman et al. ......... | 342/95 |
| 5,626,311 A | * | 5/1997 | Smith et al. ............. | 244/3.16 |
| 5,798,942 A | * | 8/1998 | Danchick et al. .......... | 342/96 |
| 5,947,413 A | * | 9/1999 | Mahalanobis ............. | 244/3.17 |
| 6,229,475 B1 | * | 5/2001 | Woolley ................. | 342/93 |

FOREIGN PATENT DOCUMENTS

| | | | |
|---|---|---|---|
| JP | 2000206236 A | * | 7/2000 |
| JP | 2003130948 A | * | 5/2003 |

OTHER PUBLICATIONS

"An algorithm for tracking multiple targets", Reid, D.; Automatic Control, IEEE Transactions onvol. 24, Issue 6, Dec. 1979 pp. 843-854.*

* cited by examiner

*Primary Examiner*—John B. Sotomayor
(74) *Attorney, Agent, or Firm*—McDermott Will & Emery LLP

(57) ABSTRACT

Tracking objects by receiving a dataframe from a detection sensor device, the dataframe containing a timestamp and data corresponding to each detected object, generating new observation nodes for each detected object, propagating group track state parameters to obtain posterior observable positions and projecting them onto the received dataframe, generating gates for the posterior observable positions and projecting them onto the received dataframe, determining feasible track node and feasible observation node assignments based on the proximity of the new observation nodes to the gates, updating track node state parameters and corresponding scores, performing a multi-frame resolution algorithm to resolve group track nodes into subtrack nodes, determining a set of feasible composite assignments for composite sets of track nodes and observation nodes, updating track node state parameters and corresponding scores, and determining a selected set of joint assignments based on the feasible composite assignments and their respective scores.

35 Claims, 16 Drawing Sheets

FALSE ALARM

NEW TRACK

MISS

SINGLETON

MERGE

SHARED

SPAWN

PATTERN

CLUSTER

RANDOM SET-BASED CLUSTER TRACKING

CROSS-REFERENCES AND RELATED APPLICATIONS

This application claims priority to U.S. Provisional Application No. 60/466,817, filed on Apr. 29, 2003, and entitled "RANDOM SET-BASED CLUSTER TRACKING", which is herein incorporated by reference in its entirety for all purposes.

STATEMENT AS TO RIGHTS TO INVENTIONS MADE UNDER FEDERALLY SPONSORED RESEARCH OR DEVELOPMENT

NOT APPLICABLE TO THIS INVENTION.

BACKGROUND OF THE INVENTION

1. Field of the Invention

The present invention concerns a method and system for tracking clusters of objects based on a random set-based algorithm. More specifically the invention concerns performing random-set based cluster tracking of observable objects in a system having a plurality of detection sensor devices and a tracking processor unit, wherein a group of random objects (cluster) is tracked by utilizing group tracks, each group track having multiple tracks assigned to it for tracking multiple objects. A set of state parameters are maintained for the group track and when a new dataframe is received from one of the detection sensor devices, the state parameters are propagated forward in time to correspond to time of the dataframe measurements, and the propagated results are used to determine all feasible object and track assignments for the measured objects in the dataframe. Each group track is analyzed to resolve it into subtracks, if possible, and a joint assignment problem is solved to select the best set of track assignments.

2. Description of the Related Art

Tracking systems are used in a variety of capacities. In one use, tracking systems are used for monitoring airspace and space over a given geographic region of the earth for the presence of ballistic objects, such as missiles and missile warheads, and also space-borne objects, such as satellites. Such known systems can be implemented on multiple aircraft or satellites in a distributed fashion so as to provide sufficient tracking coverage over the given geographic region.

It can be appreciated that such tracking systems must be reliable and reasonably accurate in order to be of value when used for purposes such as national defense against a missile attack. In known systems, multiple platforms, such as satellites, are positioned in orbit, wherein each satellite has one or more sensors onboard which are directed at the desired portion of earth. When a sensor detects an object within its field of view, data is generated corresponding to the position of the object with respect to the sensor. Typically, the position data from all sensors in the tracking system is processed on a frequent basis, either by a common processor on a satellite or on earth, or by several processors distributed among the satellites. The path of the tracked object, as well as other pertinent information about the object, can then be used in a monitoring system, and/or provided to an anti-missile system which can attempt to destroy the object.

Many known tracking systems are designed to track a single type of object by positively identifying the object on a constant basis, and then tracking its movement by comparing location data of the object from one sensor reading to the next. These systems can be inadequate in a missile tracking system, because missiles can have the capability to release large numbers of decoy objects in addition to warheads, in an effort to confuse the defensive tracking system. Such decoys include balloons, chaff, and other clutter which can be released in large numbers at once to form clusters. In addition, a group of warheads may be released at the same time in a cluster. In such situations, known tracking systems may become unable to distinguish between the objects in the cluster, and are then unable to determine a track for each object from one sensor reading to the next.

Some existing tracking systems implement tracking methods which attempt to track clusters of objects based on the location information provided by the sensors, however the sensor location information can vary in quality from one sensor to the next. This is because each sensor may have a different resolution level due to the individual sensor characteristics, and due to the relative position of the sensor to the object being measured. Accordingly, object location data that shows up in one sensor reading may not appear in the next sensor reading, thereby resulting in an inability to track the objects in the cluster. In addition, known tracking systems are not believed to address the random nature of the relative movement of the objects within a cluster, whereby some objects may appear as one for a while, and whereby some objects may appear as two separate objects, from one sensor reading to the next. The aforementioned problems result in inadequate tracking of the objects in the cluster, thereby leading to an inadequate tracking of the objects of interest, such as warheads, for example.

SUMMARY OF THE INVENTION

The present invention solves the foregoing problems by providing a random-set based cluster tracking method for the tracking of observable objects in a system having a plurality of detection sensor devices and a tracking processor unit, wherein a group of random objects (cluster) is tracked by utilizing group tracks, each group track having multiple tracks assigned to it for tracking multiple objects. A set of state parameters is maintained for the group track and when a new dataframe is received from one of the detection sensor devices, the state parameters are propagated forward in time to correspond to the time of the dataframe measurements, and the propagated results are used to determine all feasible object and track assignments for the measured objects in the dataframe. Each group track is analyzed in an attempt to further resolve it into subtracks, if possible, and a joint assignment problem is solved to select the best set of observation node and track node assignments, based on probability scores for the feasible object and track assignments.

Specifically, according to one aspect of the invention, random-set based cluster tracking of observable objects is performed in a system having a plurality of detection sensor devices, each of which generates a series of dataframes, and a tracking processor unit which receives dataframes from one or more of the detection sensor devices. The invention includes receiving a dataframe from one of the detection sensor devices, the dataframe including a timestamp, and location data and amplitude data corresponding to each detected observable object in the dataframe, generating a new observation node for each observable object location data contained in the received dataframe, propagating forward, to a time value of the timestamp, a set of state parameters of a group track node to obtain a set of posterior observable positions, a plurality of previously-generated track nodes being assigned to the group track node, and projecting the posterior observable positions onto a field of regard of the received dataframe. Gates are generated for each posterior observable position and then projected over each respective posterior observable position on the received dataframe, a set of feasible track assignments are determined for the dataframe which correlate each one of a plurality of new track nodes to at least one of the new observation nodes based on the proximity of each new observation node to at least one of the gates over the posterior observable positions, a set of state parameters for each track node assigned to the group track node is updated based on the determined set of feasible track assignments, and a probability score is generated for the feasible track assignments.

The aforementioned aspect of the invention further includes determining a set of feasible observation assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments. A set of feasible composite assignments is determined for a composite set of track nodes and observation nodes which correspond to at least the received dataframe, a set of state parameters is updated for each track node assigned to the group track node based on the determined set of feasible composite assignments, and a probability score is generated for each feasible composite assignment based on the probability scores for the feasible track assignments and the feasible observation assignments corresponding to the track nodes and observation nodes in the composite set. A set of joint assignments is determined based on the set of feasible composite assignments and their respective probability scores by using a loss minimization algorithm and a set of constraints, the selected set of joint assignments including at least one of the feasible composite assignments.

Preferably, the invention further includes the use of a multi-frame resolution algorithm which further resolves each group track node into subtracks, when possible. Also, after determination of the set of joint assignments, the tracks are preferably pruned by deleting tracks having a below-marginal probability score in accordance with a loss minimization algorithm. The group track set of state parameters is updated by determining a new group track extent and new group track centroid based on the dataframe information, and probability scores are determined for the group track extent and group track centroid. In one aspect of the invention, the group track extent and the group track centroid, and their respective scores, are determined based on both location and amplitude information for each measured object in the dataframe. In another aspect, each dataframe preferably contains information from an infrared sensor and information from a radio frequency sensor, and both sets of information are used to determine the group track extent and the group track centroid, and their respective scores.

In this manner, the present invention tracks groups of objects in a coordinated fashion by maintaining estimates of state parameters for each group, including a centroid, a three-dimensional extent and an object count probability distribution. The group state parameters are used to better determine a set of joint assignments for all measured observables to tracks, and for all relationships among tracks. In addition, the signal strength of each measured object, in addition to location information, is used to estimate the state parameters of the group track, thereby making full use of the resolution capabilities of the detection sensors. The multi-frame resolution capability of the invention provides a further level of resolution of tracking by constantly attempting to resolve group tracks into viable subtracks. The foregoing features result in a more accurate tracking system which more quickly and accurately resolves the tracking of objects which are clustered in groups.

This brief summary has been provided so that the nature of the invention may be understood quickly. A more complete understanding of the invention can be obtained by reference to the following detailed description thereof in connection with the attached drawings.

DETAILED DESCRIPTION

As mentioned above, the present invention is generally directed to a random-set based cluster tracking method for the tracking of objects in a system having a plurality of detection sensor devices and a tracking processor unit, wherein groups of random objects (cluster) are tracked by utilizing group tracks. The tracking method of the present invention can be implemented in many different environments to track clusters of objects for many different purposes. Accordingly, although the invention is describe below in an embodiment in which the method is implemented in a missile defense system, it can be appreciated that the method can be used in many other settings and applications without departing from the spirit of the invention.

Figure 1:
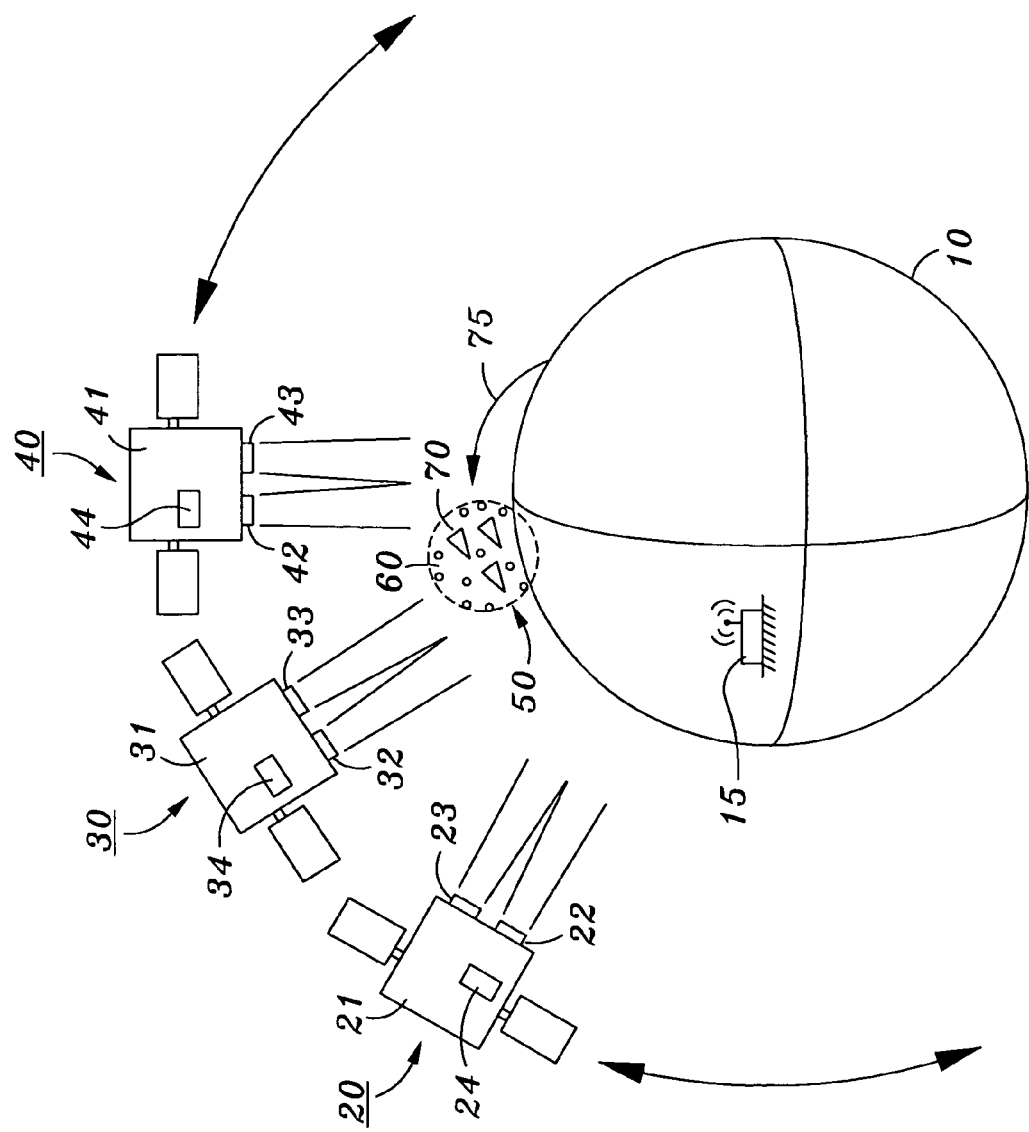
FIG. 1 depicts a space-based missile defense environment implementing the tracking method of the present invention according to one embodiment of the invention.

Turning to the drawings, FIG. 1 shows a space-based missile defense environment in which the tracking method of the present invention can be implemented. Specifically, FIG. 1 shows multiple satellites in orbit in a distributed fashion, each satellite having onboard detection sensors. FIG. 1 shows earth 10, and satellites 20, 30 and 40 in orbit above earth 10. Earthbound tracking processor 15 is provided to receive data from the satellites and then perform tracking according to the present invention. In the alternative, the processing necessary to implement the present invention can be distributed among one or more of processors 24, 34, and 44 which are onboard satellites 20, 30 and 40, respectively. In this regard, satellites 20, 30 and 40 can communicate between each other and can communicate with earthbound tracking processor 15 according to known communication methods and links.

As seen on FIG. 1, each of satellites has a platform, a processor unit, and two detection sensor devices. For example, satellite 20 has detection sensors 22 and 23 positioned onboard platform 21, each detection sensor facing toward the earth and having a specific field of regard and resolution capability. Preferably, detection sensors 22 and 23 are of different types in order to provide more robust detection capability of objects. In the embodiment discussed herein, the two sensors on each satellite are an infrared (IR) detection sensor and a radio-frequency (RF) detection sensor; Processor unit 24 is used to process the signals generated by detection sensors 22 and 23, and to determine location, amplitude, and other data related to objects detected by the sensors at a particular time. The data is then arranged in a dataframe, along with a timestamp, sensor resolution and sensor position data, among other data. Each satellite sends the dataframes it generates to a tracking processor unit which, as mentioned above, can be earthbound tracking processor 15 or can be distributed among one or more of processors 24, 34 and 44.

Also shown in FIG. 1 is cluster 50 which is generally traveling along trajectory 75. Cluster 50 represents a group of objects which generally travel along trajectory 75, but which have a degree of randomness regarding their movements relative to each other. In the depiction of FIG. 1, cluster 50 is represented as a cluster of objects released from a missile and includes warheads 70 and numerous other objects 60 which are often referred to as clutter. Clutter 60 can be comprised of decoys, such as balloons and chaff, or of debris from the missile, or other missiles, after being hit with anti-missile weapons. The present invention provides random set-based cluster tracking which tracks one or more clusters and continuously resolves the track of each cluster into subtracks in order to track each object in the cluster.

Figure 2:
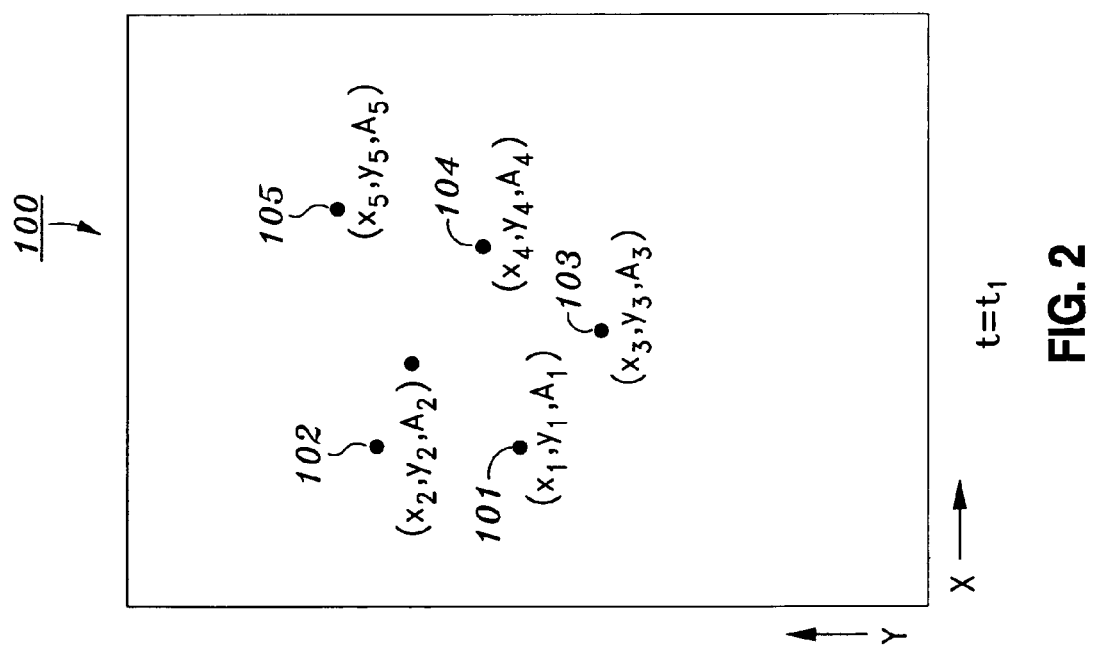
FIG. 2 is a schematic drawing depicting location and amplitude data corresponding to objects measured by a sensor for a dataframe according to one embodiment of the invention.

FIG. 2 graphically depicts location and amplitude data corresponding to objects which have been measured by a detection sensor for a dataframe. As seen in FIG. 2, dataframe 100 of location data is depicted as a rectangle which represents the field of view of the particular detection sensor. Dataframe 100 includes five sets of measurements corresponding to five observable objects 101 to 105, hereinafter referred to as observables, which have been detected by the detection sensor, such as sensor 22 of satellite 20, at time t1. Each object measurement set includes location data and an amplitude measurement corresponding to the measured observable. For example, observable 101 has x1 and y1 for measured location data in the coordinate system of the detection sensor which measured observable 101. Also, observable 101 has amplitude A1 which represents the signal strength of the measurement signal from the detection sensor that measured observable 101. As explained later, the amplitude of an observable is used in the present invention as a state variable in order to more accurately track the objects in a cluster. Dataframe 100 therefore provides a location and amplitude snapshot from a given sensor at a specific time. By comparing location data and amplitude data in each dataframe received from each sensor, the present invention determines group tracks which are resolved into subtracks and eventually into tracks which correspond to each observable.

Figure 3:
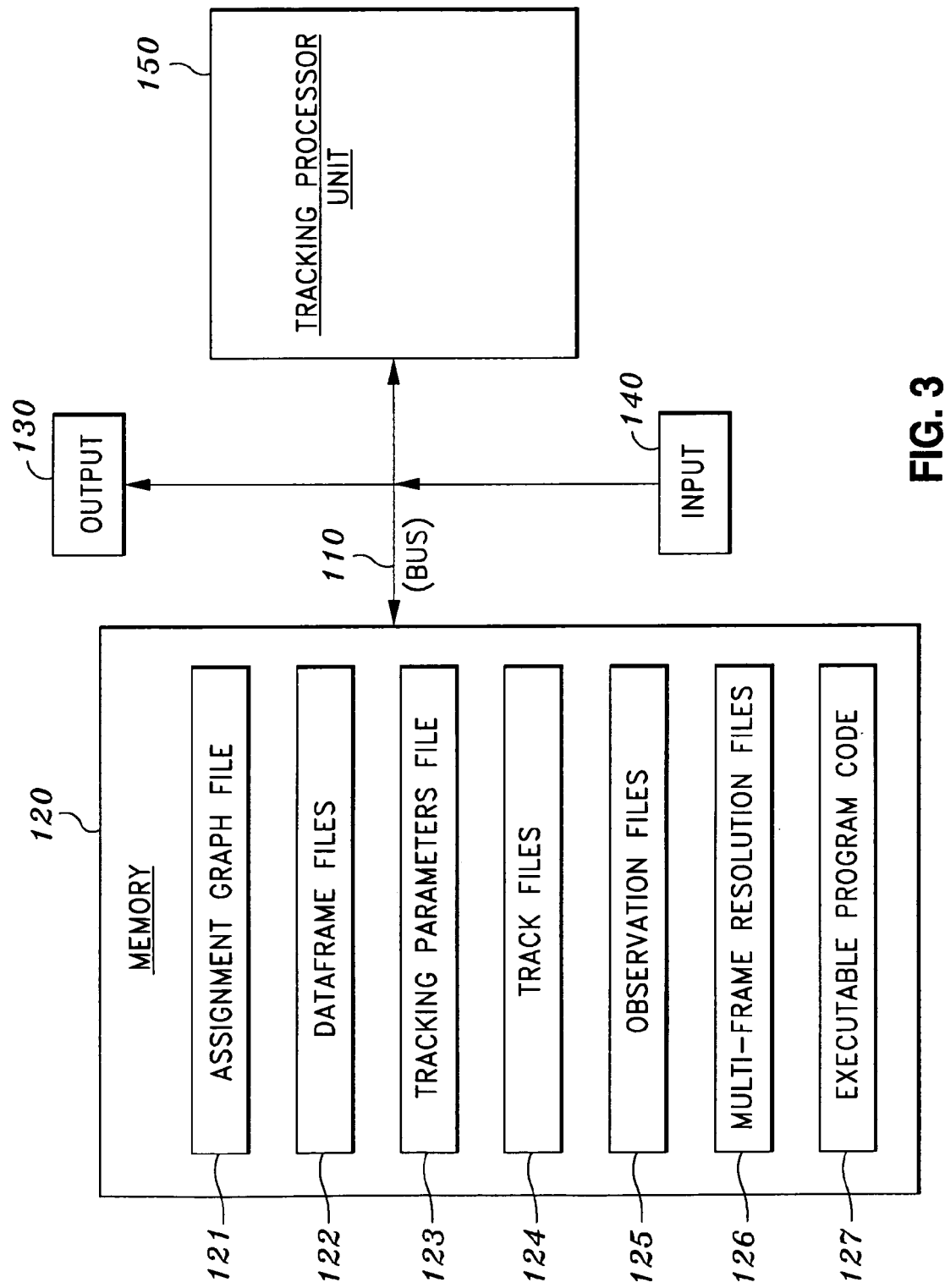
FIG. 3 depicts a tracking processor and a memory for implementing the tracking method according to one embodiment of the invention.

FIG. 3 depicts a tracking processor and a memory for implementing the tracking method of the present invention in one embodiment of the invention. As seen in FIG. 3, bus 110, memory 120, output 130, input 140 and tracking processor unit 150 are provided. As mentioned above, the tracking processing for implementing the present invention may be performed on an earthbound station 15 or on one or more of satellites 20, 30 and 40. Accordingly, the components depicted in FIG. 3 may alternatively provided in earthbound station 15, or on one or more of satellites 20, 30 and 40, for implementing the present invention.

Bus 110 is a data bus for moving data, including executable program code, between memory 120 and tracking processor unit 150. Memory 120 is a known type of memory for storing data and executable code, either temporarily or on a permanent basis. Tracking processor unit 150 is a known type of processor for performing a sufficiently large number of calculations per second in order to implement the present invention. Output 130 is connected to bus 110 and is used to output tracking results from tracking processor unit 150 and memory 120. The results may be output to a missile monitoring system, to an anti-missile weapons system, or to some other system or device. Input 140 is also connected to bus 110 and is used to input data, such as dataframes from detection sensors, to memory 120 and tracking processor unit 150. It can be appreciated that computing environments other than that shown in FIG. 3 can also be used to implement the tracking method of the present invention.

Returning to FIG. 3, memory 120 is seen to store several items, including assignment graph file 121, dataframe files 122, tracking parameters file 123, track files 124, observation files 125, multi-frame resolution files 126 and executable program code 127. Each of these items are instrumental in the implementation of the tracking method of the present invention and are explained in more detail further herein. Of course it can be appreciated that memory 120 contains other files and data necessary to implement the invention as well as any other operations which are executed by tracking processor unit 150. Assignment graph file 121 is a data file which represents the ongoing data association and resolution problem for associating possible relationships of observed objects and their tracks from one dataframe to the next, and then resolving all possible relationships into a selected set of relationships.

Dataframe files 122 are dataframes received from the detection sensors. Each of dataframe files 122 contain zero or more measured observables, and it is assumed that if a target is in the field of regard (viewable region) of the detection sensor then at most one observable is measured in and reported in the dataframe for the detection sensor. Tracking parameters file 123 contains data required for implementing the tracking method and includes a set of estimated inter-sensor biases, algorithm thresholds and available resource information. Track files 124 contains track data for all track nodes created and maintained by the tracking method, and the track data for each track node includes a track ID, track state estimates, track objectives, track objective value, track existence value, and track genealogy. Observation files 125 contains data for all observation nodes created and maintained by the tracking method based on the observable data in the received dataframes, and the observation node data for each observation node includes an observation node ID, and observation node geneology, among other related data.

Multi-frame resolution files 126 contain the data structures necessary for implementing a multi-frame resolution algorithm as part of the overall tracking method according to the present invention. The multi-frame resolution algorithm constantly attempts to resolve group tracks into viable subtracks for more refined tracking of individual objects, with the ultimate goal of having a track assigned for each observable object in a cluster of objects. The multi-frame resolution algorithm is explained further herein. Executable program code 127 contains the executable program steps for implementing the tracking method of the present invention. These steps are explained further herein.

In general, as mentioned above, the goal of the tracking method is to continuously receive dataframes from the detection sensors on the satellites, assign all possible relationships between the observed objects from one dataframe to the next, and then resolve all possible relationships into a selected set of relationships. The relationships between observation nodes from one dataframe to the next are represented by track nodes, and the movement of an observable from one dataframe to the next is tracked through the use of a new track node representing a track segment. These relationships between track nodes and observation nodes as they change over time from one dataframe to the next are temporal relationships. The tracking method of the present invention also utilizes relationships between track nodes and observation nodes that represent different abstract levels of resolution, such as parent/child relationships for a group track node that has been resolved into multiple subtrack nodes.

Because the tracking method starts with the observable information in the dataframes from the detection sensors, the tracking method must consider all feasible variations of assigned relationships between observation nodes and track nodes, and then decide which set of feasible assigned relationships most likely represents the actual truth of the trajectory tracks of the objects observed by the sensors. Accordingly, the relationships between nodes can be AND relationships or OR relationships. For example, if a feasible track node for a current dataframe is one of two possible track nodes in the current dataframe that each represent a possible continuation of a track node from a previous dataframe, then the two possible track nodes of the current dataframe are in an OR relationship with the previous track node. In the alternative, if the a feasible track node for a current dataframe is one of two possible track nodes in the current dataframe that together represent a split of the track node from the previous dataframe, then the two possible track nodes of the current dataframe are in an AND relationship with the previous track node. Accordingly, the present invention uses different types of observation nodes and track nodes to indicate their relationships to other observation nodes and track nodes, either in the temporal or resolution dimension.

As mentioned above, observation nodes and track nodes are used in the present invention to represent the measured observables and their possible assigned tracks. In addition, scene nodes are used to provide a snapshot for each dataframe of all feasible relationships between the feasible track nodes and the feasible observation nodes generated for the dataframe. Accordingly, the possible relationships, both temporal and resolution, that are generated based on measured observable data in a given dataframe can be represented in different types of domains, including an observation domain, a track domain, and a scene domain. The track domain is consists of the track nodes, which represent the tracks, and has a temporal dimension and a resolution dimension. Linkages (assigned relationships) in the temporal dimension are defined as predecessor/successor relationships, and linkages in the resolution dimension are defined as parent/child relationships.

The observation domain consists of the observation (observation) nodes, which represent the measured observable data received in each dataframe. The observation domain is partitioned into independent dataframes, and, on a given dataframe, the observation nodes have a resolution dimension represented by an AND/OR tree. Temporal relationships between observation nodes, such as a relationship between a predecessor observation node from a previous dataframe and a successor observation node in the current dataframe, both of which are believed to represent the same detected object, are assigned and maintained as a track nodes. The scene domain consists of the scene nodes, which represent the joint assignment problems and sub-problems for deciding which set of feasible assignments for observation nodes (observation domain) and track nodes (track domain) for a given dataframe most likely represents the truth. The scene domain has a temporal dimension and a resolution dimension, where linkages in the temporal dimension are defined as predecessor/successor relationships, and linkages in the resolution dimension are defined as parent/child relationships. The structure in the scene domain on a given dataframe is an AND tree. The types of nodes, and their respective relationships, in each of these domains are now explained in more detail below.

The types of possible observation nodes in the observation domain are now explained. In general, an observation node is a type of assignment graph (AG) node that represents an observable, or multiple observables, that have been measured by a detection sensor on a given dataframe. In general, an can be an Object Observation Node, a Group/Cluster Observation Node, a Formation Observation Node or an Aggregate Observation Node. The observation nodes can be further defined in terms of whether or not the observation contains child observation nodes. Observation nodes with children are defined as Summation Observation Nodes, and can be of two types: Group/Cluster Observation Nodes or Aggregate Observation Nodes. Observation nodes without children are defined as Simple Observation Nodes.

Figure 4:
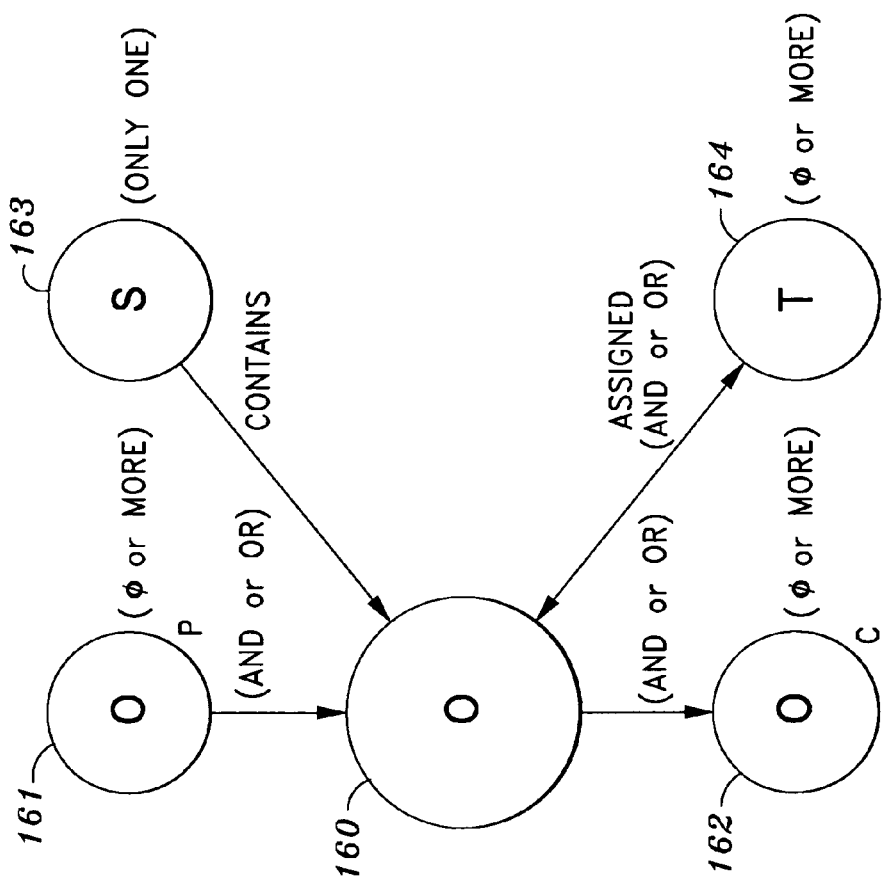
FIG. 4 is a basic schematic for explaining observation node relationships according to one embodiment of the invention.

FIG. 4 depicts the relationships of, and types of, observation nodes used in the present invention. As seen in FIG. 4, current observation node 160 can be in relationship with other observation nodes, with track nodes and with a scene node. Specifically, observation node 160 is seen to have possible relationships with zero or more parent observation nodes 161 and with zero or more child observation nodes 162 in the resolution dimension. The relationship between observation node 160 and parent observation nodes 161 can be an AND or an OR relationship. The relationship between observation node 160 and child observation nodes 162 can be an AND or an OR relationship. Observation node 160 can only be assigned to one scene node, which references the total domain of the current dataframe. Lastly, observation node 160 is assigned to zero or more track nodes 164 in an AND or an OR relationship.

In this manner, parent/child relationships explain how a group observation node is further resolved into one or more observation nodes, each of which directly reference an observable object. As for the other observation node types, a Summation Observation Node is an observation node that has children observation nodes, a Simple Observation Node is an observation node that has no children observation nodes, a Group/Cluster Observation Node is a Summation Observation Node that has AND children which are not cross correlated, a Formation Observation Node is a Summation Observation Node that has AND children which are cross correlated, and an Aggregate Observation Node is an Summation Observation Node that has OR children.

The types of possible track nodes in the track domain are now explained. In general, a track node is a type of assignment graph (AG) node that references a track and is used to support the association and resolution process in the tracking model. Each track node exists on a specified dataframe and at a certain level of resolution, is associated with zero or more observation nodes and is contained in a single scene node. A track node can be an Object Track, a Group Track, a Formation Track, a Cluster Track or an Aggregate Track. The tracks can further be defined in terms of whether or not they have track children. Track nodes with track children are defined as Summation Track Nodes, and can be of two types: Cluster Tracks or Aggregate Tracks. Track nodes without track children are defined as Simple Track Nodes.

Figure 5A:
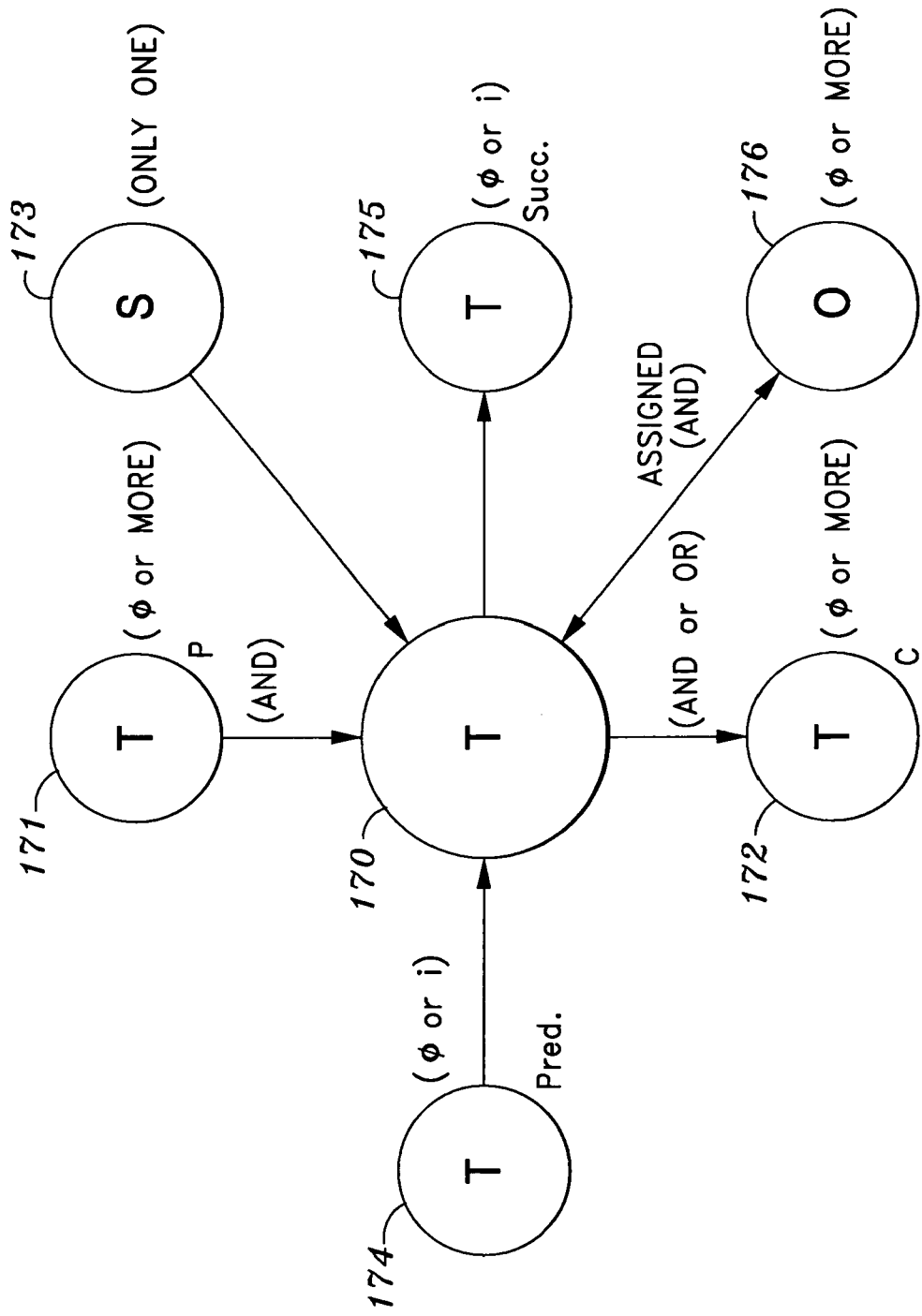
FIGS. 5A and 5B are basic schematic drawings for explaining track node relationships according to one embodiment of the invention.

FIG. 5A depicts the relationships of, and types of, track nodes used in the present invention. As seen in FIG. 5A, current track node 170 can be in relationship with other track nodes, with zero or more observation node nodes and with a scene node. Specifically, track node 170 is seen to have possible relationships with zero or more parent track nodes 171 and with zero or more child track nodes 172 in the resolution dimension. The relationship between track node 170 and parent track nodes 171 can be an AND relationship. The relationship between track node 170 and child track nodes 172 can be an AND or an OR relationship. Similarly, in the temporal dimension, track node 170 is seen to have possible relationships with zero or one predecessor track node 174 and with zero or more successor track node 175. Track node 170 can only be assigned to one scene node 173, which references the total domain of the current dataframe. Lastly, track node 170 can be assigned to zero or more observation nodes 176 in an AND relationship.

More specifically, a track predecessor node is a track node on a prior dataframe which may or may not be from the same sensor. If no track predecessor node exists, then the current track node is defined to be a temporal root. A track successor node is a track node on the next dataframe, which may or may not be from the same sensor. If no track successor node exists, then the track node is the last node in a sequence, and is defined to be a temporal, leaf. As for track parent nodes, the usual case is that a track node has one track parent node, but in the case of a merge, there may be multiple track parent nodes. If the track node has multiple track node parents, they are considered AND parents. There are no OR track node parents. If there are zero track node parents, then this track node is defined to be a resolution root. Similarly, as for track children nodes, there are two types of track children nodes: (1) AND track children nodes; and (2) OR track children nodes. The interpretation of AND track children nodes for a track node is that the track children nodes are all contained in the track node, and the track node is defined to be a cluster track or formation track. The interpretation of OR track children nodes for a track node is that the track children nodes are alternative extensions for the track node. A track node with OR track children nodes is defined to be a split track node. If there are zero track children nodes, then this track node is defined to be a resolution leaf.

In this manner, parent/child track node relationships explain how a group track node is further resolved into one or more track nodes. Similarly, predecessor/successor track node relationships represent continuation track segments of a previous track node. As for the other track node types, a Summation Track Node has children track nodes, a Simple Track Node does not have children track nodes, an Object Track Node is a Simple Track Node with zero or more observations assigned on each dataframe, a Group Track Node is a Simple Track Node with at least one frame in which multiple observations are assigned, a Cluster Track Node is a Summation Track Node that has AND children which are not cross correlated, a Formation Tack Node is a Cluster Track Node that has AND children which are cross correlated, and an Aggregate Track Node is a Summation Track Node that has OR children.

Figure 5B:
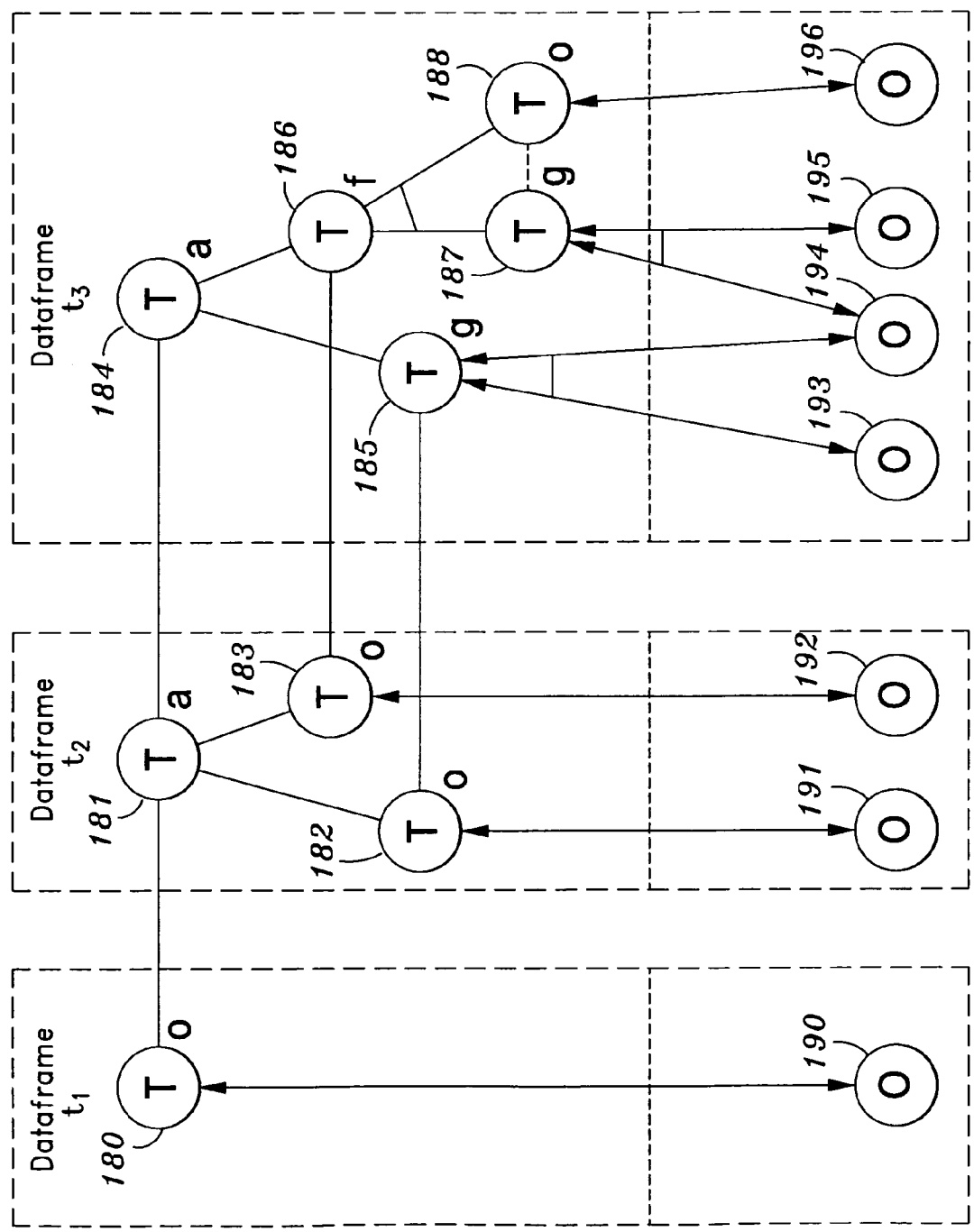

FIG. 5B depicts a progression of the track nodes in a track domain over a series of three dataframes. As seen in the initial dataframe for t1, only one observation node 190 is provided based on the measured observable data in the dataframe. Accordingly, object track node 180 is assigned to represent the path of observation node 180. In the next dataframe t2, two observation nodes 191 and 192 are provided, and so track node 180 from dataframe t1 now corresponds, and is the predecessor of, aggregate track node 181 in dataframe t2. This, is because it is unclear which of observation nodes 191 and 192 are a continuation of track node 180 from dataframe t1. So, observation nodes 191 and 192 are assigned to object track nodes 182 and 183, respectively, which are OR children track nodes of aggregate track node 181.

Next, in dataframe t3 of FIG. 5B, four observation nodes 193 to 196 are provided, and so all possible track node assignments must be determined for them. In this regard, aggregate track node 181 from dataframe t2 is the predecessor of aggregate track node 184 in dataframe t3. Under aggregate track node 184 are two children track nodes, which are group track node 185 and formation track node 186. Group track node 185 is assigned to observation nodes 193 and 194. Formation track node 186 has two children track nodes in a correlated AND relationship, which are group track node 187 and object track node 188. Group track node 187 is assigned to observation nodes 193 and 194 in an AND relationship. Object track node 188 is assigned to observation node 196. It can be seen that formation track node 186 is a successor of object track node 183 form dataframe t2, and is now spawned into two child tracks, group track node 187 and object track node 188. So, the track domain (track tree) for each dataframe depicts all possible assignments of observation nodes to track nodes, and among all possible track nodes.

Figure 6:
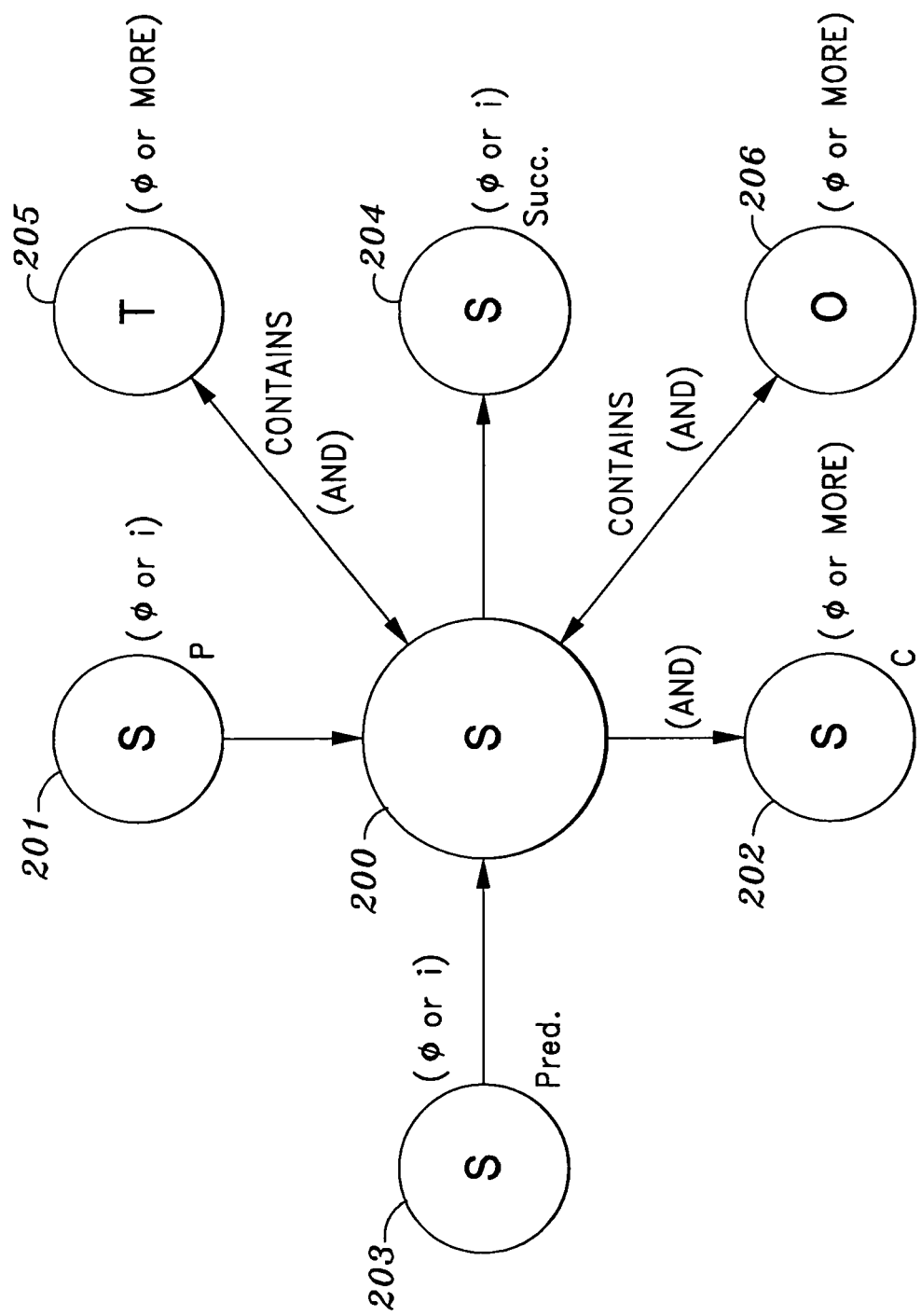
FIG. 6 is a basic schematic for explaining scene node relationships according to one embodiment of the invention.

The scene node is now explained. In general, a scene node is a type of assignment graph (AG) node that references a dataframe and the associated set of track nodes (track domain) and corresponding set of observation nodes (observation domain). FIG. 6 depicts the relationships of, and types of, scene nodes used in the present invention. As seen in FIG. 6, current scene node 200 can be in relationship with other track nodes, with zero or more observation node nodes and with zero or more track nodes. Specifically, scene node 200 is seen to have possible relationships with zero or more parent scene nodes 201 and with zero or more child scene nodes 202 in the resolution dimension. The relationship between scene node 200 and child scene nodes 202 can be an AND relationship. Similarly, in the temporal dimension, scene node 200 is seen to have possible relationships with zero or one predecessor scene node 203 and with zero or more successor scene node 204. Scene node 200 can be assigned to zero or more track nodes in an AND relationship. Lastly, scene node 200 can be assigned to zero or more observation nodes 206 in an AND relationship. In this manner, parent/child track node relationships explain how a group scene node is further resolved into one or more scene nodes. Similarly, predecessor/successor scene node relationships represent relationships with past and future scene nodes from other dataframes.

Figure 7:
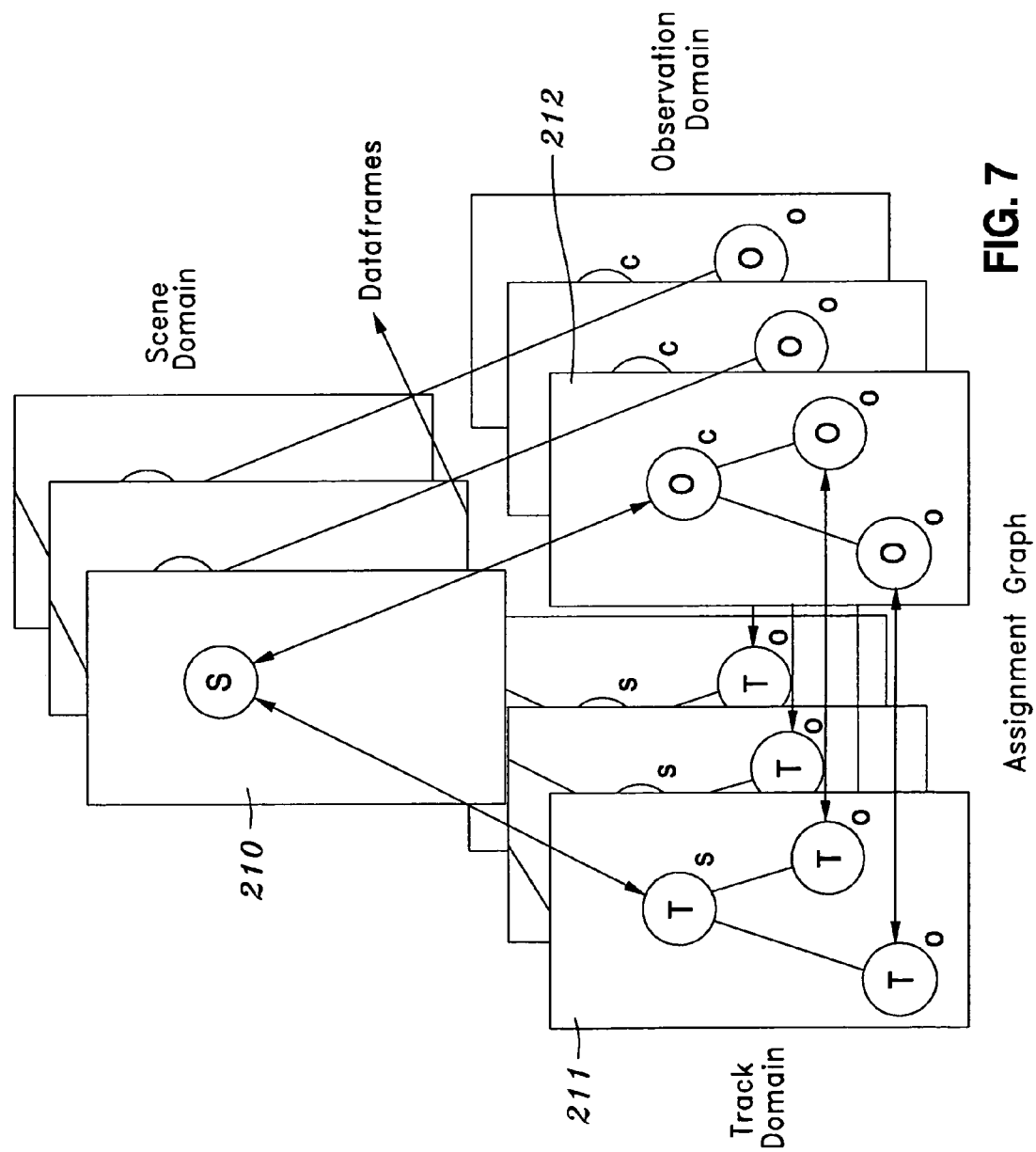
FIG. 7 is a basic schematic for explaining the relationships between the scene, track and observation domains according to one embodiment of the invention.

FIG. 7 represents the relationships between the scene domain, track domain and observation domain for each dataframe, over an entire series of received dataframes. As seen in FIG. 7, scene domain 210 is assigned to track domain 211 and observation domain 212 for the current (top) dataframe. In this manner, the scene domain ties together all possible track node assignments for a given dataframe, along with the possible observable node assignments for the observable nodes that are assigned to the possible track node assignments. As mentioned above, the purpose of the tracking method of the present invention is to determine which of the possible (feasible) track node assignments most likely represent the true tracks of the objects measured by the detection sensors. Accordingly, a scene node represents a dataframe joint assignment problem of feasible assignments which must be solved to determine the best set of joint assignments that represents the true state of the detected objects. However, a current scene node is only a partial joint assignment problem because the feasible joint assignments of all previously received dataframes provides a historical basis that must be taken into account in order to determine the best current set of joint assignments. FIG. 7 shows a series of scene domain relationships behind scene domain 210 which represent all dataframes received. The set of scene nodes depicted in FIG. 7 for all dataframes represents an assignment graph which must be solved to determine the best current state of assignments between observation nodes and track nodes. The assignment graph, and the process for solving the assignment graph, are described further herein.

The various types of assignments between observation nodes and track nodes are now explained. In general, an assignment is an assigned relationship of input track nodes to input observation nodes resulting in assigned output track nodes. Each assignment has zero or more predecessor track nodes, zero or more observation nodes and zero or more successor track nodes. The common assignment types are discussed below with respect to FIGS. 8A to 8I, and all assignment types are shown in Table I below along with the number of predecessors, observations and successors for each assignment type.

Figure 8A:
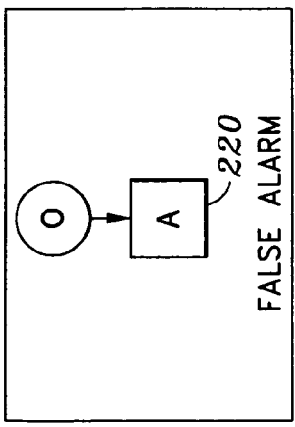
FIGS. 8A to 8I are basic schematic for explaining the types of track node assignments according to one embodiment of the invention.

Turning to FIG. 8A, False Alarm Assignment 220 is shown in which the only input node is an observation node, but there is no output assigned track node. This represents an observation node for which no track node assignment is considered feasible. Next, in FIG. 8B, New Track Assignment 221 is shown in which the only input node is an observation node, and there is only one output assigned track node. This represents an observation node which is assigned to an object track node. FIG. 8C shows Miss Track Assignment 222 in which the only input node is a track node, and the only output node is an assigned track node. This represents an existing track node for which no observation node can be feasibly assigned. FIG. 8D shows Singleton Track Assignment 223 in which the input nodes are a track node and an observation node, and the only output node is an assigned track node. This represents a observation node which is assigned to an existing track node.

Figure 8B:
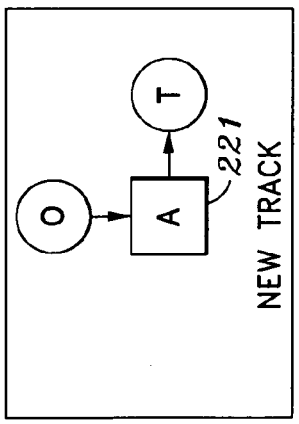
Figure 8C:
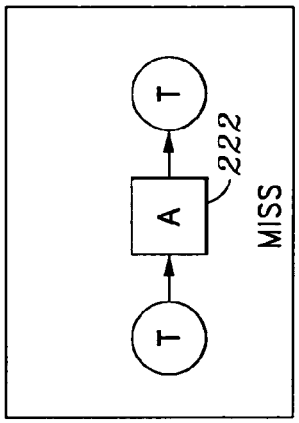
Figure 8D:
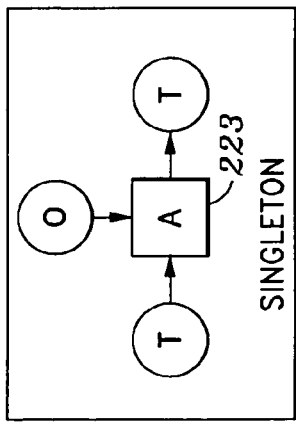
Figure 8E:
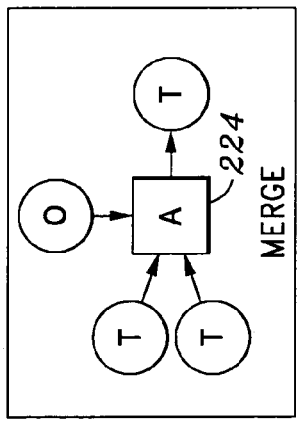
Figure 8F:
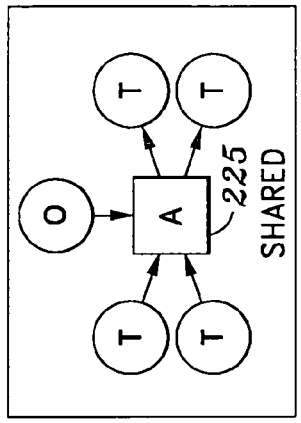
Figure 8G:
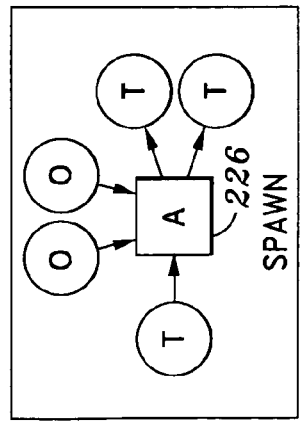
Figure 8H:
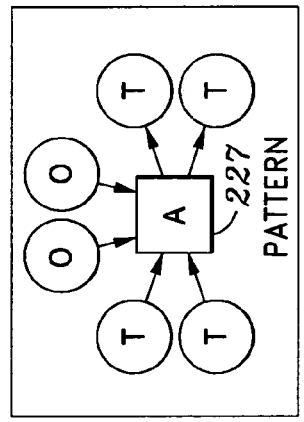
Figure 8I:
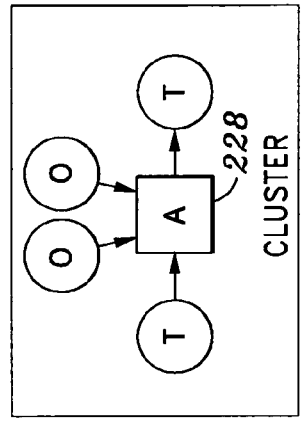

FIG. 8E shows Merge Track Assignment 224 in which the input nodes are two track nodes and only one observation node, and the only output node is an assigned track node. This represents the merging of two existing track nodes into one assigned track node, based on the path of a single observation. Next, FIG. 8F shows Shared Track Assignment 225 in which the input nodes are two track nodes and only one observation node, and the output nodes include two assigned track nodes. This represents an observation node that is assigned to two track nodes. FIG. 8G shows Spawn Track Assignment 226 in which the input nodes are one track node and two observation nodes, and the output nodes include two assigned track nodes. This represents two observation nodes in the current dataframe that cause an existing track node to spawn into an assigned track node for each observation node. FIG. 8H shows Pattern Track Assignment 227 in which the input nodes are two track nodes and two observation nodes, and the output nodes include two assigned track nodes. This represents two observation nodes in the current dataframe which became assigned to two existing track nodes. FIG. 8I shows Cluster Track Assignment 228 in which the input node is a track node and two observation nodes, and the output node is an assigned track node. This represents two observation nodes in the current dataframe which became assigned to one existing track node. The aforementioned assignment types, in addition to other general assignment types, are listed below in Table I, along with the number of predecessors, observations and successors for each assignment type.

TABLE I

| Assignment Name | M-N* | Predecessors | Observations | Successors |
|---|---|---|---|---|
| New Object Track | 0-1 | 0 | 1 | 1 |
| False Alarm | 0-1 | 0 | 1 | 0 |
| New Group Track | 0-N | 0 | N > 1 | 1 |
| Miss | 1-0 | 1 | 0 | 1 |
| Object Update | 1-1 | 1 | 1 | 1 |
| Spawn | 1-N | 1 | N > 1 | M > 1 |
| AND Merge | M-1 | M > 1 | 1 | 1 |
| OR Merge | M-1 | M > 1 | 1 | 1 |
| Group Update | 1-N | 1 | N > 1 | 1 |
| Shared Update | M-1 | M > 1 | 1 | M > I |
| Formation | M-N | M > I | N > 1 | M > I |
| General | M-N | M >= 0 | M >= 0 | K >= 0 |

Figure 9:
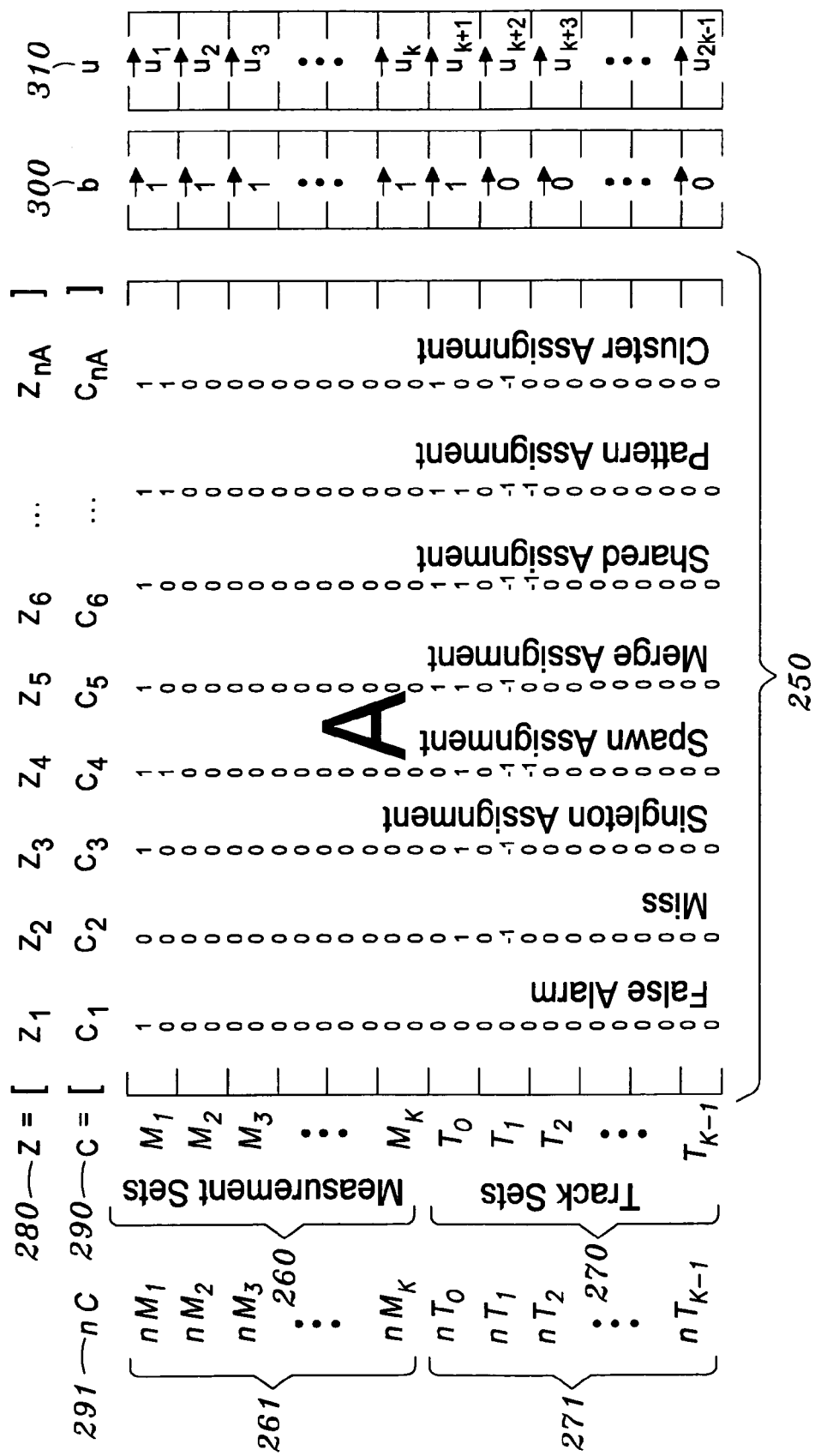
FIG. 9 is a graphic for explaining the assignment graph data structures contained in the assignment graph file according to one embodiment of the invention.

*M = Number of track nodes, and N = Number of observation nodes, in each assignment FIG. 9 depicts the assignment graph data structure associated with assignment graph files 121 according to the present invention. As discussed above with respect to FIG. 7, the purpose of the tracking method of the present invention is to determine which of the feasible track node assignments most likely represent the true tracks of the objects measured by the detection sensors, and a scene node is used to represent a single dataframe joint assignment problem. In a complete joint assignment problem, the sets of feasible track node assignments and the sets of feasible observation node assignments for all dataframes are analyzed and the best set of joint assignments that satisfies all conditions is selected. In the tracking method of the present invention, the determination of feasible joint assignments and the selection of the best set of joint assignments are based on a calculated probability score (evidence) corresponding to each feasible assignment, which is a loglikelihood.

In more detail, a Joint Assignment is a set of elementary assignments that satisfy the given constraints. The loglikelihood for the joint assignment is the sum of the loglikelihoods of the elementary assignments in the joint assignment. A Joint Assignment Problem is an instance of a set partition problem that determines in which an A* search algorithm is used to generate a set of joint assignments satisfying a certain criteria. The criteria could be K Best, all within a certain factor of the best, and all computed within a certain time period. Each Scene Node can be used to define a Joint Assignment Problem. The Joint Assignment Problem is computed from a given Scene Node by computing a set of Scene Nodes that include the given Scene Node and also the ancestors of the given Scene Node. This set of Scene Nodes constitutes a Joint Assignment Problem.

Returning to FIG. 9, data structures are depicted which provide a data representation of the Joint Assignment Problem. As seen in FIG. 9, the Joint Assignment Problem consists of Constraint Matrix A 250, right hand side (RHS) vector B 300, and score vector C 290. The rows of Constraint Matrix A 250 represent multiple sets of track nodes and multiple sets of observation nodes, wherein, for each dataframe, there is a corresponding set of track nodes and a corresponding set of observation nodes. The multiple sets of track nodes 270 is identified as track sets t0 to t(k−1), and the multiple sets of observation nodes 260 is identified as measurement sets M1 to Mk. For each track set, the number of track nodes in the track set is identified in far left column 271. Similarly, for each observation set, the number of track nodes in the observation set is identified in far left column 261. The columns of Constraint Matrix A 250 reference elementary feasible assignments. In this regard, the presence of a node (track or observation) in Constraint Matrix A 250 is indicated by a "1", and the presence of an successor node (track or observation) in Constraint Matrix A 250 is indicated by a "−1". Accordingly, an inspection of column 1 of Constraint Matrix A 250 shows an elementary False Alarm Assignment, the next column shows a Miss Assignment, and so on.

Each row of Constraint Matrix A 250 has a corresponding right hand side (RHS) vector B 300 value that is either 0 or 1. If it is 1, then the row is defined to be an unconditional constraint, and if it is 0, then the row is defined to be a conditional constraint. Each column of score vector C 290 represents a loglikelihood score (evidence) for the entire corresponding column of Constraint Matrix A 250, which can be considered a Partial Joint Assignment. The number of loglikelihood scores represented in score vector C 290 is identified in far left column 271. Coordinating a set of Partial Joint Assignment Problems at the same time can solve the complete Joint Assignment Problem, which is the end result of the tracking method of the present invention.

In this regard, A Complete Joint Assignment Problem is an instance of a set partition problem in which all relevant constraints and all feasible assignments are included. A complete connected component analysis is performed to generate the complete joint assignment problem. A Complete Joint Assignment Problem is derived from the Scene Node that is both a resolution root and a temporal leaf. A Partial Joint Assignment Problem is an instance of a set partition problem that does not include all relevant constraints and all feasible assignments. A partial connected component analysis is performed to generate the partial joint assignment problem. A Partial Joint Assignment Problem is derived from a Scene Node that is not a resolution root or a temporal leaf. A Feasible Joint Assignment Problem determines the feasible joint assignments, a0. The decision problem uses the feasibility loss function and feasibility resource constraints. A Selected Joint Assignment Problem determines the selected joint assignments, a1. The decision problem uses the selection loss function and selection resource constraints. Selection vector Z in FIG. 9 represents the solution to the complete Joint Assignment Problem and is a vector that includes feasible and selection indicators, each of which indicates which set of feasible joint assignments (columns of Constraint Matrix A 250) represents the solution. In this regard, in view of the structures shown in FIG. 9, the complete solution to the Joint Assignment Problem is represented by the formula $Az=b$.

Figure 10:
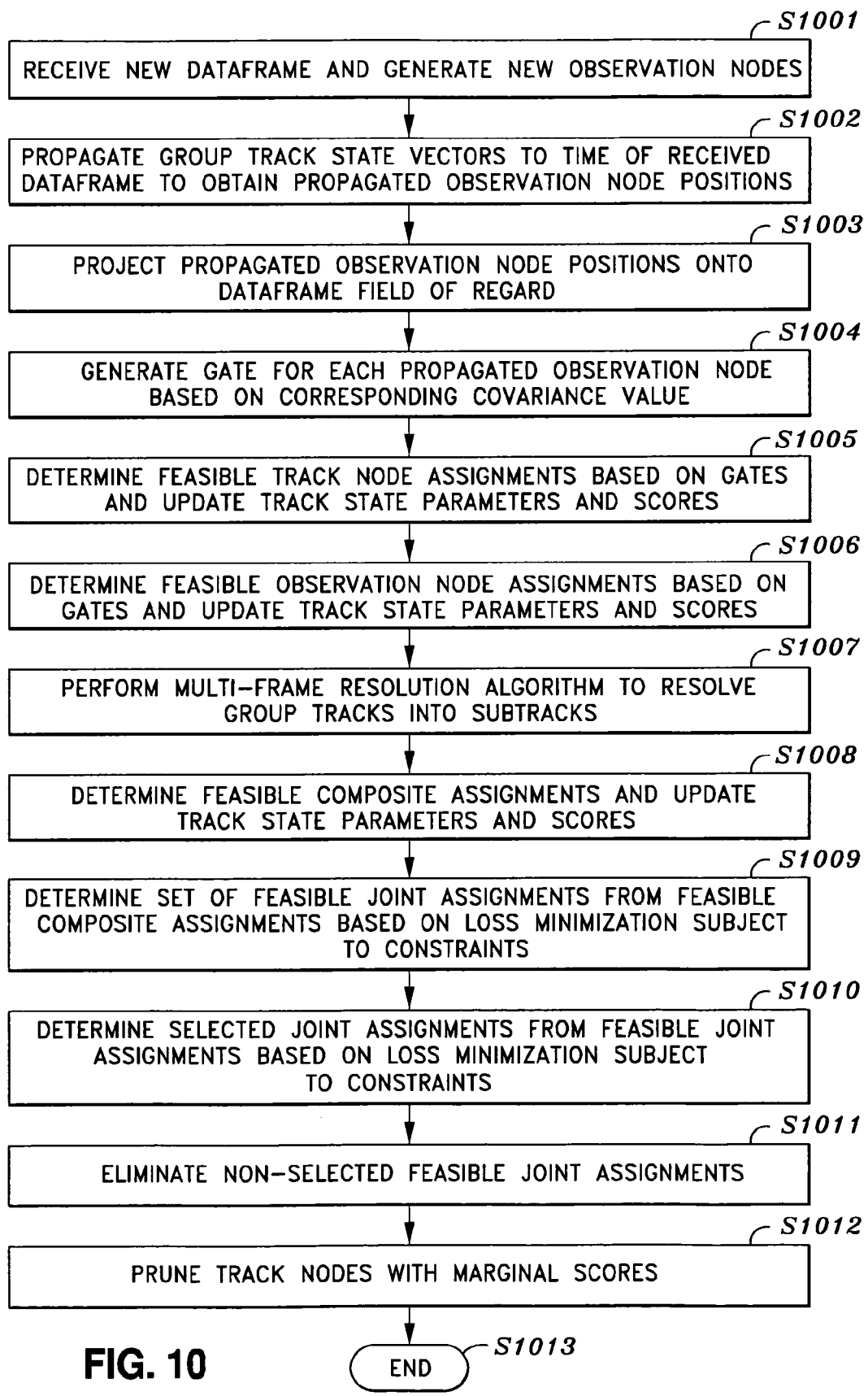
FIG. 10 is a flowchart for explaining the top level process steps of the tracking method according to one embodiment of the invention.

FIG. 10 is a flowchart for explaining the top level process steps of the tracking method of the present invention. The top level steps are now briefly described, as each step is explained in greater detail further herein. In step S1001, a new dataframe is received and new observation nodes are generated corresponding to the measurement data for observed objects, if any, in the dataframe. Step S1002 consists of propagating track node state vectors corresponding to a group track forward to the time of the received dataframe in order to obtain propagated observation node positions, and in step S1003 the propagated observation node positions are projected onto the dataframe field of regard. Gates are generated in step S1004 for each propagated observation node based on a corresponding covariance value. In step S1005, feasible track node assignments are determined based on the proximity of the new observation nodes to the gates, and then the group track node state parameters are updated and the corresponding track node scores are calculated. The latter-mentioned functions of updating the group track state parameters and calculating their respective scores are explained in detail below with respect to FIG. 11. Step S1006 determines feasible observation node assignments based on the based on the proximity of the new observation nodes to the gates, and then the group track node state parameters are updated and corresponding track node scores are calculated.

Next, in step S1007, a multi-frame resolution algorithm is performed to resolve group track nodes into subtrack nodes, if possible. Feasible composite assignments are determined for each combination of based sets of track nodes and sets of observation nodes, based on the feasible track node assignments and the feasible observation node assignments, and then the group track node state parameters are updated and the corresponding track node scores are calculated in step S1008. In step S1009, a set of feasible joint assignments is determined from feasible composite assignments based on feasible loss minimization subject to feasible resource constraints, and in step S1010, a selected set of joint assignments are determined from the set of feasible joint assignments based on selection loss minimization subject to selection constraints. Non-selected feasible joint assignments are eliminated from the assignment graph in step S1011, and track nodes with marginal scores are pruned from the track domain in step S1012. The process then ends at step S1013. In this manner, the tracking method of the present invention solves the complete joint assignment problem of feasible assignments between track nodes and observation nodes by using state parameters of a group/cluster track which encompasses the observation nodes.

Each step of FIG. 10 is now explained in more detail. With regard to step S1001, each new dataframe is received by the tracking processor, and the information in the dataframe indicates the identification of the satellite and the detection sensor that provided the information, the time of measurement, the position and resolution of the sensor, and location and amplitude measurement data of each detected signal corresponding to each measured object, if any were detected. New observation nodes are generated based on the corresponding to the measurement data in the dataframe.

With regard to step S1002, the track node state vectors corresponding to a group track are propagated forward to the time of the received dataframe in order to obtain propagated observation node positions. Group/cluster tracking, and the maintenance of related state parameters of the group/cluster track is therefore an essential component of the tracking method of the present invention. A random set-based group/cluster tracking algorithm is used for this component.

This section further explains the random set-based cluster/group tracking algorithm utilized in the tracking method of the present invention. The group tracking algorithm maintains a state estimate of the centroid of a group of objects, the location extent of the objects and a probability distribution for the number of objects in the group. The centroid state vector includes position and velocity, with ballistic propagation, and can include additional propagator parameters. The location extent is measured in terms of the second moment of the group and is represented by 3×3 symmetric matrix. The count is represented as a probability distribution over the number of objects in the group.

A group track is represented as a finite random set of independent, identically distributed objects. Let p(n) denote the probability that there are n objects in the group, and let f(x) denote the probability density function for each object. Then, the Janossy density, which is defined below as:

$$j_n(x_1, \ldots, x_n)dx_1 \ldots dx = Pr\left\{\begin{array}{l} \text{there are exactly } n \text{ points in the group, one in each} \\ \text{of the } n \text{ distinct infinitesimal regions } \{x_i, x_i + dx_i\} \end{array}\right\}$$

can be represented as $$j_n(x_1, \ldots, x_n)dx_1 \ldots dx_n = p(n)n!f(x_1) \ldots f(x_n)$$

for an i.i.d group.

The first moment density is defined as $$m_1(x) = \sum_{k=0}^{\infty} \frac{1}{n!} \int \int \int j_{1+n}(x, y_1, \ldots y_n) dy_1 \ldots dy_n$$

which becomes $$m_1(x) = \bar{n}f(x)$$

for an i.i.d. group, where $$\bar{n} = k = \sum_{k=0}^{\infty} kp(k)$$

is the average number of objects in the group. The group track maintains an estimate for the density function $f(x)$ and the count distribution p(n).

Definition Of Cluster Tracking Algorithm Terms. The terms for explaining the cluster tracking algorithm are set forth below:

Definition of Terms

Preliminaries

Let $\bar{z}$ represent the collection of prior measurements obtained on a group track. Let $\hat{z}$ represent a new set of data received on a group track on the current data frame. Let (X, E, n) represent the state of the group track, where X is the state vector for the centroid of the group track. E is the extent of the group track and n is the number of objects in the group track. The primary objective of the group tracking algorithm is to estimate the posterior probability $$P[X,E,n|\bar{z},\hat{z}]$$

which can be factored into $$P[X,E,n|\bar{z},\hat{z}] = P[X|E,n,\bar{z},\hat{z}]P[E|n,\bar{z},\hat{z}]P[n|\bar{z},\hat{z}].$$

The first term on the left is the posterior for the centroid, the second term is the posterior for the extent and the last term is the posterior for the count. To reduce the computational complexity of the above calculation some approximations will be made. The extent term in the posterior for the centroid will be replaced with the mean extent and the count term in the posterior for the centroid will be replaced with the mean count, i.e., $$P[X|E,n,\bar{z},\hat{z}] = P[X|\bar{E},\bar{n},\bar{z},\hat{z}].$$

so that the expression of interest in the group tracking algorithm becomes $$P[X|E,n,\bar{z},\hat{z}] = P[X|\bar{E},\bar{n},\bar{z},\hat{z}]P[E|n,\bar{z},\hat{z}]P[n|\bar{z},\hat{z}].$$

Further, the new data, $\hat{z}$, will be partitioned into two sets. One set conditions the centroid, $\hat{z}_x$, and the other conditions the extent, $\hat{z}_E$, i.e., $$\hat{z} = [\hat{z}_x, \hat{z}_E].$$

Centroid Distribution. The posterior for the centroid can be written:

$$P[X \mid \bar{E}, n, \vec{z}, \hat{z}] \cong \frac{P[\hat{z}_x \mid X, \bar{E}, n, \vec{z}]P[X \mid \bar{E}, n, \vec{z}]}{P[\hat{z}_x \mid \bar{E}, n, \vec{z}]}$$

The first term in the numerator on the right is the centroid likelihood, the second term in the numerator is the centroid prior and the denominator is the centroid evidence. The centroid evidence is defined by $$P[\hat{z}_x|\bar{E},n,\bar{z}] \cong \int P[\hat{z}_x|X,\bar{E},n,\bar{z}]P[X|\bar{E},n,\bar{z}]dX.$$

Extent Distribution

Extent Distribution

The posterior for the extent can be written $$P[E \mid n, \vec{z}, \hat{z}] \cong \frac{P[\hat{z}_E \mid E, n, \vec{z}]P[E \mid n, \vec{z}]}{P[\hat{z}_E \mid n, \vec{z}]}$$

The first term in the numerator on the right is the extent likelihood, the second term in the numerator is the extent prior and the denominator is the extent evidence. The extent evidence is defined by $$P[\hat{z}_E|n,\bar{z}] = \int P[\bar{z}_E|E,n,\bar{z}]P[E|n,\bar{z}]dE.$$

Count Distribution

Count Distribution

The posterior for the count can be written $$P[n \mid \vec{z}, \hat{z}] = \frac{P[\hat{z} \mid n, \vec{z}] P[n \mid \vec{z}]}{P[\hat{z} \mid \vec{z}]}$$

The first term in the numerator on the right is the count likelihood, the second term in the numerator is the count prior and the denominator is the count evidence. The count likelihood is defined by $$P[\bar{z} \mid n, \bar{z}] = \int\int P[\hat{z} \mid X, E, n, \bar{z}] P[X \mid E, n, \bar{z}] P[E \mid n, \bar{z}] dX dE$$

and is approximated by the product of the centroid evidence and the extent evidence $$P[\bar{z} \mid n, \bar{z}] = P[\hat{z}_x \mid E, n, \bar{z}] P[\hat{z}_e \mid n, \bar{z}]$$

The count evidence is obtained by the following summation $$P[\hat{z} \mid \hat{z}] = \sum_n P[\hat{z} \mid n \vec{z}] P[n \mid \vec{z}]$$

The likelihood, the prior and the evidence for the centroid, extent and count help to organize the computations in the group tracking algorithm.

Probability Distributions

Two probability distributions are needed, Gaussian and Wishart. The Gaussian distribution is defined as:

$$dN(X; \overline{X}, \Sigma) = \frac{\exp(-.5(X - \overline{X})' \Sigma^{-1}(X - \overline{X}))}{(2\pi)^{p/2} |\Sigma|^{1/2}}$$

The Wishart distribution is defined as $$dW(W; \overline{E}, NE) = c(p, NE) |\overline{E}|^{NE/2} |W|^{NE-p-1/2} \exp(-\text{Str}(\overline{E}W)) dW$$

where

NE=The degrees of freedom

W=The Inverse Extent p=The dimensionality of the extent (3 for an ECI extent).

$$c(p, NE) = \left[ 2^{\frac{NE_p}{2}} \pi^{\frac{p(p-1)}{4}} \prod_{i=1}^{p} \Gamma\left(\frac{(NE + 1 - i)}{2}\right) \right]^{-1}$$

$$c(3, NE) = \left[ 2^{\frac{NE_p}{2}} \pi^{\frac{3}{2}} \prod_{i=1}^{p} \Gamma\left(\frac{(NE + 1 - i)}{2}\right) \right]^{-1}.$$

Note that tr(A) refers to the tracks of the matrix A.

Bayesian Decision Logic

Bayesian Decision Logic

The generation of the count hypotheses is controlled through a Bayesian decision logic. The loss from deciding to limit the hypothesis set to a1 given a feasible set of hypotheses a0 is defined by $$\text{Loss}(a1 \mid a0, \vec{z}, \hat{z}) = \left\{ \begin{array}{l} \text{Decision Loss if the subset of hypotheses } a1 \text{ is selected} \\ \text{from a superset of feasible hypotheses } a0 \end{array} \right\}$$

and computed using $$\text{Loss}(a1 \mid a0, \vec{z}, \hat{z}) = \sum_{n \in a0} \text{Loss}(n, a1 \mid \vec{z}, \hat{z}) p(n \mid \vec{z}, \hat{z}, a0).$$

objects in the group is n and the subset of hypotheses a1 is selected is given by $$\text{Loss}(n, a1 \mid \vec{z}, \hat{z}) = \left\{ \begin{array}{l} \text{Decision Loss if the subset of hypotheses } n \text{ is true} \\ \text{and the subset of hypotheses } a1 \text{ is selected} \end{array} \right\}$$

and computed using $$\text{Loss}(n, a1 \mid \vec{z}, \hat{z}) = \left\{ \begin{array}{l} \ln[\exp(\text{Loss}(n, n \mid \vec{z}, z)/T) p(n \mid \vec{z}, z, a1)], n \in a1 \\ \text{Loss}(n, a1 \mid z, z) n \notin a] \end{array} \right\}$$

The individual loss terms are given by

Loss(n,n|$\bar{z}$,z)=−log[P[z$\hat{z}$|n,$\bar{z}$]] (log count evidence)

T=Temperature (a pre-defined constant)

Loss(n,a1|$\bar{z}$,z)=L (a pre-defined constant)

The incremental loss from adding another count hypothesis is given by

ΔLoss(n,n+1)=Loss(a1|a0,$\bar{z}$,$\hat{z}$)−Loss(a0|a0,$\bar{z}$,$\hat{z}$)

where a1={1,2, . . . ,n} a0=a1∪{n+1}

Sensor Characteristics

Sensor Characteristics

The measurements consist of a set of location and amplitude parameters generated by the sensor signal processing algorithm and assigned to the group track, i.e., $\hat{z}=\{(\hat{z}_j, \hat{A}_j), j=1, \ldots, M\}$, where $\hat{z}_j$=The estimated location of the jth measurement (2 dimensional for IR, 3 dimensional for RF)

$\hat{A}_j$=The estimated amplitude of the jth measurement (Intensity for IR, RCS for RF).

For IR, the location estimate is assumed to be (az, el) in sensor coordinates. For RF, the location estimate is assumed to be (range, az, el) in sensor coordinates. Note that (range, az, el) is used to update the centroid state, but that $(x,y,z)_{ECI}$ are used to update the extent. Define the following dimensionality parameter $$p = \begin{cases} 2, \text{ for } LR \\ 3, \text{ for } RF \end{cases}$$

Also, to support mapping from source to sensor, define the following exponent for the slant range to the target:

$$q = \begin{cases} 2, \text{ for } IR \\ 4, \text{ for } RF \end{cases}$$

From the measurement set, an amplitude map can be derived that represents the measured intensity with the random noise removed, that is, $$\hat{A}(l) = \sum_{i=1}^{M} \hat{A}_j g(z(l) - \hat{z}_j, E)|\delta z|$$

where $\hat{A}(l)$=The Derived Amplitude at location z(l)

$\overline{A}_j g(z-\hat{z}_j)\delta z$=The response at location z given an object at $\hat{z}_j$ with amplitude $\hat{A}_j$ It is assumed that the point response function has a gaussian shape and can be expressed as $g(z-\hat{z}_j,E)=\exp(-(z-\hat{z}_j)^1 E^{-1}(z-\hat{z}_j))/|\delta z|$ where E=The Extent of the point response function $|\delta z|$=The volume of resolution cell Define the peak normalized exponential function $g(\Delta z,S)=\exp(-\Delta z' S^{-1} \Delta Z)/|\delta z|$.

Finally, the group tracking algorithm needs the rms error in amplitude estimation:

σ=The rms amplitude measurement accuracy.

Group Track Parameters

Group Track Parameters

The parameters of the group track consist of parameters for the centroid, the extent and the count. The centroid is modeled as a Gaussian distribution with the following parameters:

$(X^+,\Sigma_x^+)$=The Updated Mean and Covariance of the centroid state.

$(X^-,\Sigma_x^-)$=The Propagated Mean and Covariance of the centroid state.

$(Z^-,\Sigma_z^-)$=The Projected Mean and Covariance of the centroid state.

$(A^+,\Sigma_A^+)$=The Updated Mean and Covariance of the group amplitude parameters, at the source.

$(A^-,\Sigma_A^-)$=The Propagated Mean and Covariance of the group amplitude parameters, at the source.

$(A_S^-,\Sigma_{A_s}^-)$=The Projected Mean and Covariance of the group amplitude, at the sensor.

The extent is modeled as a Wishart distribution, with the following parameters:

$(EX^+,N_{EX}^+)$=The Updated Mean and Degrees of Freedom of the extent state.

$(EX^-,N_{EX}^-)$=The Propagated Mean and Degrees of Freedom of the extent state.

$(EZ^-,N_{EZ}^-)$=The Projected Mean and Degrees of Freedom of the extent state.

$(EA^+,N_{EA}^+)$=The Updated Mean and Degrees of Freedom of the extent of the group amplitude parameters, at the source.

$(EA^-,N_{EA}^-)$=The Propagated Mean and Degrees of Freedom of the extent of the group amplitude parameters, at the source.

$(EA_S^-,N_{EA_S}^-)$=The Projected Mean and Degrees of Freedom of the extent of the group amplitude, at the sensor.

The count distribution is modeled as a discrete probability distribution, with the following parameters:

$P^+(n)$=The Updated Count Probability Vector.

$P^-(n)$=The Propagated Count Probability Vector.

$P_S^-(n)$=The Projected Count Probability Vector.

Returning to step S1002 of FIG. 10, the propagation of the group state parameters is now described with respect to the group centroid, extent and count.

First, initialization of the parameters is performed. The apriori centroid state is used to initialize the centroid location state. The apriori centroid state is combined with the correlated measurements to create an initial updated state. Note that the a priori could come from another group track in the assignment graph. The amplitude state is at the source, so the amplitude at the sensor needs to be projected back to the source. For IR, a range estimate is assumed available. Let $$\hat{A} = \sum_{j=1}^{M} \hat{A}_j$$

be the summation of the amplitudes of the measurements used to initiate this group track.

To initialize the group track, $A^+=\text{Range}^q \overline{A}$ $\Sigma A_A^+=\text{Range}^{2q} \sigma^2$ The location extent state is initialized:

$EX^+=[(M-1)EZ_c+E_{min}]/M$ (Initialize Wishart parameter.)

$N_{EX}^+=M$ (Update degrees of freedom.)

where EZc is computed further in the process with the location extent posterior. Next, initialize the amplitude extent, using the following equations:

$EA^+=EA_r$ (Initialize Wishart parameter.)

$N_{EA}^+=M$ (Update degrees of freedom.)

where EAc is computed further in the process with the amplitude extent posterior.

Propagation: First, propagate the mean and covariance of the centroid state by executing ballistic propagation of the mean and covariance:

$X^- = \text{BallisticPropagate}(X^+, \delta t)$   $\Sigma_x^- = \Phi\Sigma_x^{+}\Phi^j + Q_X$ Next, propagate the mean and covariance of the group amplitude parameters, at the source. In this regard, the amplitude parameters at the source, would be the source of radiance for IR, or the RCS for the RF. The source radiance is propagated as follows:

$A^- = A^+$ $\Sigma_A^- = \Sigma_A^+ + Q_A$

Set $Q_A = 100$ W/sr. Note that these are scalar quantities.

Propagate the mean and degrees of freedom of the extent state using the propagator:

$EX^- = EX^+$ $N_{EX}^- = \alpha N_{EX}^+$ set $\alpha = 0.9$.

Propagate the mean and degrees of freedom of the group amplitude parameters, at the source, using the propagator:

$EA^- = EA^+$ $N_{EA}^- \alpha N_{EA}^+$

Set $\alpha = 0.9$.

Propagate the count distribution using a Markov transition matrix:

$p^- = \pi^-(\delta t)p^+$, where $\pi(n,m)$ = The probability that a count of n could transition to a count of m over $\partial t$. Set the values of the Markov transition matrix to the identity.

In this manner, the group track state parameters are propagated to the time of the received dataframe to obtain propagated observation node positions.

Next, the propagated observation node positions are projected onto the field of regard of the dataframe in step S1003. First, project the propagated observation node positions onto the dataframe field of regard using location data. Note that the amplitude and amplitude extent will be projected after the centroid is updated in order to use a better slant range for projection of the amplitude data onto the dataframe field of regard. Project the mean and covariance of the centroid state by using the project function:

$Z^- = \text{Project}(X^-, \text{Sensor})$ $\Sigma_Z^- = H_{a2z} \Sigma_x^- H_{a2z}^j$ where $H_{a2z}$ = The Jacobian of the Project Function that maps the centroid state vector into sensor measurement space. This Jacobian is 2×6 (or IR and ballistic state, and 3×6 for RF and ballistic state.

Next, project the mean and degrees of freedom of the extent state. The extent state is in ECI. For RF, the location estimates can be converted to ECI so there is no need to project the extent state. Projection, however, is required for IR. The mean and covariance are projected using the following:

The extent state is in ECI. For RF, the location estimates can be converted to ECI so there is no need to project the extent state. Projection, though, is required for IR.

For now, project the mean and covariance using the following:

$EZ^- = HEX^{31} H^1$ $N_{EZ}^- = N_{EX}^-$

For RF, $H = I_{3 \times 3}$. For IR, extract the position projection part of the centroid projection matrix:

$H = H_{2a3}$ submatrix of the centroid projection matrix, $H_{a2z}$.

Next, project the count distribution, using a Markov transition matrix:

$p_S^- = \pi_s p^-$ where the Markov transition matrix is defined as $\pi S(n,m)$ = The probability that a count of n could appear as a count of m by sensor S Set the values of the Markov transition matrix to identity.

Accordingly, the propagated observable node positions are projected on the dataframe filed of regard.

Next, in step S1004, gates are generated for each of the propagated observable node positions, based on a covariance value of each propagated observable node position. The propagated tracks are traversed starting with Start Nodes that are the track nodes that are resolution roots and terminal leafs. For aggregate track nodes, child gates are calculated for the track children nodes, and for leaf nodes gates are calculated.

As mentioned above, in step S1005, feasible track node assignments are determined based on the proximity of the new observation nodes to the gates, and then the group track node state parameters are updated and the corresponding group track node scores are calculated. In this regard, the gates from step S1004 represent open nodes in the track node tree, and the track tree is traversed starting with the gates to determine track assignments for the new observable nodes. Each track node is analyzed to determine all feasible track node assignments for the new observable nodes (1 to N, where N is the number of new observation nodes.

Figure 11:
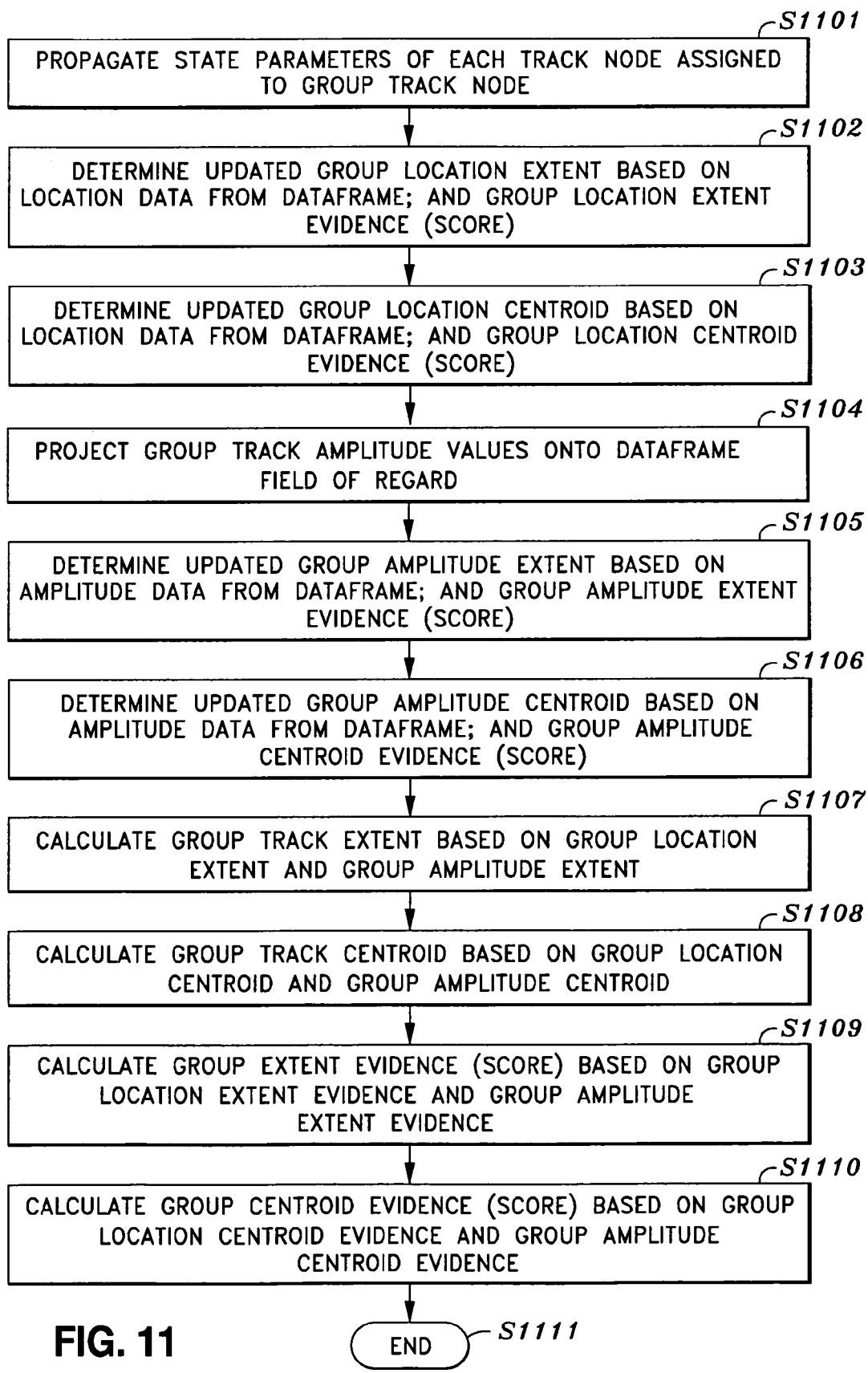
FIG. 11 is a flowchart for further explaining the function of updating group track state parameters and their related scores, as referenced in the process steps of FIG. 10.

The update of the group track parameters and the calculation of the group track scores (evidence) mentioned in step S1004 are now explained in more detail with respect to FIG. 11. In step S1101, after all feasible track node assignments are determined, the state parameters of all track nodes in the group track node are updated. Next, in step S1102, an updated (posterior) group location extent is determined based on location data of the measured objects from the dataframe, and also determine the new group location extent score (evidence).

The location extent depends upon whether the sensor measurements are from an IR sensor or an RF sensor. A direct update to the extent state can be made if the measurements are RF. However, if the measurements are IR, then an Expectation Measurement (EM) algorithm is executed to provide estimated parameters for the missing dimension. In this regard, the location extent posterior based on the radio frequency sensor location measurements is computed first. The track independent measurement quantities for computing the location extent posterior based on the radio frequency sensor location measurements are calculated as follows:

For RF, convert the location estimates to ECI. For IR, do nothing. Compute the following geometric properties of the measurements:

$$\hat{z}_r = \frac{1}{M}\sum_j \hat{z}_j$$

(Geometric Location Centroid)

$$\hat{\bar{A}}_r = \frac{1}{M}\sum_j \hat{A}_j$$

(Geometric Amplitude Centroid, at the sensor)

$$EZ_r = \frac{1}{(M-1)}\sum_j (\hat{z}_j - \hat{\bar{z}}_r)(\hat{z}_j - \hat{\bar{z}}_r)'$$

(Geometric Location Extent)

$$EA_r = \frac{1}{(M-1)}\sum_j (\hat{A}_j - \hat{\bar{A}}_r)(\hat{A}_j - \hat{\bar{A}}_r)'$$

(Geometric Amplitude Extent)

Note that if the sensor measurements are from an RF sensor, then the location estimates are assumed to be in ECI.

The part of the new data that conditions the extent is defined as $$\hat{z}_{F^-} = [\hat{\bar{z}}_r, \hat{\bar{A}}_r, EZ_r, EA_r].$$

Then, the location extent posterior based on the radio frequency (RF) sensor location measurements is calculated as follows:

For RF, update the parameters of the extent posterior using the following:

$E^- = (N_{EZ}^-)EZ^{31}$ (Convert from extent to Wishart parameter.)

$$E^+ = E^- + M(EZ_r) + \frac{M(N_{EZ}^-)(\hat{\bar{z}}_r - z^-)(\hat{\bar{z}}_r - z^-)'}{M + (N_{EZ}^-)}$$

(Update to Wishart parameter.)
$N_{EX}^+ = N_{EX}^{-} + M$ (Update degrees of freedom.)

$$EX' = \frac{E^+}{N_{EX}^+}$$

(Convert back to extent.)
Note that $z^-$ in the update to the Wishart parameter is the projected centroid state converted to ECI.
Set the extent mean:
$\overline{EX} = EX^+$,
and the projected extent mean:
$\overline{EZ} = H\overline{EX}H^1$.
Next, the location extent posterior based on the IR sensor location measurements is computed. First, the location extent parameters for determination of the location extent posterior based on the IR sensor location measurements are calculated as follows:
Initialize location extent parameters and projection/rotation matrices:
$E_0^- = (N_{EX}^-)EX^-$ (Predicted Location Wishart Parameter)
$N_{EZ}^- = (N_{EX}^-)$ (Predicted number of degrees of freedom.)
$PS_0^- = -99999.9$ (Initial Posterior Score)
$\Delta P_e^- = (Pos_e^- - SenPos_e)$ (Predicted Position in ECI Coordinates)

Range=$|\Delta P_e^-|$ (Range to the centroid)
$R_{e2z}$=Rotation Matrix from ECI to Sensor
$H_{e2z}$=Projection matrix from ECI to Sensor Coordinates
Place the extent and relative position in sensor coordinates:
$E_{SO}^- = R_{e2s}E_0^- R_{r2s}^1$ (Wishart Parameters in Sensor Coordinates)
$z^- = R_{e2s}\Delta P_e^-$. (Relative Position in Sensor Coordinates)
Assume that the sensor coordinate system, has the following properties:
The X axis in Sensor Coordinates is normal to the sensor focal plane (X is the Unobservable direction)
The Y axis in Sensor Coordinates is in the Azimuth Direction.
The Z axis in Sensor Coordinates is in the Elevation Angle Direction.
With these conventions,
$(\hat{z}_j(1), \hat{z}_j(2))=(Az, El)$ of the jth observation.
Next the expectation (E) step is performed as follows:

$$EZ_{rect} = \begin{bmatrix} EZ_{22} & EZ_{23} \\ EZ_{32} & EZ_{33} \end{bmatrix}$$

(Reduced Data Extent)

$$EZ_r = \begin{bmatrix} EZ_{11} & EZ_{12} & EZ_{13} \\ EZ_{21} & EZ_{22} & EZ_{23} \\ EZ_{31} & EZ_{32} & EZ_{33} \end{bmatrix}$$

(Complete Data Extent)
where the terms in the matrix are
$EZ_{12}=EZ_{21}=b_{21}EZ_{22}+b_{31}EZ_{23}$
$EZ_{13}=EZ_{31}=b_{21}EZ_{32}+b_{31}EZ_{33}$
$EZ_{11}=V_1$ $$EZ_{22} = \frac{1}{(M-1)}\sum_j (\text{Range } \hat{z}_j(1) - z^-(1))^2$$

$$EZ_{23} = EZ_{32} = \frac{1}{(M-1)}\sum_j (\text{Range } \hat{z}_j(1) - z^-(1))(\text{Range } \hat{z}_j(2) - z^-(2))$$

$$EZ_{33} = \frac{1}{(M-1)}\sum_j (\text{Range } \hat{z}_j(2) - z^-(2))^2$$

and the conditional weights are given by $$b_{21} = \frac{(S_{33}S_{21} - S_{23}S_{31})}{(S_{22}S_{33} - S_{23}^2)}$$

$$b_{31} = \frac{(S_{22}S_{31} - S_{23}S_{21})}{(S_{22}S_{33} - S_{23}^2)}$$

and the conditional variance is given by $$V_1 = S_{11} - \frac{(S_{33}S_{21}^2 - 2S_{23}S_{31}S_{21} + S_{22}S_{31}^2)}{(S_{22}S_{33} - S_{23}^2)}$$

and the covariance matrix is obtained from E:

$$S = \frac{(N_{\overline{EZ}}^- + 1)}{N_{\overline{EZ}}^- N_{\overline{EZ}}^- - p - 1} E.$$

Compute the reduced and complete mean vector:

$$\hat{\bar{z}}_{rect} = \begin{bmatrix} \hat{\bar{z}}_2 \\ \hat{\bar{z}}_3 \end{bmatrix}$$

$$\hat{\bar{z}}_c = \begin{bmatrix} \hat{\bar{z}}_1 \\ \hat{\bar{z}}_2 \\ \hat{\bar{z}}_3 \end{bmatrix}$$

where the terms in the vector are $\bar{z}_1 = z^-(1) + b_{21}(\bar{z}_2 - z^-(2)) + b_{31}(\bar{z}_3 - z^-(3))$ $$\hat{\bar{z}}_2 = \frac{\text{Range}}{M} \sum_j \hat{z}_j(1)$$

$$\hat{\bar{z}}_3 = \frac{\text{Range}}{M} \sum_j \hat{z}_j(2).$$

Next, perform the maximization (M) step as set forth below:

Compute the posterior extent as follows:

$$E_s^+ = E_s^- + M(EZ_c) + \frac{M(N_{\overline{EZ}}^-)(\hat{\bar{z}}_c - z^-)(\hat{\bar{z}}_c - z^-)'}{M + (N_{\overline{EZ}}^-)}$$

(Update to Wishart parameter.)

$N_{EX}^+ = N_{EX}^- + M$ (Update degrees of freedom.)

Finally, perform termination of the EM algorithm as follows:

Compute the current posterior score $$PS = \frac{(N_{EX}^+ - p - 1)}{2} \log (|E_S^*|) - \frac{1}{2} tr(E_S^+ E_{SO}^-) - \frac{1}{2} tr(EZ_{rect} E_{rectSO}^+)$$

where $E_{redSO}^+ = H_{e2s} E_{SO}^- H_{e2s}^t$.

Perform the termination test:

If $|PS - PS_0| \leq \epsilon$ then $$EX^* = R_{e2s}^t \frac{E_s^*}{N_{EX}^+} R_{e2s}$$

(Convert back to extent and to ECI.)

$EZc = R_{e2s}^t EZc R_{e2s}$ (Convert back to extent and to ECI.)

Break.

Else

Continue to iterate.

Endif

The location extent evidence (score) is calculated as set forth below:

$\alpha^- = N_{EX}^-$ $E^- = \alpha^- EX^-$ $\alpha^+ = N_{EX}^+$ $E^+ = \alpha^+ + EX^+$ and compute $$P_{LocExt} = (2\pi)^{\mu M/2} \left(\frac{\alpha^-}{\alpha^+}\right)^{p/2} \frac{c(p, \alpha^-)|E^-|^{\alpha^- 12}}{c(p, \alpha^+)|E^+|^{\alpha^+ 12}}$$

(Extent Evidence for Location)

Next, in step S1103 of FIG. 11, the updated (posterior) group location centroid is determined, and the corresponding group location centroid score (evidence) is calculated. First, the track dependent measurement quantities are calculated as follows according to either one of the two possible sets of equations:

Compute the following quantities:

$E_m = H_{e2t} EZc H_{e2z}^t + E$ (Measurement Extent)

$E_t = EZ^- + E$ (Predicted Track Extent)

$$D' = \frac{2^{p/2}|\overline{EZ} + E|^{1/2}}{|\overline{EZ} + 2E|^{1/2}}$$

$$D' = \frac{2^{p/2}|E_t|^{1/2}}{|E_m + E_t|^{1/2}}$$

$$\tilde{D} = \frac{\pi^{p/2}|E|}{|\delta z||EZ + E|^{1/2}}$$

$$\tilde{D} = \frac{\pi^{p/2}|E_m|}{|\delta z||EZ + E|^{1/2}}$$

Next, the group location centroid update and the group location centroid score (evidence) are calculated by performing a Kalman Filter update using the following expressions (alternative expressions are provided for most expressions) for the relevant matrices:

Measurement Matrix $H_{e2n} = H_{z2n} H_{x2z}$ (Jacobian of Projection from State Space to Amplitude Space)

$H_{x2z}$=Jacobian of Projection from State to Measurement $$H_{z2a} = \frac{A_s^-}{2\hat{A}}[(EZ + 2E)(EZ + E)^{-1}]$$

(Jacobian of Projection from Measurement Space to Amplitude $$H_{z2a} = \frac{A_s^-}{2\hat{A}}[(E_m + E_t)(E_j)^{-1}]$$

(Jacobian of Projection from Measurement Space to Amplitude Space)

Innovation $\Delta z = \bar{z} - z^-$ (Innovation)

where $z^-$ (Projected Centroid State)

$$\hat{\bar{z}} = \frac{\sum_{j=1}^{M} D'\hat{A}_j \hat{z}_j g(\hat{z}_j - z^-, \overline{EZ} + 2E)|\delta z|}{\hat{A}}$$

(Average measured location.)

$$\hat{\bar{z}} = \frac{\sum_{j=1}^{M} D'\hat{A}_j \hat{z}_j g(\hat{z}_j - z^-, E_m + E_t)|\delta z|}{\hat{A}}$$

(Average measured location.)

$$\hat{A} = \sum_{j=1}^{M} D'\hat{A}_j g(\hat{z}_j - z^-, \overline{EZ} + 2E)|\delta z|$$

(Average measured amplitude.)

$$\hat{A} = \sum_{j=1}^{M} D'\hat{A}_j g(\hat{z}_j - z^-, E_m + E_t)|\delta z|$$

(Average measured amplitude.)

Measurement Covariance (in amplitude space)

$$R = \frac{(\overline{EZ}/2 + E)(\overline{EZ} + E)^{-1}(\overline{EZ}/2 + E)}{\left[\frac{\tilde{D}\hat{A}^2}{2\sigma^2}\right]}$$

$$R = \frac{(E_m + E_t)(E_t)^{-1}(E_m + E_t)}{\left[\frac{2\tilde{D}\hat{A}^2}{\sigma^2}\right]}$$

Update Equations $K = \Sigma_X^{-H}{}_{x2a}{}^t(H_{z2a}\Sigma_Z^{-H}{}_{z2at}{}^t + R)^{-1}$ (Gain Matrix)

$X^+ = X^+ K\Delta z$ (Centroid State Update)

$\Sigma_X^+ = (1 - KH_{x2a})\Sigma_X^-$ (Centroid Covariance Update)

Note that under certain conditions, the update equations are independent of n.

In step S1104, the group track amplitude onto the dataframe field of regard. First, the group amplitude mean and covariance, at the sensor, is projected as set forth below:

For now, project the group amplitude using the following:

$A_S^- = A^-/R^o$ $\Sigma_{A_T}^- = \Sigma_A^-/R^{2g}$ where R=Updated Range to the Group.

Next, project the mean and degrees of freedom of the group amplitude, at the sensor, as follows:

For now, project the extent and degrees of freedom using the following:

$EA_S^- = EA^-/\text{Range}^{2q}$ $N_{EA_s}^- = N_{EA}^-$ where Range=Updated Range to the Group.

In step S1105, determine the group amplitude extent update (posterior) based on the projected amplitude data, as follows (alternative expressions are provided):

For both RF and IR, the amplitude extents are computed as follows:

$E^- = (N_{EA_S}^-)EA_S^-$ (convert from extent to Wishart parameter.)

$$E^+ = E^- + M(EA_r) + \frac{M(N_{EA_s}^-)(\hat{\bar{A}}_r - A_S^-)(\hat{\bar{A}}_r - A_S^-)^t}{M + (N_{EA_s}^-)}$$

(Update to Wishart parameter.)

$N_{EA}^+ = N_{EA}^- + M$ (Update degrees of freedom.)

$$EA^+ = \frac{E^+}{N_{EA}^+}\text{Range}^{2q}$$

(Convert back to extent and back to the source.)

Set the extent mean:

$\overline{EA} = EA^+$ and the projected extent mean:

$\overline{EA_S} = \overline{EA}/\text{Range}^{2q}$.

The group amplitude extent score (evidence) is calculated as follows:

For the amplitude extent, let $\alpha^- = N_{EA}^-$ $E^- = \alpha^- EA^{31}$ $\alpha^+ = N_{EA}^+$ $E^+ = \alpha^+ EA^+$ and compute $$P_{AmpExt} = (2\pi)^{pM/2}\left(\frac{\alpha^-}{\alpha^+}\right)^{p/2}\frac{c(p, \alpha^-)|E^-|^{a^-/2}}{c(p, \alpha^+)|E^+|^{a^+/2}}$$

(Extent Evidence for Amplitude)

In step S1106, the group amplitude centroid and the group update (posterior) and the group amplitude centroid score (evidence) are computed using a Kalman filter using the following expressions for the relevant matrices (alternative expressions are provided):

Measurement Matrix $H_{\alpha 2s}$=1/Range$^q$ (Jacobean of projection from source to sensor, partial of sensor wrt source)

Innovation $\Delta A = \hat{A} - A_S^-$ (Innovation)

where $A_S^-$ (Projected Amplitude State)

$$\hat{A} = \sum_{j=1}^{M} D' \hat{A}_j g(\hat{z}_j - z^-, \overline{EZ} + 2E)|\delta z|$$

(Average measured amplitude.)

$$\hat{A} = \sum_{j=1}^{M} D' \hat{A}_j g(\hat{z}_j - z^-, E_m + E_l)|\delta z|$$

(Average measured amplitude.)

Measurement Covariance (in amplitude space)

$$R = \left[\frac{2\sigma^2}{\tilde{D}\hat{A}^2}\right]$$

(Effective measurement covariance.)

Update Equations $K = \Sigma_A^- H_{\alpha 2s}{}'(H_{a 2t}\Sigma_A^- H_{a 2s}{}' + R)^{-1}$ (Gain Matrix)

$A^+ = A^- + K\Delta A$ (Centroid Amplitude State Update)

$\Sigma_A^+ = (I - KH_{s 2a})\Sigma_A^-$ (Centroid Amplitude Covariance Update)

In step S1107, the total group track extent is calculated based on the group location extent from step S1102 and the group amplitude extent from step S1105, and output as the group track extent. Similarly, in step S1108, the total group track centroid is calculated based on the group location centroid from step S1103 and the group amplitude centroid from step S1106, and output as the group track centroid. In step S1109, the total group extent evidence (score) is calculated based on the group location extent evidence from step S1102 and the group amplitude extent evidence from step S1105, as follows:

The total extent evidence is the product of the location extent evidence and the amplitude extent evidence:

$P[\hat{z}_E|\bar{z}] = P_{LocExt} P_{AmpExt}$

Next, In step S1110, the total group centroid evidence (score) is calculated based on the group location centroid evidence from step S1103 and the group amplitude centroid evidence from step S1106, as follows (note that two alternative expressions are provided for the C expression):

The total (extent plus centroid) evidence is computed using $$P[\hat{z}_x|\bar{E}, \hat{z}] = \frac{\exp^{-.5\{\bullet\}}}{|H_{z 2a}R^- H^1{}_{z 2a} + R|^{1/2} sqrt\left(\frac{\sigma^2}{\tilde{D}} + \sum_{A_s}^-\right)}$$

where $(\bullet) = A + B + C + D$ $$A = \frac{(\hat{A} - A_s^-)^2}{\left(\sigma^2/\tilde{D} + \sum_{A_s}^-\right)}$$

('Usual' Amplitude Chisq)

$B = (\bar{z} - z^-)^t (H_{z 2a} R^- H_{z 2a}{}^t + R)^{-1}(\bar{z} - z^-)$ ('Usual' Location Chisq)

$$C = \left(\frac{\tilde{D}}{\sigma^2}\right)\left[\frac{|\overline{EZ} + E|^{1/2}}{|E|^{1/2}} \sum_{j=1}^{M} \hat{A}_j \hat{A}_j, g(\hat{z}_j - z^-, 2E)|\delta z| - \hat{A}^2\right]$$

$C = 0.0$ $D = -(\bar{z} - z^-)^t R^{-1}(\bar{z} - z^-)$

The process depicted in FIG. 11 then ends at step S1111. Based on the foregoing, the group track state parameters and associated scores are updated based on both location and amplitude data from the sensors, for a more accurate tracking of the observed objects associated with the track nodes under the group track.

Returning to FIG. 10, in step S1006, the feasible observation node assignments are determined, and then the group track state parameters and associated scores are updated. In this regard, the feasible observation node assignments are determined by traversing the observation nodes starting with the observation root nodes, and feasible assignments of each observation node to the track nodes are determined (M track nodes to 1 observation node). The update of the group track state parameters and associated scores is performed in the same manner as discussed above with respect to the steps shown in FIG. 11, and is therefore not repeated here.

Figure 12:
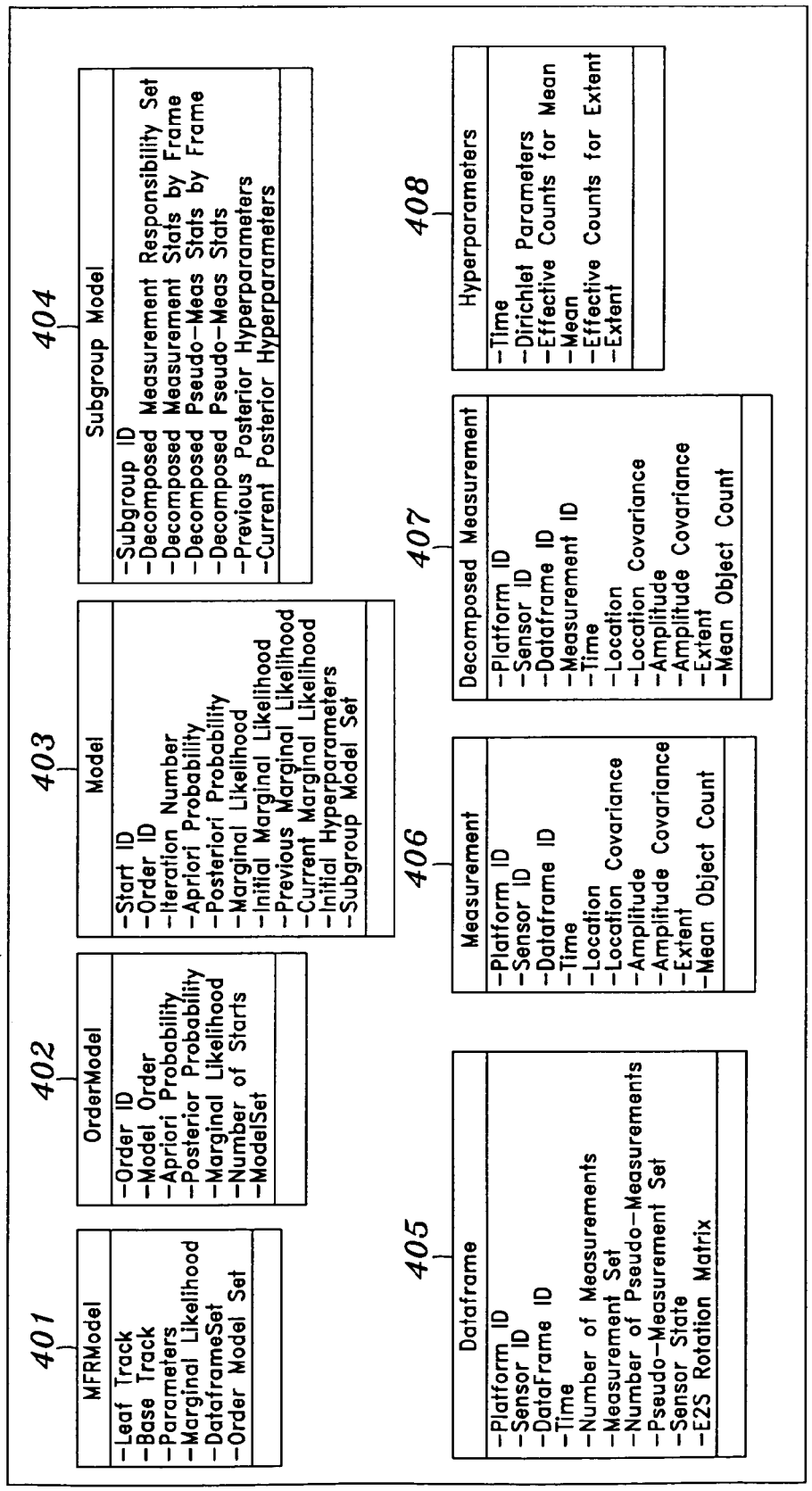
FIG. 12 is a graphic for explaining the data structures used by the multi-frame resolution algorithm according to one embodiment of the invention.

Next, in step S1007, a multi-frame resolution algorithm is performed in an attempt to resolve group track nodes into subtrack nodes (children). In general, the multi-frame resolution algorithm of the present invention centers around an Expectation (E) Measurement (M) algorithm applied to a plurality of possible model starts corresponding to possible group track resolutions. FIG. 12 depicts the components of multi-frame resolution files 126, and includes MFRModel 401, OrderModel 402, Model 403, SubgroupModel 404, Dataframe 405, Measurement 406, Decomposed Measurement 407 and Hyperparameters 408. The elements of each of these components are shown in FIG. 12 and are further explained in Appendix I, which is attached to this specification and incorporated herein in its entirety for all purposes.

Figure 13:
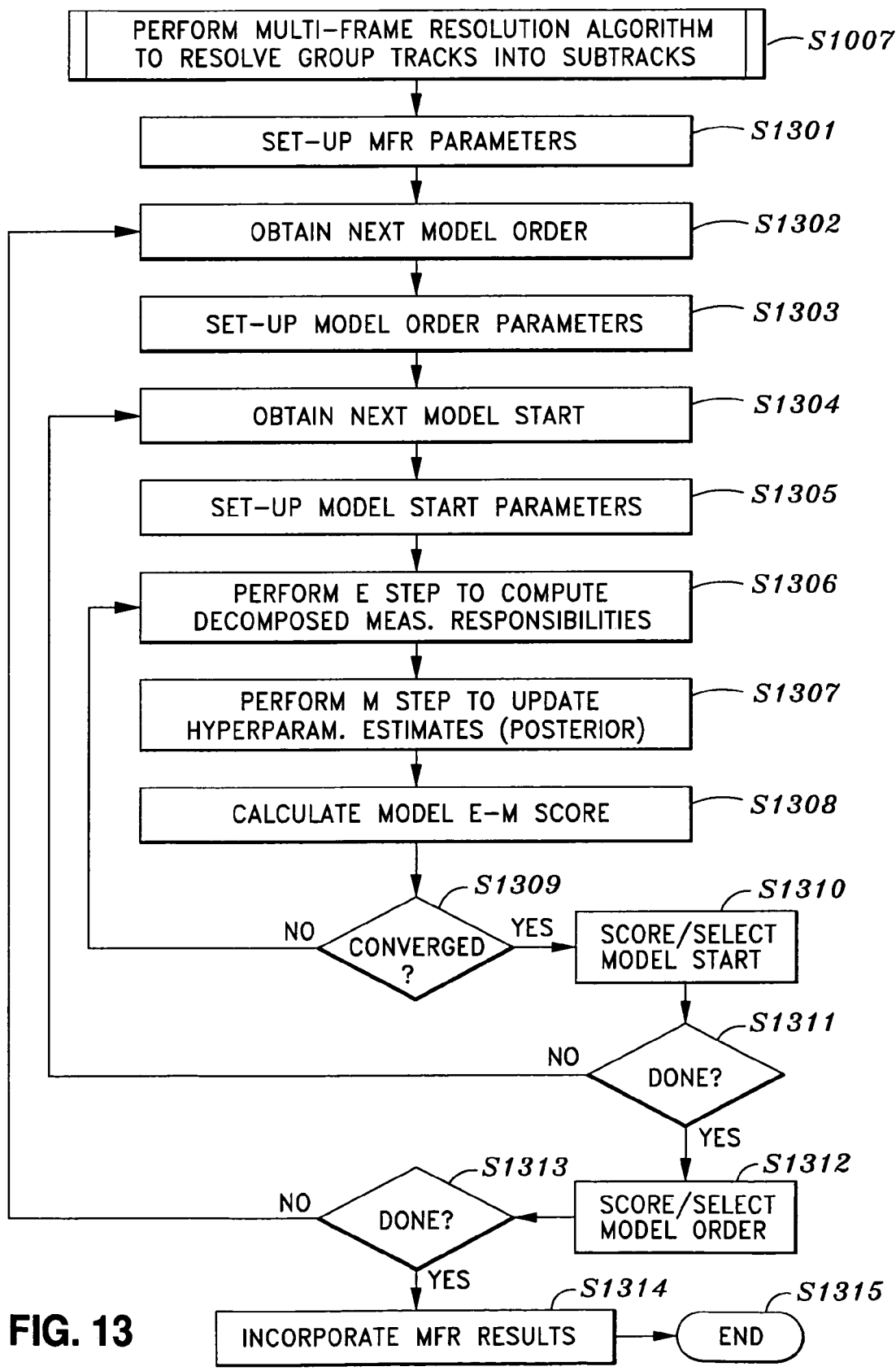
FIG. 13 is a flowchart for explaining the top level process steps of the multi-frame resolution algorithm according to one embodiment of the invention.

The process of the multi-frame resolution algorithm is further explained with respect to FIG. 13. In step S1301, the multi-frame resolution (MFR) parameters are set-up. Next, the next model order from the set of model orders is obtained in step S1302. For each model order, the model order parameters are set-up in step S1303. The next model start is obtained from the set of model starts corresponding to the current model order in step S1304. For the current model start, the model start parameters are set-up in step S1305, and then the EM algorithm is performed. Specifically, the Expectation (E) step is performed in step S1306 to compute decomposed measurement responsibilities. Next, the Maximization (M) step is performed in step S1307 to update hyperparameter estimates (posterior). In step S1308, an EM score for the EM iteration is calculated.

In step S1309, it is determined whether the EM algorithm has converged on a result for the current model start. If it has, process flow passes to step S1310 in which scoring and selection determination is performed for the current model start. If there is not convergence at step S1309, flow passes back to step s1306 in order to perform another iteration of the E and M steps for the current model start. After step S1310, it is determined in step S1311 whether there are any more model starts to process for the current model order. If there are, then process flow passes to step S1304 to obtain the next model start, and then repeat the model start processing steps. If there are no more model starts for the current model order at step S1311, then process flow passes to step S1312 in which scoring and selection determination is performed for the current model order. Flow then passes to step S1313 in which it is determined whether there are any more model orders to be processed for the multi-frame resolution algorithm. If there are more model orders, process flow passes to step S1302 in which the next model order is obtained, and the model order steps are repeated. If there are no more model orders to be processed, then the multi-frame resolution algorithm is complete, and any group tracks that have been resolved into one or more children subtracks are incorporated into the track node domain. Process flow then ends at step S1315. It should be noted that a more detailed implementation of the multi-frame resolution algorithm according to one embodiment of the invention is provided in Appendix I, which is attached to this specification and incorporated herein in its entirety for all purposes.

Returning to the top-level tracking method process steps in FIG. 10, all sets of feasible composite assignments are determined in step S1008 for each combined set of track node sets and observation node sets (e.g. one column of the assignment graph (AG)), based on the set of feasible track node assignments and their respective scores, and on the set of feasible observation node assignments and their respective scores. The update of the group track state parameters and associated scores is performed in the same manner as discussed above with respect to the steps shown in FIG. 11, and is therefore not repeated here. These feasible composite joint assignment scores are represented in C vector 290 of FIG. 9.

In step S1009, a set of feasible joint assignments is determined based on the set of feasible composite assignments and their respective scores and based on a feasible loss minimization algorithm subject to feasible resource constraints. These feasible joint assignments are indicated in Z vector 280 of FIG. 9. Next, in step S1010, a selected set of joint assignments are determined from the set of feasible joint assignments and their respective scores, and based on a selection loss minimization algorithm subject to selection resource constraints. These selected joint assignments are also indicated in Z vector 280 of FIG. 9. The determination of the feasible joint assignments and of the selected joint assignments is further explained below.

The following section describes the logic for deciding which feasible joint assignments are selected and which should be pruned. The logic is based on the computation of Free Energy and attempts to find the subset of joint hypotheses that minimize the free energy. Free Energy, in this context, also corresponds to Bayesian Decision Loss. A joint hypothesis is a collection of assignments that satisfy the assignment constraints. Let Za be the indicator function for the joint hypothesis, that is, Zα=Indicator Function for Hypothesis a $z_\alpha$=Indicator Function for Hypothesis $\alpha$ $$z_\alpha(j) = \begin{cases} 1 \text{ If Assignment } A_j \text{ is contained is } \alpha \\ 0 \text{ If Assignment } A_j \text{ is not contained in } \alpha \end{cases}$$

Each assignment, Aj, is a hyperarc with a loglikelihood score:

Aj=Assignment={Predj,Succj,Obsj}

Predj=Predecessor Tracks in Aj

Succj=Successor Tracks in Aj

Obsj=Observations in Aj cj=LogLikelihood of Assignment Aj

The joint assignment problem is to determine the set of joint assignments that satisfy the assignment criterion:

$a_0$=Best Set of Joint Assignments based on the Assignment Criteria={$z_\alpha$:$Az_\alpha$=B and $c^t z_\alpha$ satisfies the Assignment Criteria}

Best Joint Assignment=arg max c'∋Az=B where

A=[$A_1$ $A_2$ ... $A_N$]=Constrain Matrix.

$$A_1 = \begin{cases} 1 \text{ If Track Mapped to Row, is in Pred}_j \\ 1 \text{ If Observation Mapped to Row, is in Pred}_j \\ -1 \text{ If Track Mapped to Row, is in Succ}_j \\ 0 \text{ Otherwise} \end{cases}$$

$$B_1 = \begin{cases} 1 \text{ If Object Mapped to Row, is Unconditional} \\ 0 \text{ If Object Mapped to Row, is Conditional} \end{cases}$$

The determination of feasible joint assignments and the selection of the best joint assignments finds the best subset of hypotheses based on a minimum loss or min free energy criteria:

min Loss(a0,a1|z̄,z)

where a1=Selected Set of Joint Hypotheses ⊆a0

The Loss is defined as

Loss(a0,a1|z̄,z)=Loss given that the true hypothesis is in a0 but we decide a1 and is equal to the posterior expected loss:

Loss(a0,a1|z̄,z)=$G_1$=$U_1$−$TH_1$+$PV_1$ (Posterior Expected loss of a1=Free Energy of a1).

where $$U_1 = -\sum_{\alpha \subset a1} c_\alpha p(\alpha \mid \vec{z}, z, a1)$$

(Energy of a1)

$$H_1 = -\sum_{\alpha \subset a1} \ln(p(\alpha \mid \vec{z}, z, a1)) p(\alpha \mid \vec{z}, z, a1)$$

(Entropy of a1)

$V_t = -\ln(Q(a1))$ (Effective Volume a1)

and $$Q(a0) = \sum_{\alpha \subset a0} \exp(c_\alpha)$$

(Partition Function of a0)

$$Q(a1) = \sum_{\alpha \in a1} \exp(c_\alpha)$$

(Partition Function of a1)

$$c_\alpha = \sum_j z_\alpha(j) c(j)$$

(Log Likelihood of Joint Hypothesis α)

The processing for determining the selected set of best joint assignments is as follows:

Inputs:

A0={(α, $z_\alpha$, $c_\alpha$), $z_\alpha$=Indicator, $c_\alpha$=LogLikelihood} (Initial Hypothesis Set)

T=Temperature

P=Pressure

Outputs:

α1={(α, $z_\alpha$, $c_\alpha$), $z_\alpha$=Indicator, $c_\alpha$=LogLikelihood} (Final Hypothesis Set)

The process steps are described in the processing hierarchy set forth below:
1. Compute Posterior Probabilities for a0: p(α51 $\bar{z}$,z,α0)
    1.1. Compute Partition Function of a0:

$$Q(a0) = \sum_{\alpha \subset a0} \exp(c_\alpha)$$

1.2. Compute Posterior Probabilities: p(α51 $\bar{z}$,z,α0)=exp(cq)/Q(a0)
2. Compute Posterior Expected Loss of a0 wrt a0: $G_D$=Loss(a0,a0|$\bar{z}$,z)=$U_0$−$TH_0$+$PV_0$
3. Set a1=a0; G1=G0.
4. Loop over a0 in reverse order of score
    4.1. Let α be the next highest scoring joint hypothesis
    4.2. Set a2=a1\α
    4.3. Compute Posterior Probabilities for a2: p(α|$\bar{z}$,z,a2)
        4.3.1 Compute Partition Function of a2:

$$Q(a2) = \sum_{\alpha \in a2} \exp(c_\alpha)$$

4.3.2. Compute Posterior Probabilities of a2: p(α| $\bar{z}$,z,a2)=exp($c_\alpha$)/Q(a2)
    4.4. Compute Posterior Expected Loss of a1 wrt a2: $G_2$=Loss(a1,a2|$\bar{z}$,z)=$U_2$−$TH_2$+$PV_2$
    4.5. Compute Loss Delta (Free Energy Change): Δ(a1, a2)=$G_2$−$G_1$
    4.6. If Loss Delta is positive, Return a1
    4.7. If Loss Delta is negative
        4.7.1. Set a1=a2; $G_1$=$G_2$ In this manner, the best set of joint assignments is selected in the Assignment Graph (AG). In step S1011, non-selected feasible joint assignments are eliminated from the track domain of the Assignment Graph, and in step S1012, track nodes with below marginal scores are pruned from the track domain of the Assignment Graph. In particular, for the pruning process, marginal scores are identified for certain track nodes in the AG. These correspond to track nodes that are also unconditional constraints, i.e., have Bi=and the track nodes in this set are new track nodes or track nodes that are at the beginning of the AG. In general, new track nodes have a lower probability score (evidence) than that of a track node corresponding to a continuing track segment. A Minimum Loss prune decision logic is executed on these identified track nodes. Tracks not selected are pruned and the AG is updated. Process flow of the tracking algorithm then ends at step S1013.

Figure 14:
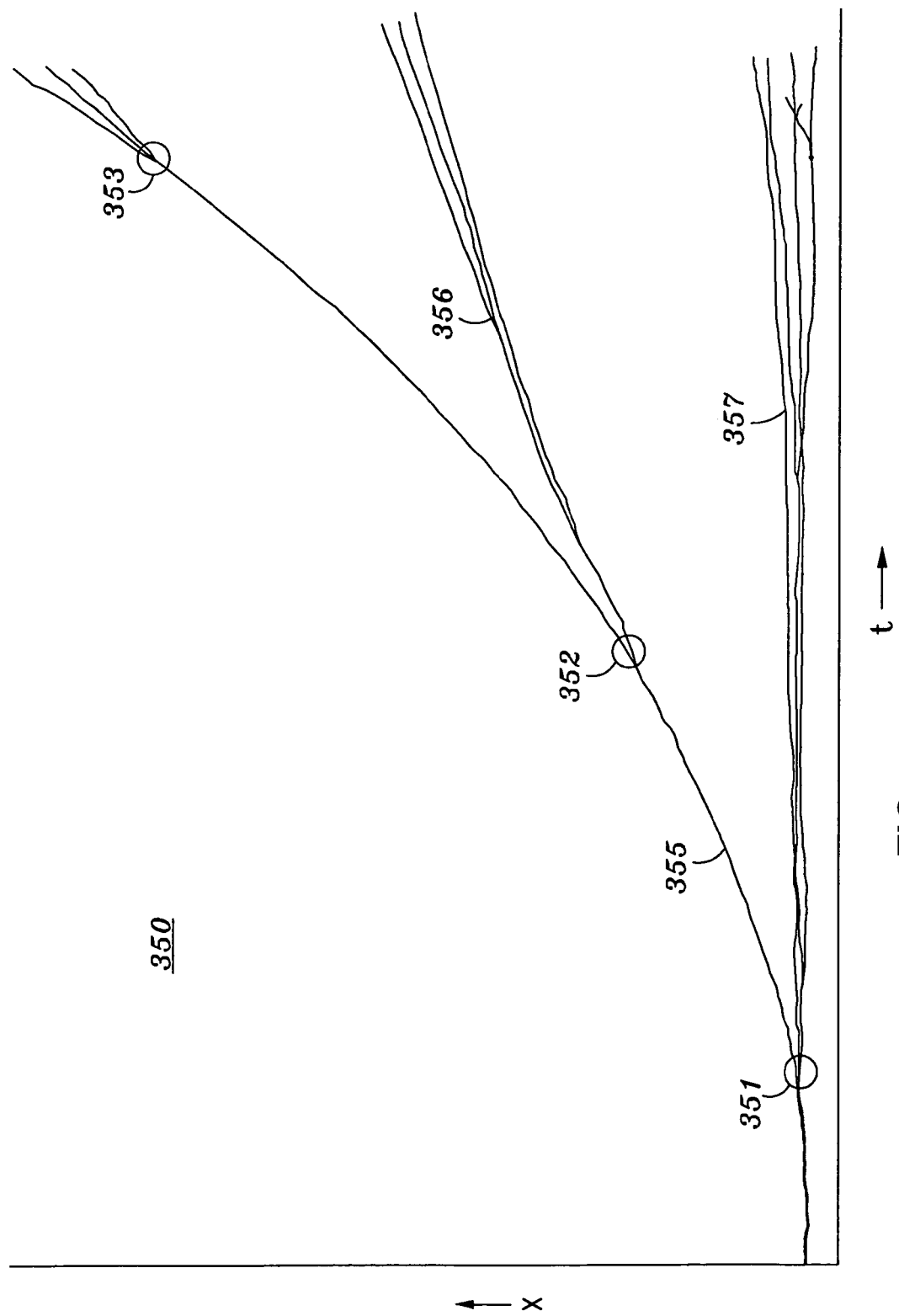
FIG. 14 is a graph depicting the tracking of a ballistic missile during the release of clusters of objects according to one embodiment of the invention.
Figure 15:
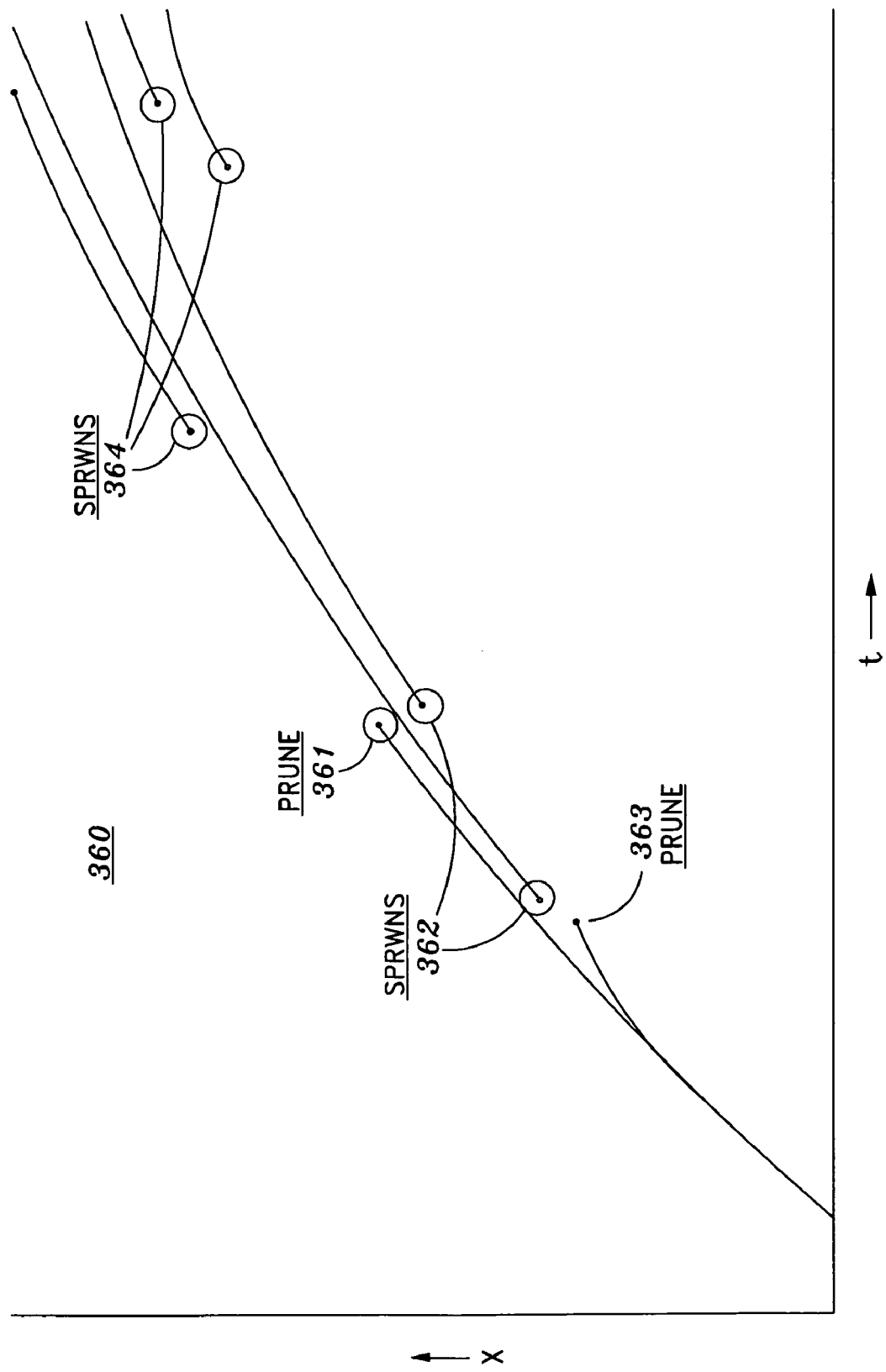
FIG. 15 is a graph depicting the spawning of new tracks and the pruning of tracks during tracking of a ballistic missile according to one embodiment of the invention.
Figure 1:
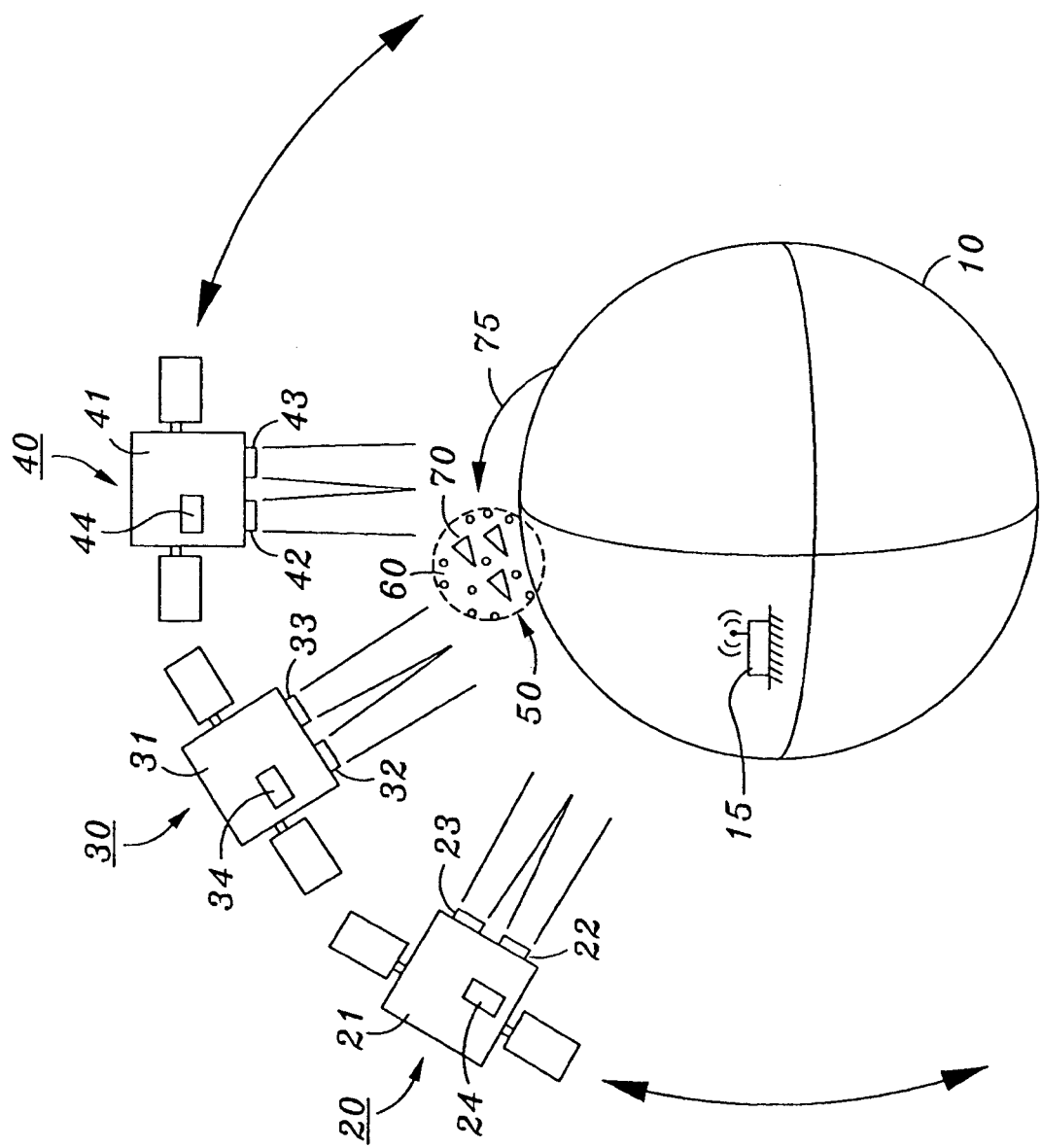
Figure 4:
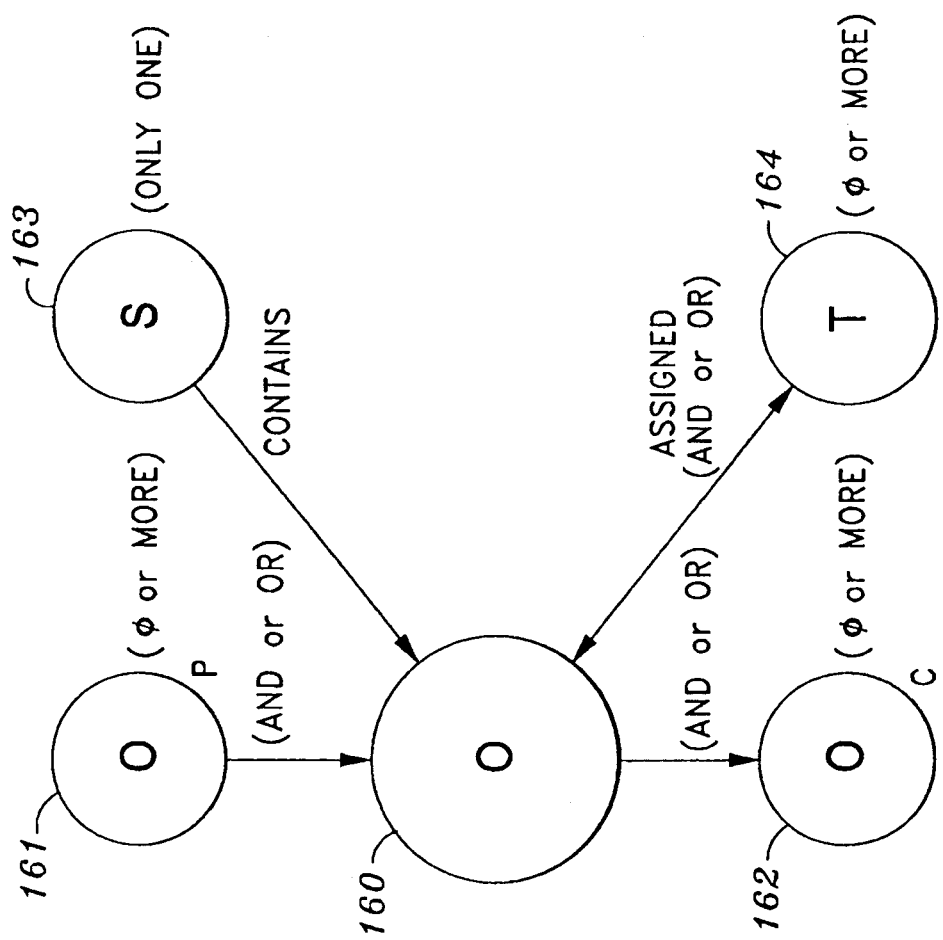
Figure 5A:
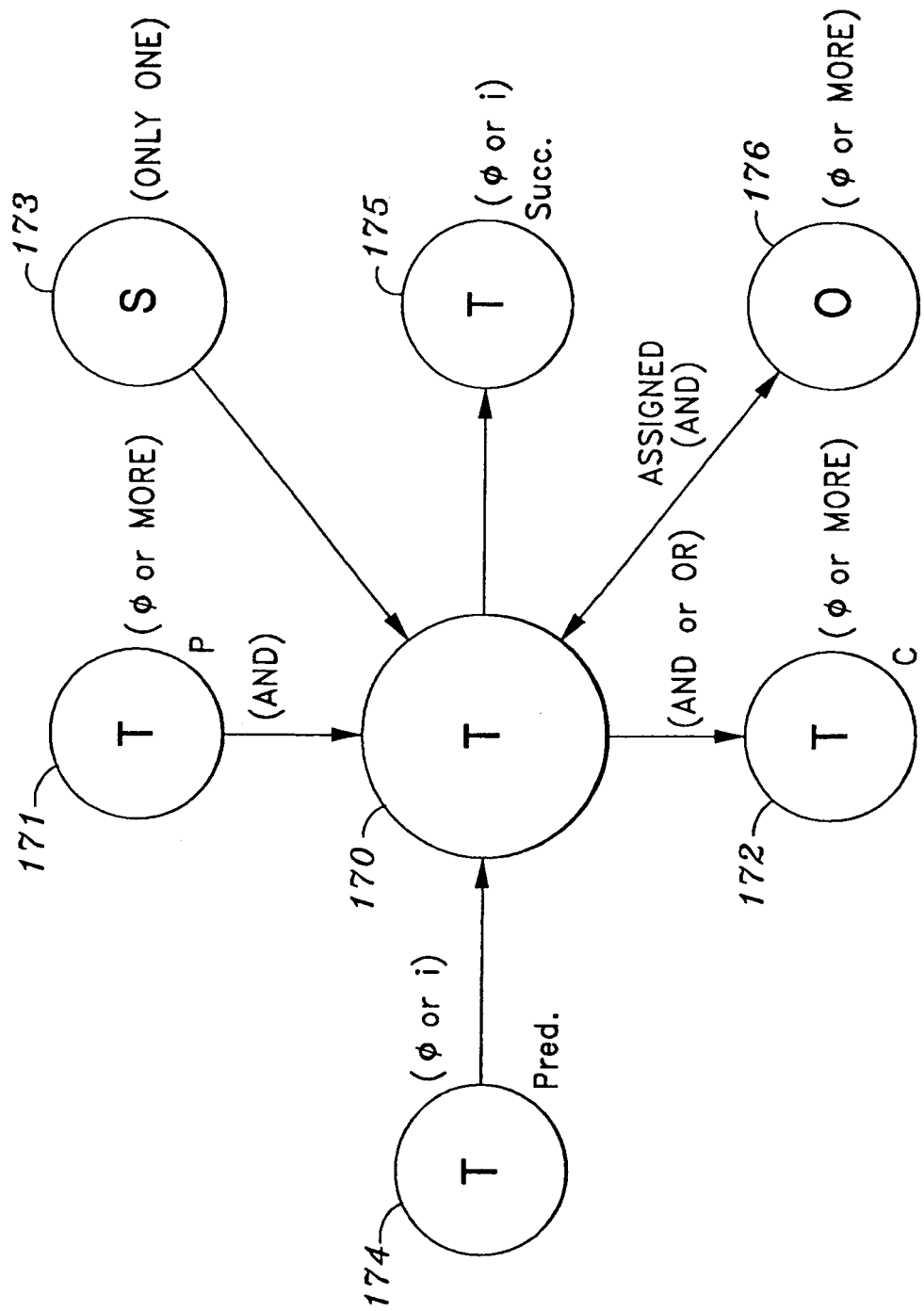
Figure 5B:
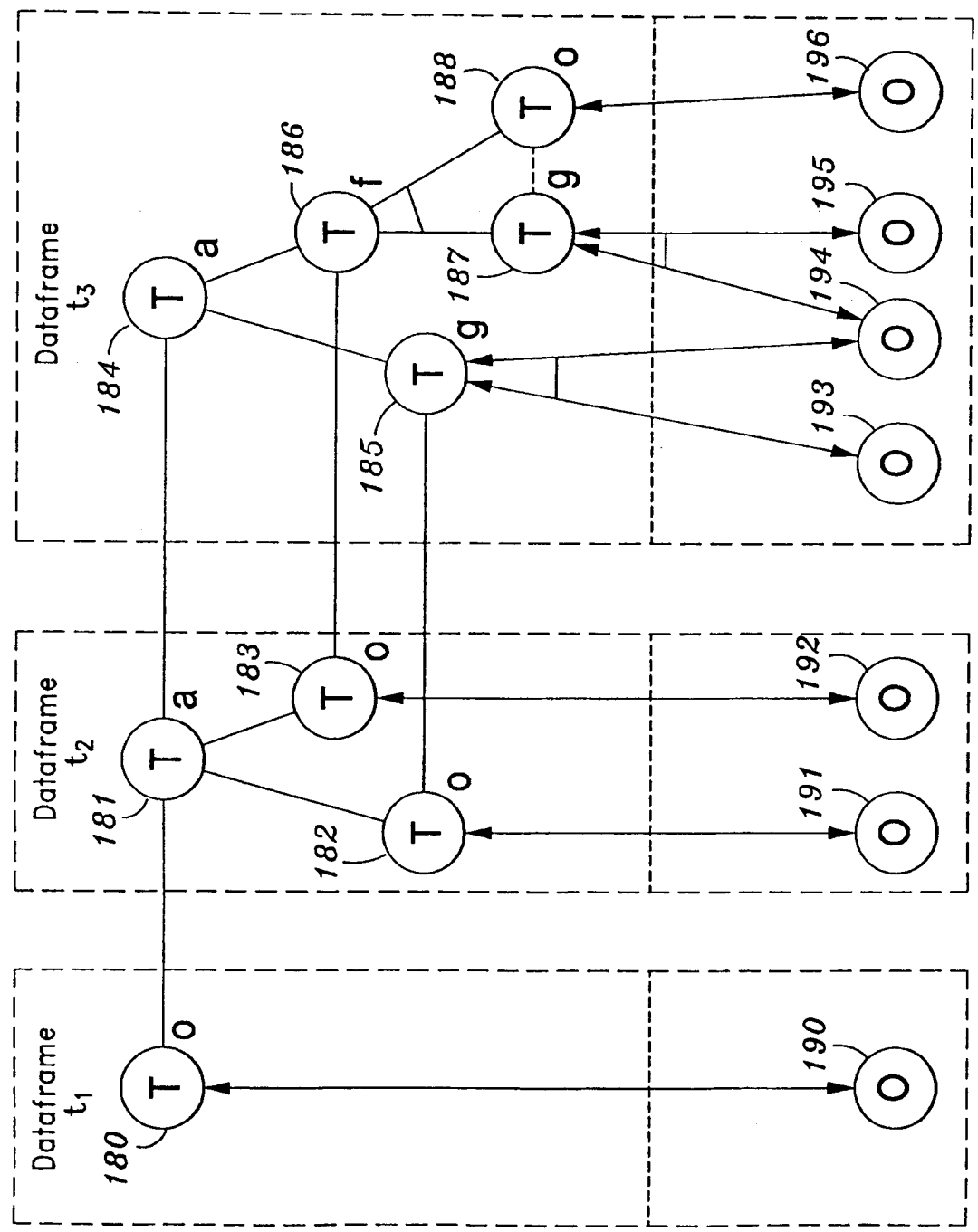
Figure 6:
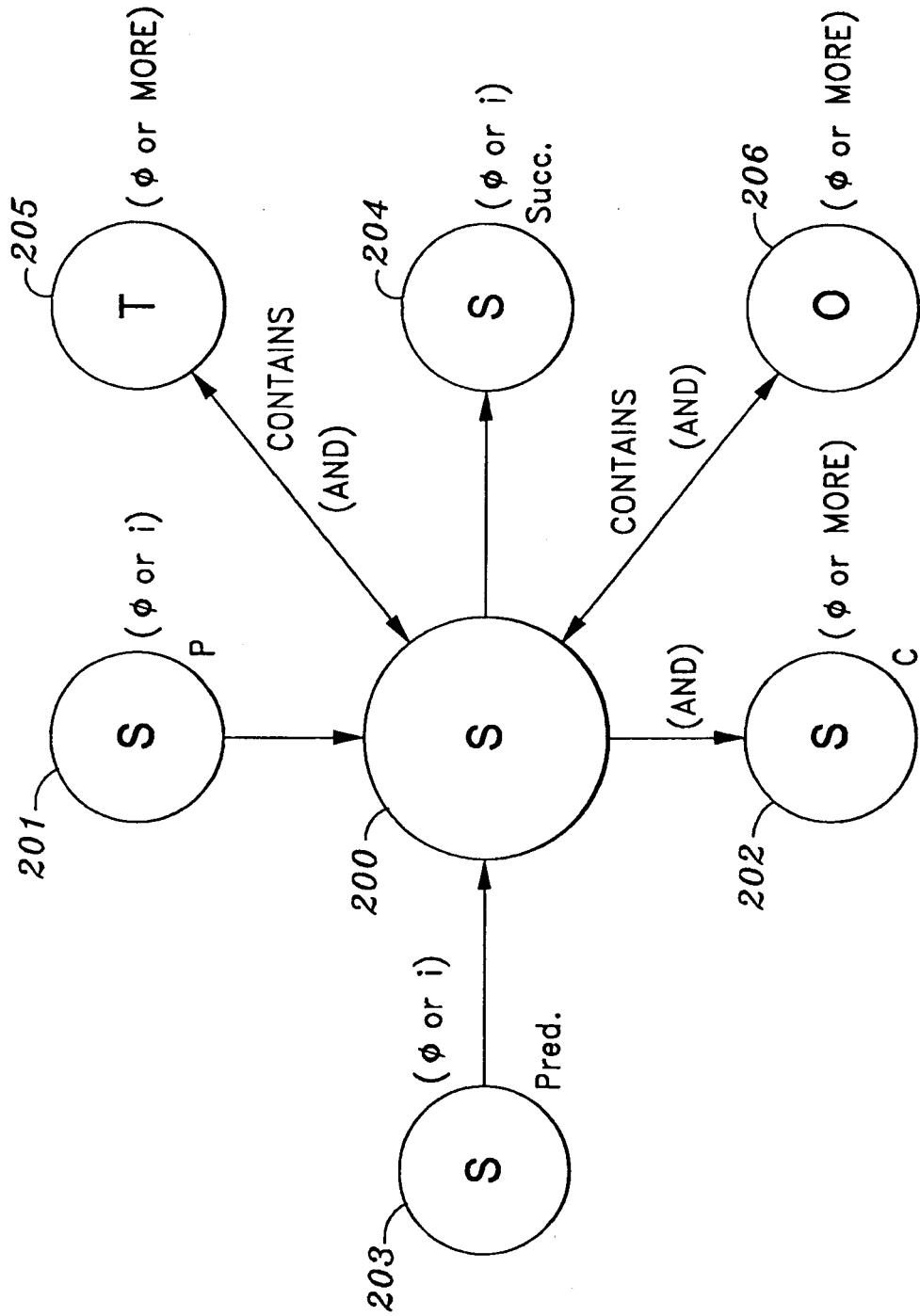
Figure 7:
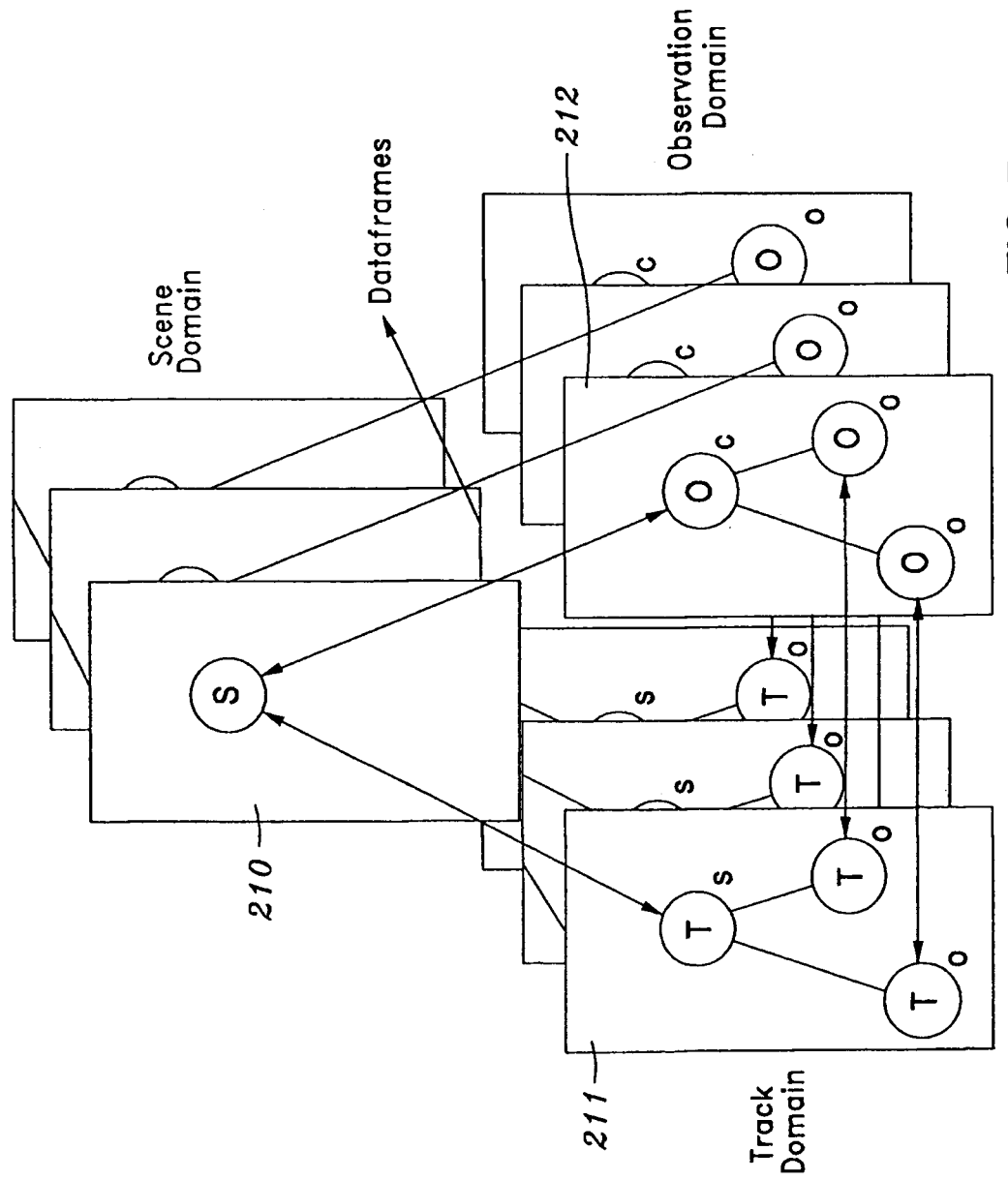
Figure 9:
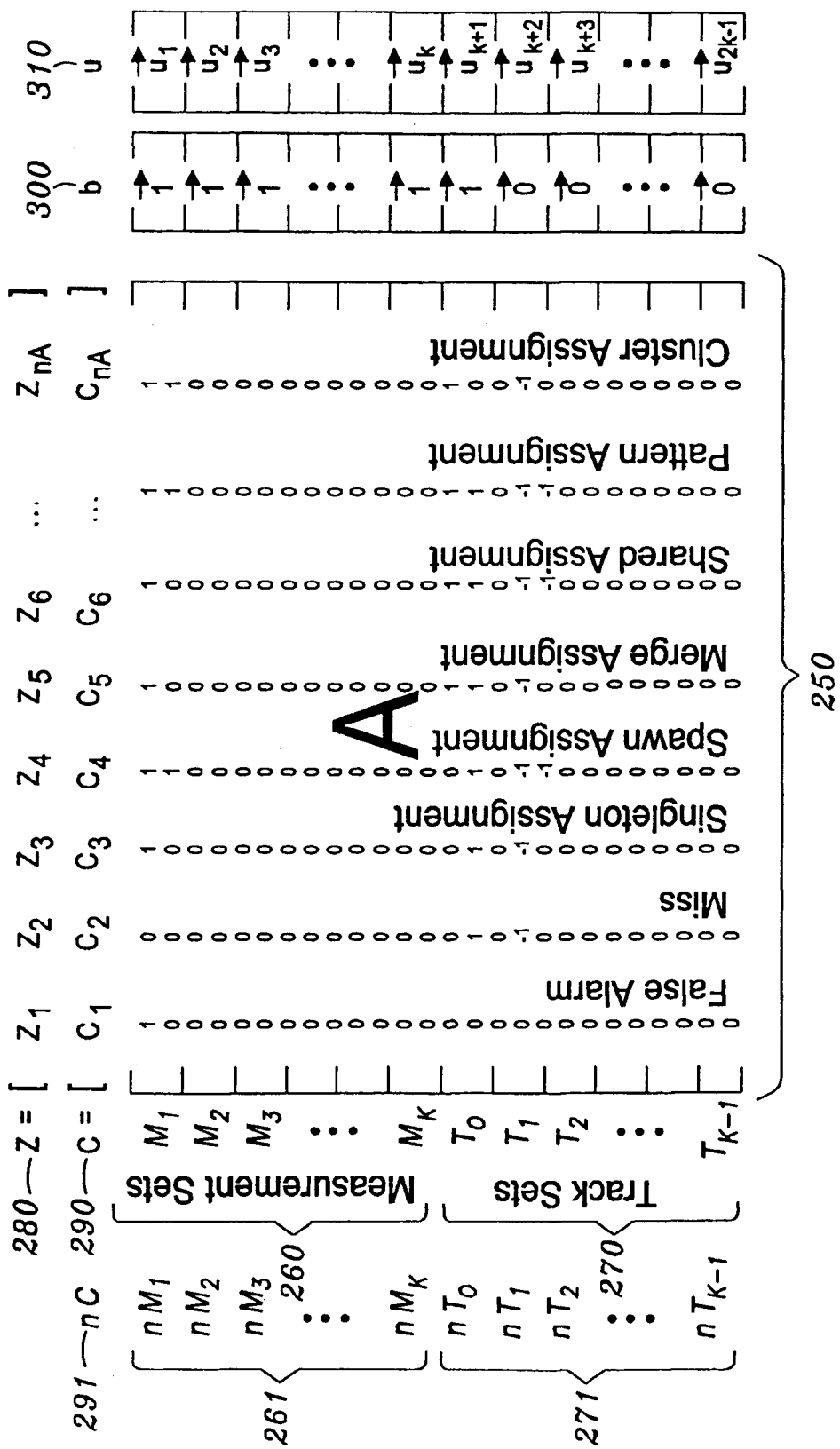
Figure 10:
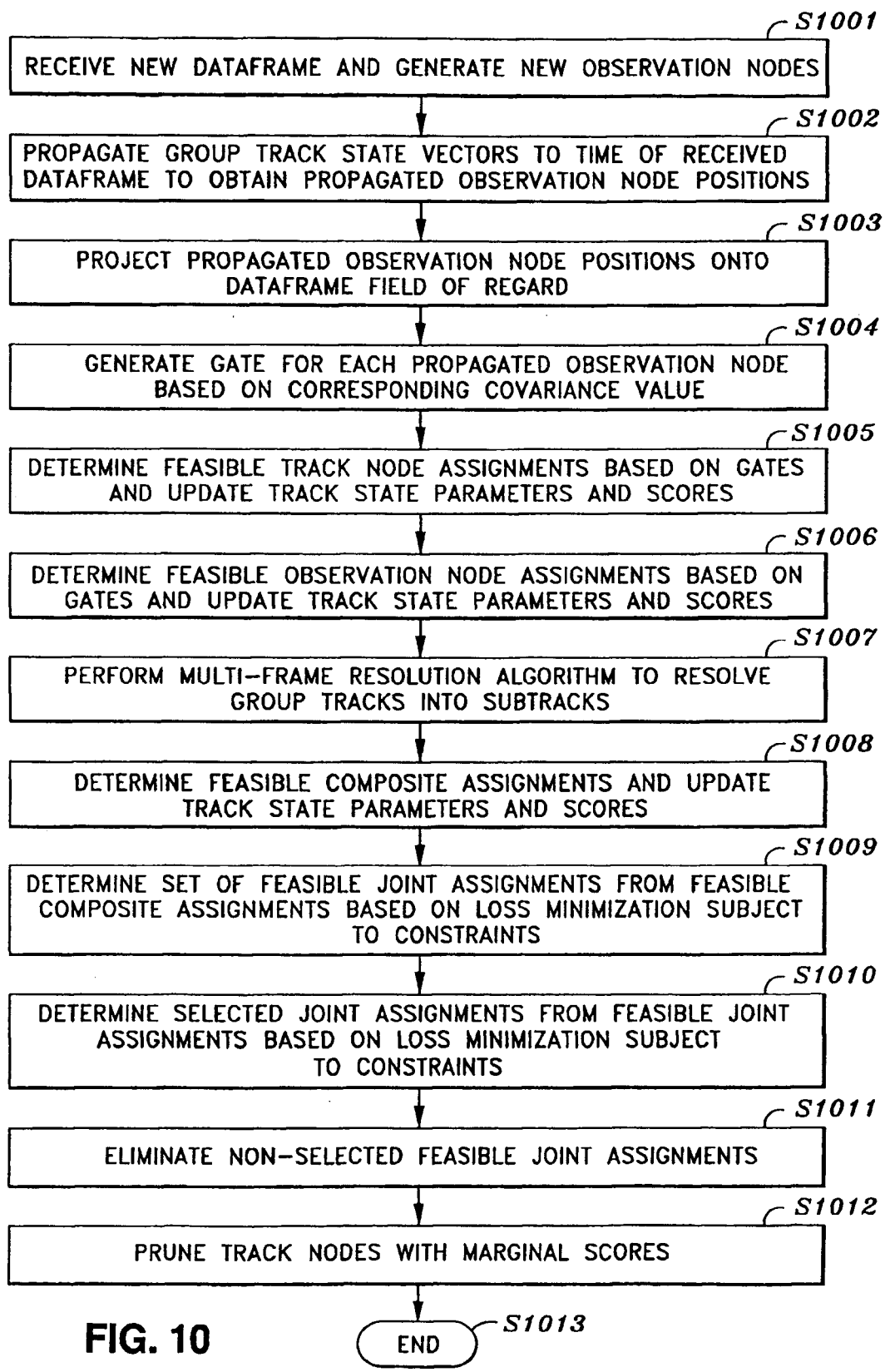
Figure 11:
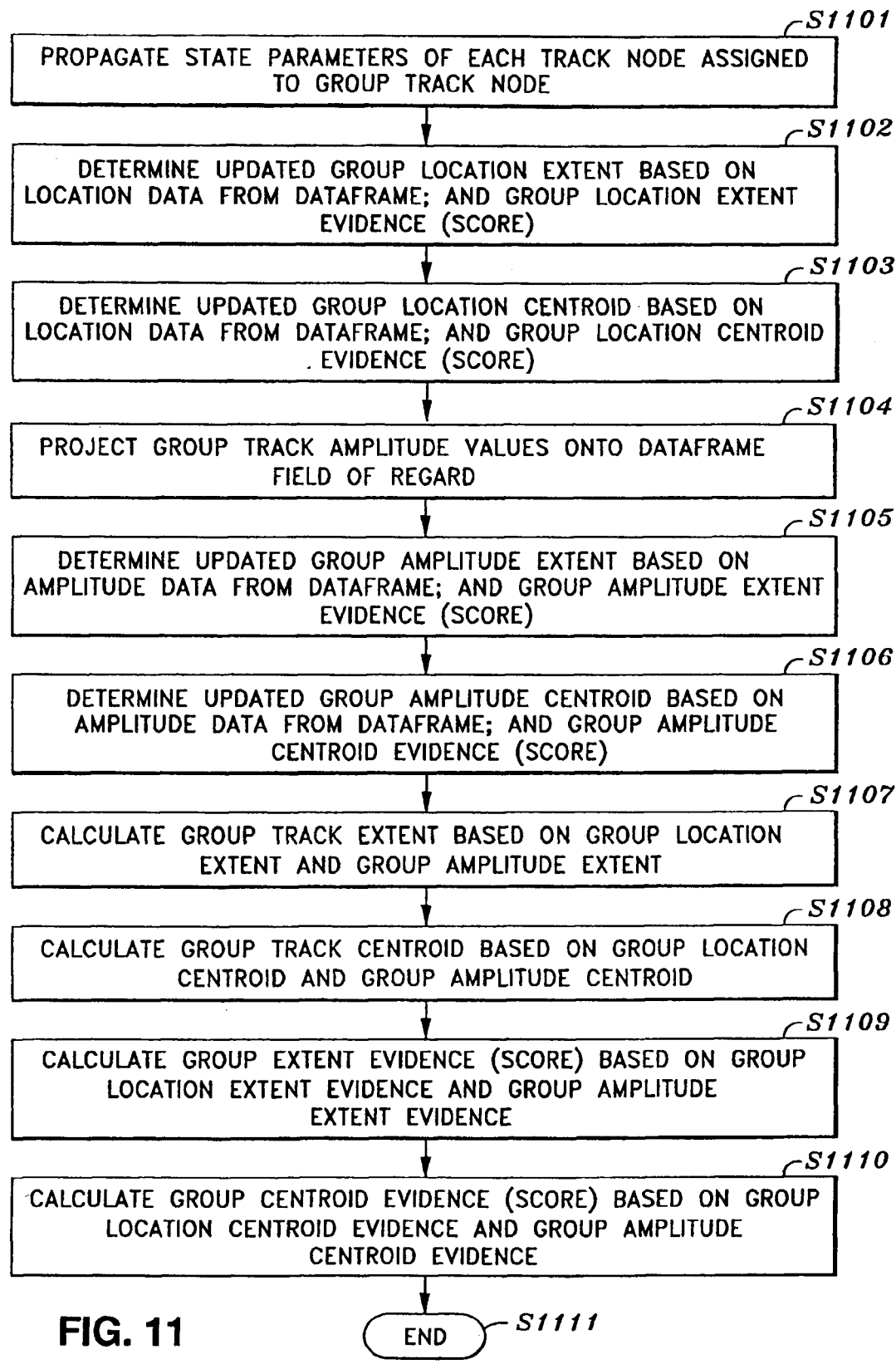
Figure 13:
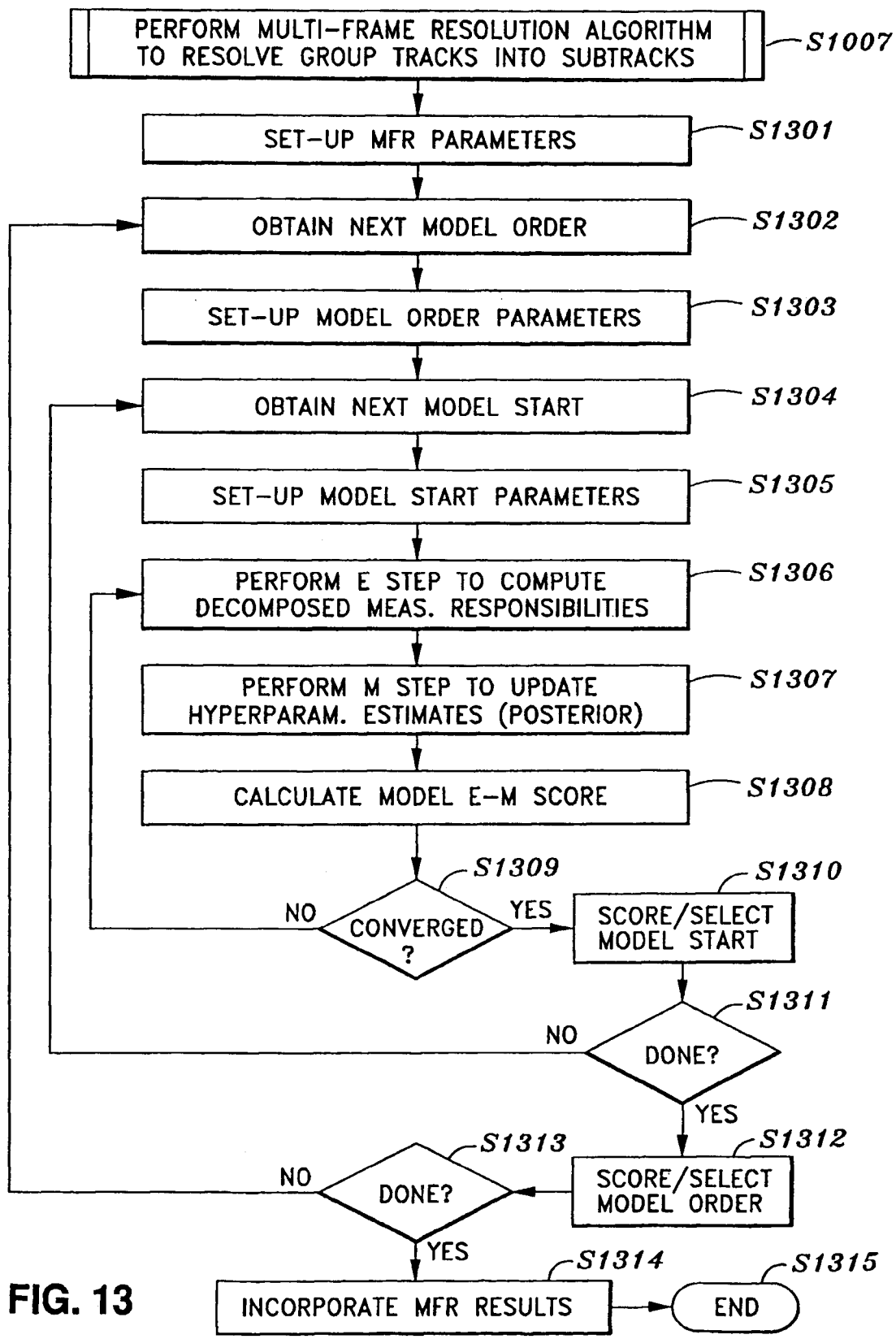
Figure 14:
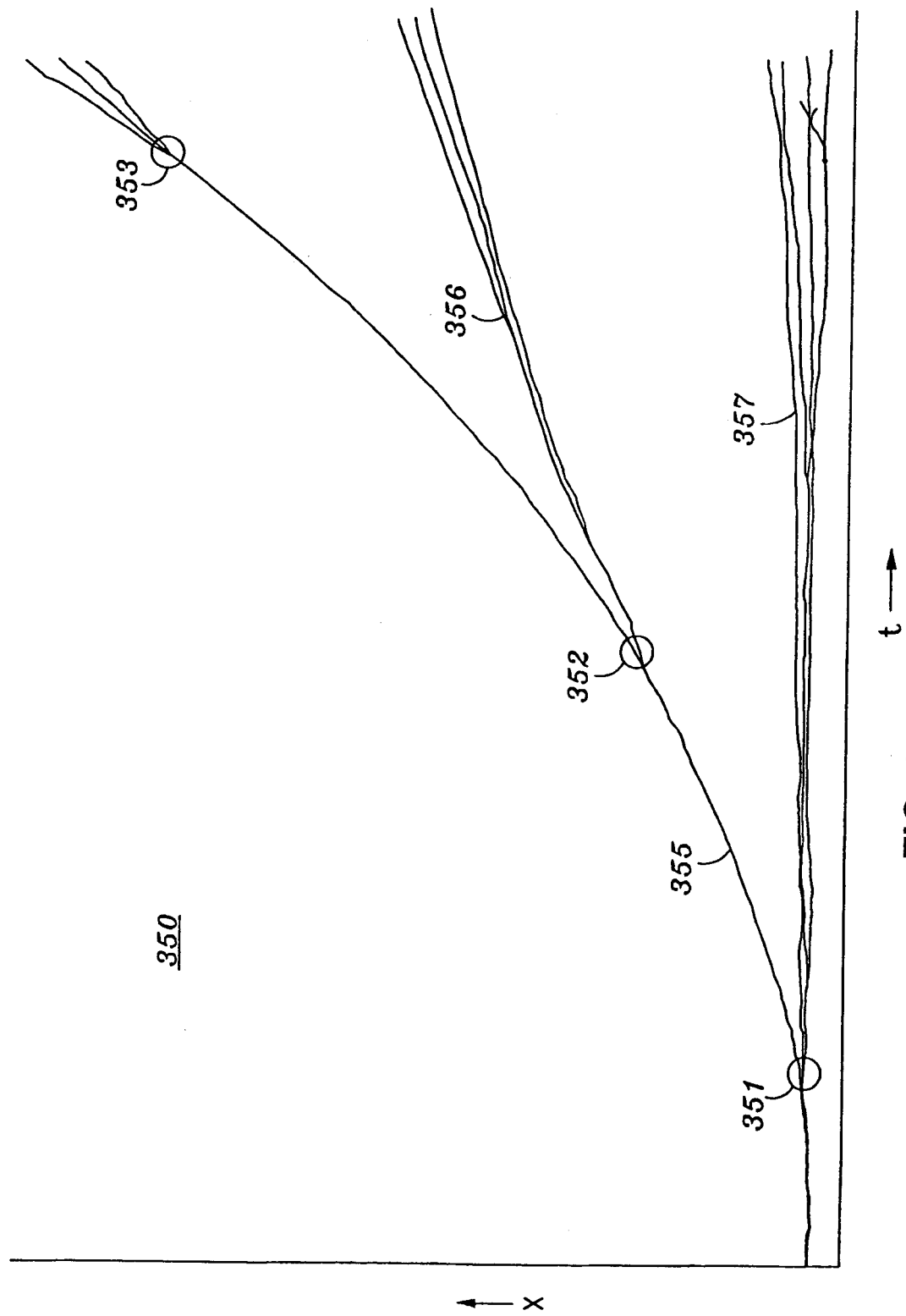
Figure 15:
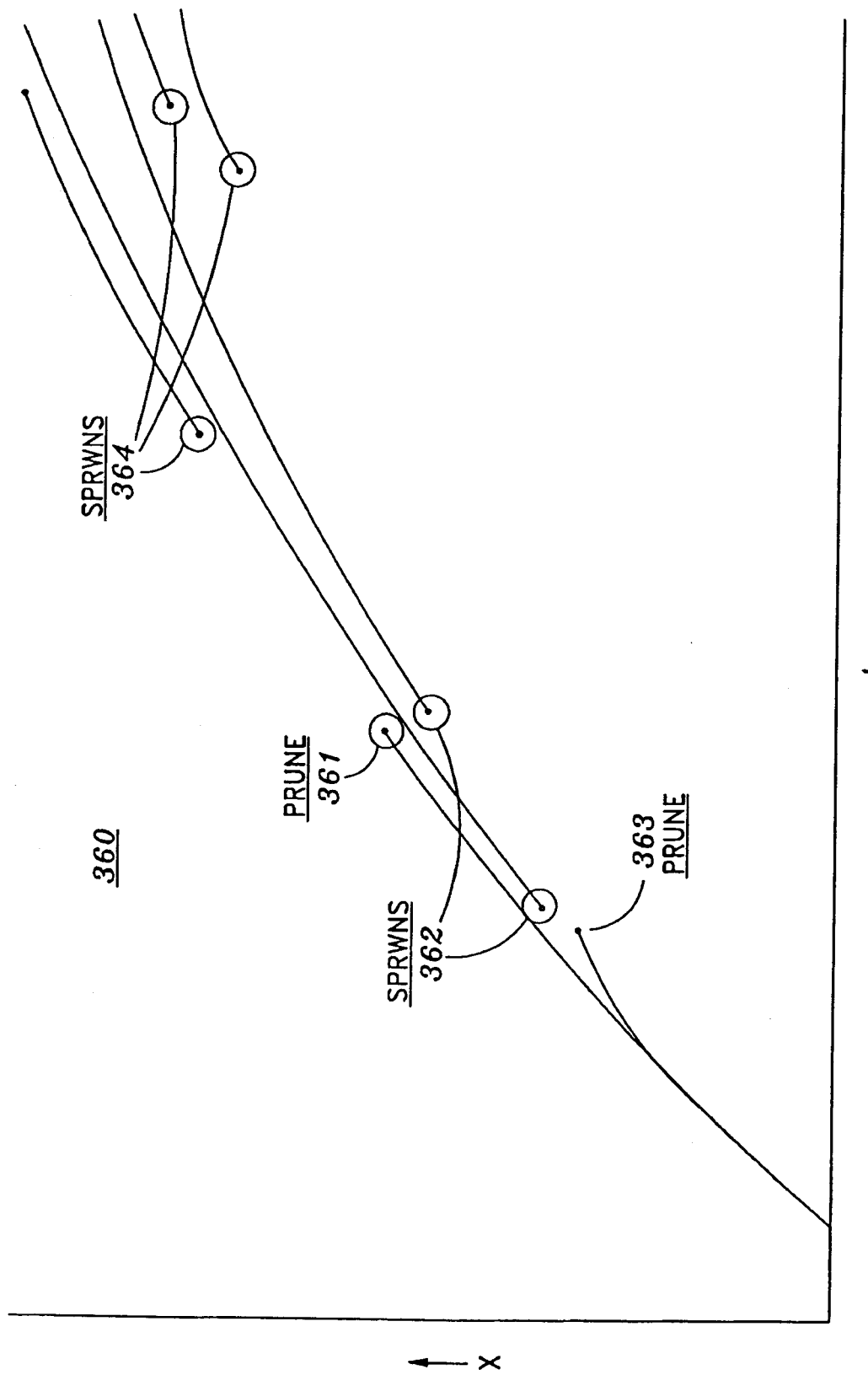

FIG. 14 depicts the tracking of a ballistic missile during the release of clusters of objects. As seen in FIG. 14, a general ballistic trajectory track 355 is shown for the ballistic missile, and release points 351, 352 and 353 represent points during the ballistic trajectory that the missile releases a cluster of objects. After each release point, it can be seen that the released cluster of objects is tracked as a group of tracks having an overall trajectory which departs from the ballistic trajectory of the missile, and then resolved into multiple tracks by the multi-frame resolution algorithm of the present invention. The resolution of group tracks becomes more distinct as the racked objects separate from each other during their trajectory. FIG. 15 depicts the spawning of new tracks and the pruning of tracks during tracking of a ballistic missile. As seen in FIG. 15, spawned tracks at points 362 and 364 depict new tracks which are children tracks of a previous track, where each spawned track is now resolved to be assigned to an observation node that used to be assigned to the previous track. Prune points 361 and 363 depict points at which previous tracks no longer become viable, such as when they have been resolved into more specific tracks by the multi-frame resolution algorithm of the present invention (e.g. spawns).

Accordingly, the arrangement of the present invention results in a system and method for tracking groups of objects in a coordinated fashion by maintaining estimates of state parameters for each group, the group state parameters being used to determine a set of joint assignments for all measured observables to tracks, and for all relationships among tracks. In addition, the present invention uses the signal strength of each measured object, in addition to location information, to estimate the state parameters of the group track, thereby making full use of the resolution capabilities of the detection sensors. The multi-frame resolution capability of the invention provides a further level of tracking resolution by constantly attempting to resolve group tracks into viable subtracks for more refined tracking of individual objects. The foregoing features of the present invention result in a more accurate tracking system which more quickly and accurately resolves the tracking of objects which are clustered in groups.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A system for performing random-set based cluster tracking of observable objects, the system comprising:
   a plurality of detection sensor devices, each of which generates a series of dataframes, each dataframe containing a timestamp and containing location data and amplitude data corresponding to each detected observable object in the dataframe;
   a tracking processor unit which receives dataframes from one or more of the detection sensor devices, the tracking processor unit including a memory and at least one processing unit, the memory storing scene nodes, track nodes and observation nodes, and also storing program steps for execution by the processing unit, the program steps including:
   an observation node generation step of generating a new observation node for each observable object location data contained in a received dataframe;
   a propagating step of propagating forward, to a time value of the timestamp, a set of state parameters of a group track node to obtain a set of posterior observable positions, a plurality of previously-generated track nodes being assigned to the group track node;
   a projecting step of projecting the posterior observable positions onto a field of regard of the received dataframe;
   a gate generation step of generating a gate for each posterior observable position and projecting each gate over each respective posterior observable position on the received dataframe;
   a feasible track assignment step of determining a set of feasible track assignments for the dataframe which correlate each one of a plurality of new track nodes to at least one of the new observation nodes based on the proximity of each new observation node to at least one of the gates over the posterior observable positions, updating a set of state parameters for each track node assigned to the group track node based on the determined set of feasible track assignments, and generating a probability score for the feasible track assignments;
   a feasible observation assignment step of determining a set of feasible observation assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments;
   a feasible composite assignment step of determining a set of feasible composite assignments for a composite set of track nodes and observation nodes which correspond to at least the received dataframe, updating a set of state parameters for each track node assigned to the group track node based on the determined set of feasible composite assignments, and generating a probability score for each feasible composite assignment based on the probability scores for the feasible track assignments and the feasible observation assignments corresponding to the track nodes and observation nodes in the composite set; and
   a joint assignment determination step of determining a set of joint assignments based on the set of feasible composite assignments and their respective probability scores by using a loss minimization algorithm and a set of constraints, the selected set of joint assignments including at least one of the feasible composite assignments.

2. A system according to claim 1, further comprising:
   a multi-frame resolution step of analyzing all group track nodes and resolving one or more of the group track nodes into one or more new track nodes, based on a set of group track parameters for each group track node, the parameters including a group track history, a group track probability score and a number of observation nodes assigned to the group track node.

3. A system according to claim 1, further comprising:
   a pruning step of pruning all track nodes by deleting selected track nodes, the selection being based on whether the probability score of each track node is below a predetermined marginal acore and on the application of a loss minimization algorithm to each track node.

4. A system according to claim 1, wherein, in the feasibility track assignment step, the feasibility observation assignment step and the feasibility composite assignment step, the update of the state parameters for all track nodes assigned to the group track node, and the generation of a probability score, include:
   a track node update step of updating the state parameters of each track node assigned to the group track node;
   a group track extent update step of determining an updated value of an extent for the group track node based on the location data corresponding to each observable object in the received dataframe and on a sensor resolution in the received dataframe;
   a group track centroid update step of determining an updated value of a centroid for the group track node based on the location data corresponding to each observable object in the received dataframe and on a sensor resolution in the received dataframe;
   a group track extend scoring step of determining an extent probabilty score for the group track node based on the group track extent; and
   a group track centroid scoring step of determining a centroid probability score for the group track node based on the group track centroid.

5. A system according to claim 4, wherein the group track extent update step further includes:
   a group location extent update step of determining an updated value of a location extent for the group track node based on the location data corresponding to each observable object in the received dataframe;
   a group amplitude extent update step of determining an updated value of an amplitude extent for the group track node based on the amplitude data corresponding to each observable object in the received dataframe; and a group track extent calculation step of calculating the group track extent based on the group location extent and the groupa mplitude extent, using separate weight factors for the group location extent and the group amplitude extent, respectively.

6. A system according to claim 5, wherein the group track extent scoring step further includes:
a group track location extent scoring step of determining a group location extent probability score for the group track node based on the group track location extent;
a group track amplitude extent scoring step of determining a group amplitude extent probability score for the group track node based on the group track amplitude extent; and
a group extent score calculation step of calculating the group extent probability score based on the group location extent probability score and the group amplitude extent probability, using separate weight factors for the group location extent probability score and the group amplitude extent probability score, respectively.

7. A system according to claim 4, wherein the group track centroid update step further includes:
a group location centroid update step of determining an updated value of a location centroid for the group track node based on the location data corresponding to each observable object in the received dataframe;
a group amplitude centroid update step of determining an updated value of an amplitude centroid for the group track node based on the amplitude data corresponding to each observable object in the received dataframe; and
a group track centroid calculation step of calculating the group track centroid based on the group location centroid and the group amplitude centroid, using separate weight factors for the group location centroid and the group amplitude centroid, respectively.

8. A system according to claim 7, wherein the group track centroid scoring step further includes:
a group track location centroid scoring step of determining a group location centroid probability score for the group track node based on the group track location centroid;
a group track amplitude centroid scoring step of determining a group amplitude centroid probability score for the group track node based on the group track amplitude centroid; and
a group centroid score calculation step of calculating the group centroid probability score based on the group location centroid probability score and the group amplitude centroid probability, using separate weight factors for the group location centroid probability score and the group amplitude centroid probability score, respectively.

9. A system according to claim 1, wherein the joint assignment determination step of determining a set of joint assignments further includes:
a feasible joint assignment determination step of determining a set of feasible joint assignments based on the set of feasible composite assignments and on the probability scores for the feasible composite assignments, the determination based on a posterior feasibility loss minimization algorithm subject to a set of feasibility resource constraints;
a joint assignment selection step of selecting a set of joint assignments from the set of feasible joint assignments based on a selection less minimization algorithm subject to a set of selection resource constraints; and an elimination step of eliminating each feasible joint assignment that was not selected in the joint assignment selection step.

10. A system according to claim 1, wherein the plurality of detection sensor devices are respectively mounted on a plurality of platforms.

11. A system according to claim 10, wherein the plurality of platforms are a plurality of satellites, each of which is positioned in an earth orbit.

12. A system according to claim 10, wherein at least two detection sensors are included in each detection sensor device.

13. A system according to claim 12, wherein the at least two detection sensors include an infrared (IR) detection sensor and a radio frequency (RF) detection sensor.

14. A system according to claim 1, wherein, in the projecting step, the posterior observable positions are transformed from an earth-based coordinate system to a sensor-based coordinate system that corresponds to the detection sensor which generated the received dataframe.

15. A system according to claim 1, wherein, in the gate generation step, the generation of each gate is based on a covariance value of the respective posterior observable positions.

16. A system according to claim 1, wherein the tracking processor unit comprises a plurality of processors.

17. A system according to claim 1, wherein the plurality of processors are distributed over a plurality of platforms.

18. A method for performing random-set based cluster tracking of observable objects in a system having a plurality of detection sensor devices, each of which generates a series of dataframes, and a tracking processor unit which receives dataframes from one or more of the detection sensor devices, the method comprising:
a receiving step of receiving a dataframe from one of the detection sensor devices, the dataframe including a timestamp, and location data and amplitude data corresponding to each detected observable object in the dataframe;
an observation node generation step of generating a new observation node for each observable object location data contained in the received dataframe;
a propagating step of propagating forward, to a time value of the timestamp, a set of state parameters of a group track node to obtain a set of posterior observable positions, a plurality of previously-generated track nodes being assigned to the group track node;
a projecting step of projecting the posterior observable positions onto a field of regard of the received dataframe;
a gate generation step of generating a gate for each posterior observable position and projecting each gate over each respective posterior observable position on the received dataframe;
a feasible track assignment step of determining a set of feasible track assignments for the dataframe which correlate each one of a plurality of new track nodes to at least one of the new observation nodes based on the proximity of each new observation node to at least one of the gates over the posterior observable positions, updating a set of state parameters for each track node assigned to the group track node based on the determined set of feasible track assignments, and generating a probability score for the feasible track assignments;
a feasible observation assignment step of determining a set of feasible observaiton assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments;

a feasible composite assignment step of determining a set of feasible composite assignments for a composite set of track nodes and observation nodes which correspond to at least the received dataframe, updating a set of state parameters for each track node assigned to the group track node based on the determined set of feasible composite assignments, and generating a probability score for each feasible composite assignment based on the probability scores for the feasible track assignments and the feasible observation assignments corresponding to the track nodes and observation nodes in the composite set; and a joint assignment determination step of determining a set of joint assignments based on the set of feasible composite assignments and their respective probability scores by using a loss minimization algorithm and a set of constraints, the selected set of joint assignments including at least one of the feasible composite assignments.

19. A method according to claim 18, further comprising:
a multi-frame resolution step of analyzing all group track nodes and resolving one or more of the group track nodes into one or more new track nodes, based on a set of group track parameters for each group track node, the parameters including a group track history, a group track probability score and a number of observation nodes assigned to the group track node.

20. A method according to claim 18, further comprising:
a pruning step of pruning all track nodes by deleting selected track nodes, the selection being based on whether the probability score of each track node is below a predetermined marginal score and on the application of a minimum loss algorithm to each track node.

21. A method according to claim 18, wherein, in the feasibility track assignment step, the feasible observation assignment step and the feasibility composite assignment step, the update of the state parameters for all track nodes assigned to the group track node, and the generation of a probability score, include:
a track node update step of updating the state parameters of each track node assigned to the group track node;
a group track extent update step of determining an updated value of an extent for the group track node based on the location data corresponding to each observable object in the received dataframe and on a sensor resolution in the received dataframe;
a group track centroid update step of determining an updated value of a centroid for the group track node based on the location data corresponding to each observable object in the received dataframe and on a sensor resolution in the received dataframe;
a group track extent scoring step of determining an extent probability score for the group track node based on the group track extent; and
a group track centroid scoring step of determining a centroid probability score for the group track node based on the group track centroid.

22. A method according to claim 21, wherein the group track extent update step further includes:
a group location extent update step of determining an updated value of a location extent for the group track node based on the location data corresponding to each observable object in the received dataframe;
a group amplitude extent update step of determining an updated value of an amplitude extent for the group track node based on the amplitude data corresponding to each observable object in the received dataframe; and
a group track extent calculation step of calculating the group track extent based on the group location extent and the group amplitude extent, using separate weight factors for the group location extent and the group amplitude extent, respectively.

23. A method according to claim 22, wherein the group track extent scoring step further includes:
a group track location extent scoring step of determining a group location extent probability score for the group track node based on the group track location extent;
a group track amplitude extent scoring step of determining a group amplitude extent probability score for the group track node based on the group track amplitude extent; and
a group extent score calculation step of calculating the group extent probability score based on the group location extent probability score and the group amplitude extent probability, using separate weight factors for the group location extent probability score and the group amplitude extent probability score, respectively.

24. A method according to claim 21, wherein the group track centroid update step further includes:
a group location centroid update step of determining an updated value of a location centroid for the group track node based on the location data corresponding to each observable object in the received dataframe;
a group amplitude centroid update step of determining an updated value of an amplitude centroid for the group track node based on the amplitude data corresponding to each observable object in the received dataframe; and
a group track centroid calculation step of calculating the group track centroid based on the group location centroid and the group amplitude centroid, using separate weight factors for the group location centroid and the group amplitude centroid, respectively.

25. A method according to claim 24, wherein the group track centroid scoring step further includes:
a group track location centroid scoring step of determining a group location centroid probability score for the group track node based on the group track location centroid;
a group track amplitude centroid scoring step of determining a group amplitude centroid probability score for the group track node based on the group track amplitude centroid; and
a group centroid score calculation step of calculating the group centroid probability score based on the group location centroid probability score and the group amplitude centroid probability, using separate weight factors for the group location centroid probability score and the group amplitude centroid probability score, respectively.

26. A method according to claim 18, wherein the joint assignment determination step of determining a set of joint assignments further includes:
- a feasible joint assignment determination step of determining a set of feasible joint assignments based on the set of feasible composite assignments and on the probability scores for the feasible composite assignments, the determination based on a posterior feasibility loss minimization algorithm subject to a set of feasibility resource constraints;
- a joint assignment selection step of selecting a set of joint assignments from the set of feasible joint assignments based on a selection loss minimization algorithm subject to a set of selection resource constraints; and
- an elimination step of eliminating each feasible joint assignment that was not selected in the joint assignment selection step.

27. A method according to claim 18, wherein the plurality of detection sensor devices are respectively mounted on a plurality of platforms.

28. A method according to claim 27, wherein the plurality of platforms are a plurality of satellites, each of which is positioned in an earth orbit.

29. A method according to claim 27, wherein at least two detection sensors are included in each detection sensor device.

30. A method according to claim 29, wherein the at least two detection sensors include an infrared (IR) detection sensor and a radio frequency (RF) detection sensor.

31. A method according to claim 18, wherein, in the projecting step, the posterior observable positions are transformed from an earth-based coordinate system to a sensor-based coordinate system that corresponds to the detection sensor which generated the received dataframe.

32. A method according to claim 18, wherein, in the gate generation step, the generation of each gate is based on a covariance value of the respective posterior observable position.

33. A method according to claim 18, wherein the tracking processor unit comprises a plurality of processors.

34. A method according to claim 33, wherein the plurality of processors are distributed over a plurality of platforms.

35. A system for performing random-set based cluster tracking of observable objects, the system comprising:
- a plurality of detection sensor means, each sensor means for generating a series of dataframes;
- tracking processor means which receives dataframes from one or more of the detection sensor devices;
- receiving means for receiving a dataframe from one of the detection sensor devices, the dataframe including a timestamp, and location data and amplitude data corresponding to each detected observable object in the dataframe;
- observation node generation means for generating a new observation node for each observable object location data contained in the received dataframe;
- propagating means for propagating forward, to a time value of the timestamp, a set of state parameters of a group track node to obtain a set of posterior observable positions, a plurality of previously-generated track nodes being assigned to the group track node;
- projecting means for projecting the posterior observable positions onto a field of regard of the received dataframe;
- gate generation means for generating a gate for each posterior observable position and projecting each gate over each respective posterior observable position on the received dataframe;
- feasible track assignment means for determining a set of feasible track assignments for the dataframe which correlate each one of a plurality of new track nodes to at least one of the new observation nodes based on the proximity of each new observation node to at least one of the gates over the posterior observable positions, updating a set of state parameters for each track node assigned to the group track node based on the determined set of feasible track assignments, and generating a probability score for the feasible track assignments;
- feasible observation assignment means for determining a set of feasible observation assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments;
- feasible composite assignment means for determining a set of feasible composite assignments for a composite set of track nodes and observation nodes which correspond to at least the received dataframe, updating a set of state parameters for each track node assigned to the group track node based on the determined set of feasible composite assignments, and generating a probability score for each feasible composite assignment based on the probability scores for the feasible track assignments and the feasible observation assignments corresponding to the track nodes and observation nodes in the composite set; and
- joint assignment determination means for determining a set of joint assignments based on the set of feasible composite assignments and their respective probability scores by using a loss minimization algorithm and a set of constraints, the selected set of joint assignments including at least one of the feasible composite assignments.

* * * * *

UNITED STATES PATENT AND TRADEMARK OFFICE
CERTIFICATE OF CORRECTION

PATENT NO.        : 7,193,557 B1
APPLICATION NO.   : 10/835968
DATED             : March 20, 2007
INVENTOR(S)       : Kovacich et al.

It is certified that error appears in the above-identified patent and that said Letters Patent is hereby corrected as shown below:

Please delete patent 7,193,557 in its entirety and insert patent 7,193,557 in its entirety as attached.

Signed and Sealed this
Twelfth Day of June, 2012

David J. Kappos
*Director of the United States Patent and Trademark Office*

(12) United States Patent
Kovacich et al.

(10) Patent No.: US 7,193,557 B1
(45) Date of Patent: Mar. 20, 2007

(54) RANDOM SET-BASED CLUSTER TRACKING

(75) Inventors: Michael A. Kovacich, Fremont, CA (US); Thomas R. Casaletto, Lake Barrington, IL (US)

(73) Assignee: Lockheed Martin Corporation, Bethesda, MD (US)

( * ) Notice: Subject to any disclaimer, the term of this patent is extended or adjusted under 35 U.S.C. 154(b) by 205 days.

(21) Appl. No.: 10/835,968

(22) Filed: Apr. 29, 2004

Related U.S. Application Data

(60) Provisional application No. 60/466,817, filed on Apr. 29, 2003.

(51) Int. Cl.
    *G01S 13/66* (2006.01)
(52) U.S. Cl. ............... 342/89; 342/90; 342/95; 342/96; 342/97; 342/107; 342/108; 342/189; 342/195
(58) Field of Classification Search ............ 342/89–99, 342/107, 108, 115, 189, 194, 195
    See application file for complete search history.

(56) References Cited

U.S. PATENT DOCUMENTS

| | | | | |
|---|---|---|---|---|
| 4,891,762 A | * | 1/1990 | Chotiros | 701/223 |
| 5,341,142 A | * | 8/1994 | Reis et al. | 342/64 |
| 5,379,044 A | * | 1/1995 | Carlson et al. | 342/90 |
| 5,381,150 A | * | 1/1995 | Hawkins et al. | 342/13 |
| 5,414,643 A | * | 5/1995 | Blackman et al. | 342/95 |
| 5,626,311 A | * | 5/1997 | Smith et al. | 244/3.16 |
| 5,798,942 A | * | 8/1998 | Danchick et al. | 342/96 |
| 5,947,413 A | * | 9/1999 | Mahalanobis | 244/3.17 |
| 6,229,475 B1 | * | 5/2001 | Woolley | 342/93 |

FOREIGN PATENT DOCUMENTS

| | | | |
|---|---|---|---|
| JP | 2000206236 A | * | 7/2000 |
| JP | 2003130948 A | * | 5/2003 |

OTHER PUBLICATIONS

"An algorithm for tracking multiple targets", Reid, D.; IEEE Transactions on Automatic Control, Vol. 24, Issue 6, Dec. 1979 pp. 843-854.*

\* cited by examiner

*Primary Examiner* — John B. Sotomayor
(74) *Attorney, Agent, or Firm* — McDermott Will & Emery LLP

(57) ABSTRACT

Tracking objects by receiving a dataframe from a detection sensor device, the dataframe containing a timestamp and data corresponding to each detected object, generating new observation nodes for each detected object, propagating group track state parameters to obtain posterior observable positions and projecting them onto the received dataframe, generating gates for the posterior observable positions and projecting them onto the received dataframe, determining feasible track node and feasible observation node assignments based on the proximity of the new observation nodes to the gates, updating track node state parameters and corresponding scores, performing a multi-frame resolution algorithm to resolve group track nodes into subtrack nodes, determining a set of feasible composite assignments for composite sets of track nodes and observation nodes, updating track node state parameters and corresponding scores, and determining a selected set of joint assignments based on the feasible composite assignments and their respective scores.

35 Claims, 16 Drawing Sheets

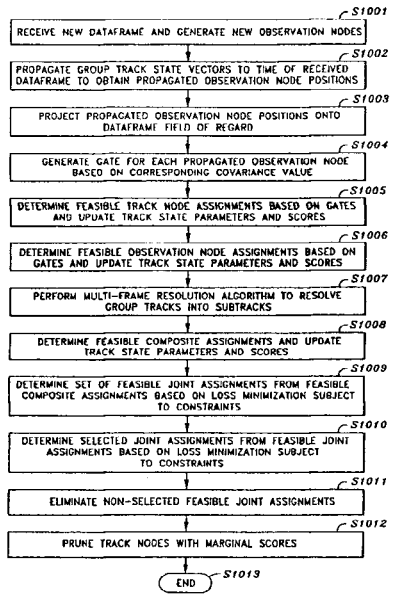

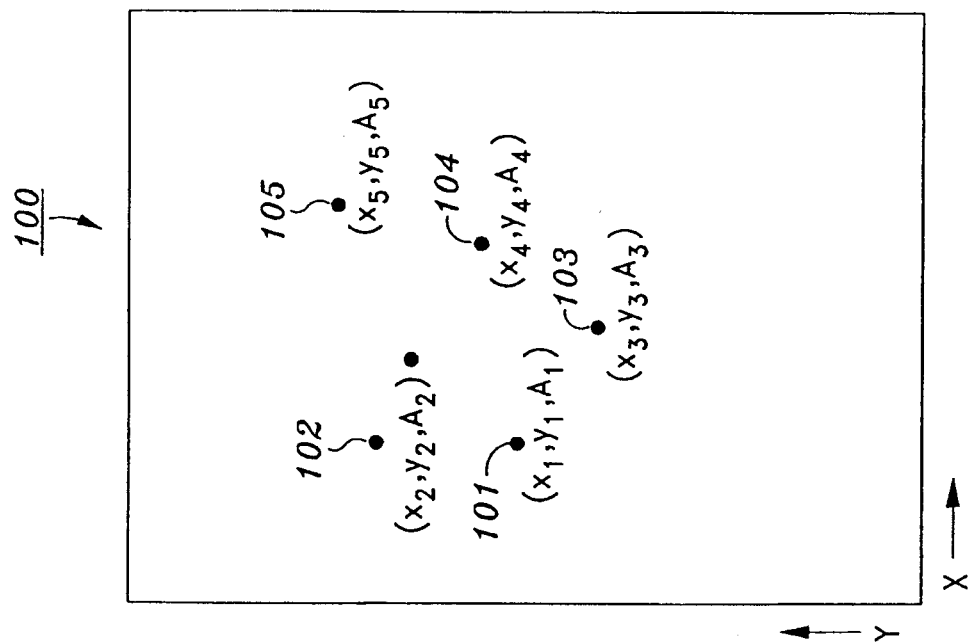

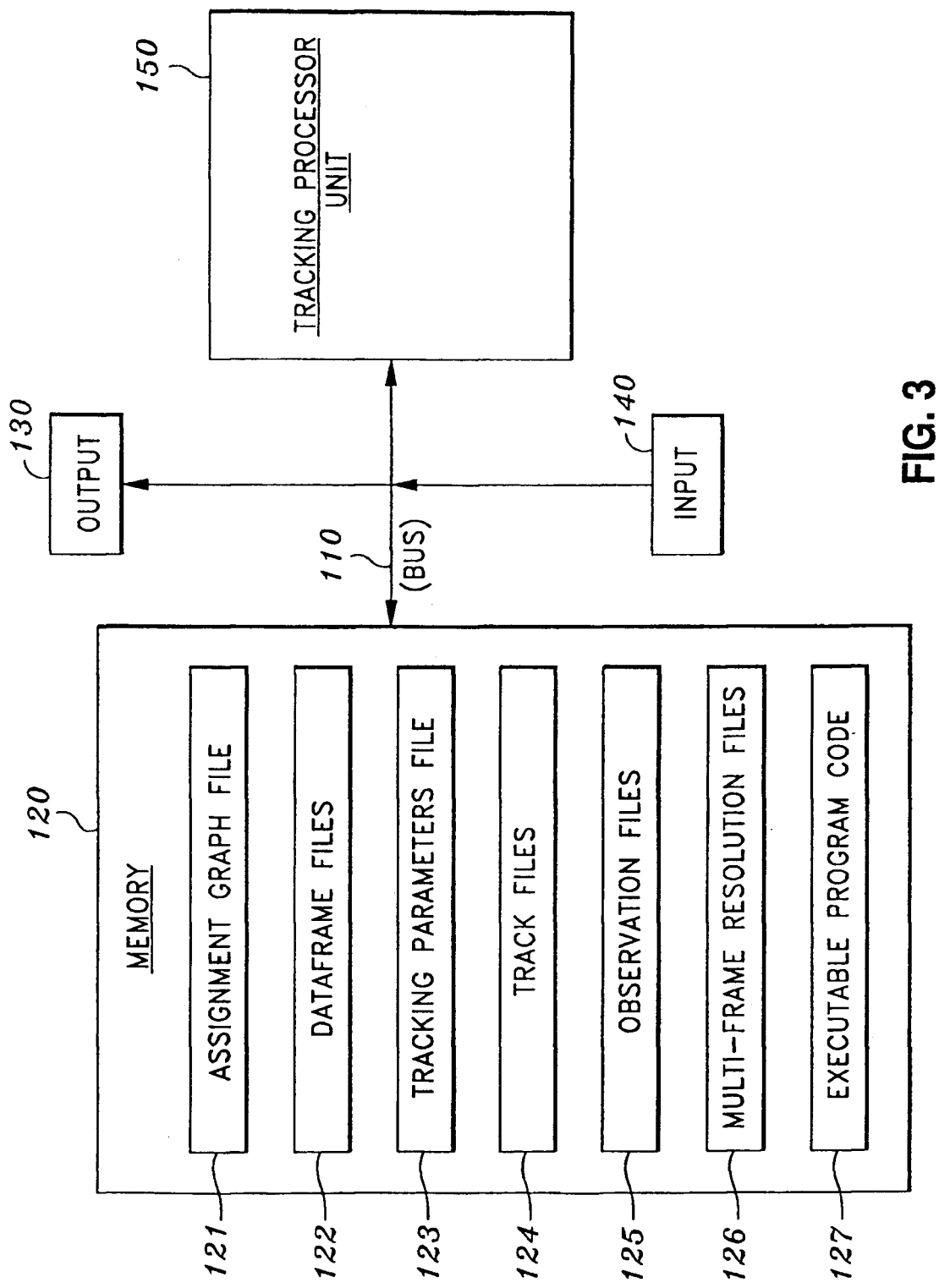

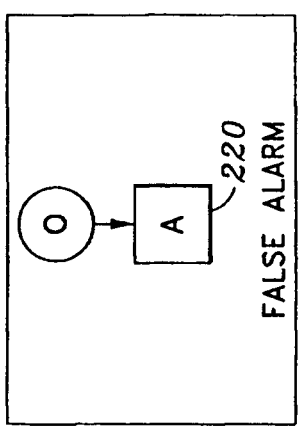
FIG. 8A FALSE ALARM
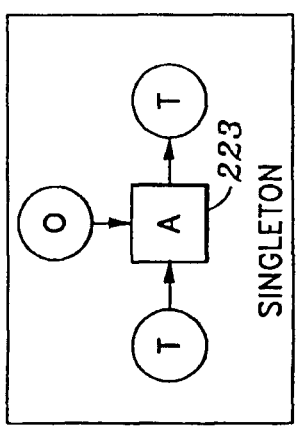
FIG. 8D SINGLETON
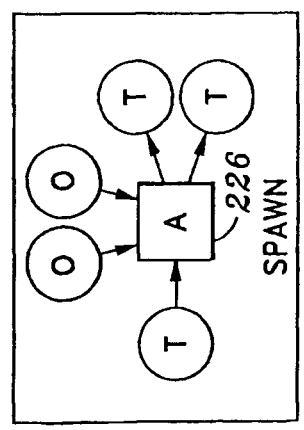
FIG. 8G SPAWN
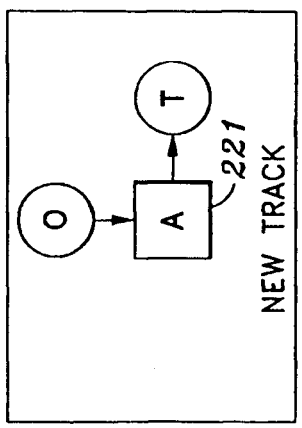
FIG. 8B NEW TRACK
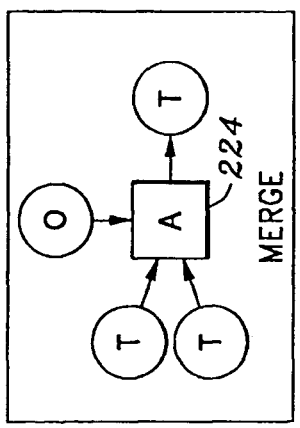
FIG. 8E MERGE
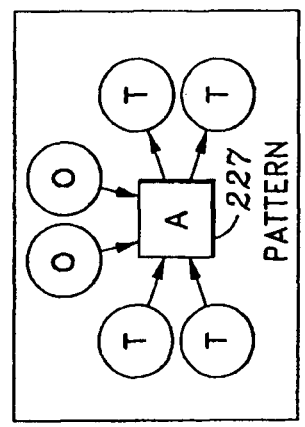
FIG. 8H PATTERN
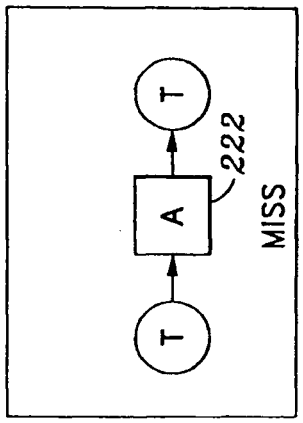
FIG. 8C MISS
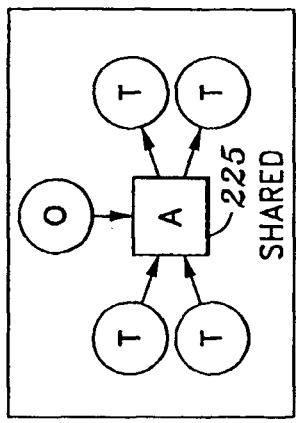
FIG. 8F SHARED
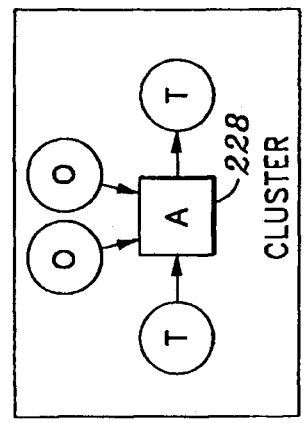
FIG. 8I CLUSTER

FIG. 12

*126*

401 MFRModel
- Leaf Track
- Base Track
- Parameters
- Marginal Likelihood
- DataframeSet
- Order Model Set

402 OrderModel
- Order ID
- Model Order
- Apriori Probability
- Posteriori Probability
- Marginal Likelihood
- Number of Starts
- ModelSet

403 Model
- Start ID
- Order ID
- Iteration Number
- Apriori Probability
- Posteriori Probability
- Marginal Likelihood
- Initial Marginal Likelihood
- Previous Marginal Likelihood
- Current Marginal Likelihood
- Initial Hyperparameters
- Subgroup Model Set

404 Subgroup Model
- Subgroup ID
- Decomposed Measurement Responsibility Set
- Decomposed Measurement Stats by Frame
- Decomposed Pseudo-Meas Stats by Frame
- Decomposed Pseudo-Meas Stats
- Previous Posterior Hyperparameters
- Current Posterior Hyperparameters

405 Dataframe
- Platform ID
- Sensor ID
- DataFrame ID
- Time
- Number of Measurements
- Measurement Set
- Number of Pseudo-Measurements
- Pseudo-Measurement Set
- Sensor State
- E2S Rotation Matrix

406 Measurement
- Platform ID
- Sensor ID
- Dataframe ID
- Time
- Location
- Location Covariance
- Amplitude
- Amplitude Covariance
- Extent
- Mean Object Count

407 Decomposed Measurement
- Platform ID
- Sensor ID
- Dataframe ID
- Measurement ID
- Time
- Location
- Location Covariance
- Amplitude
- Amplitude Covariance
- Extent
- Mean Object Count

408 Hyperparameters
- Time
- Dirichlet Parameters
- Effective Counts for Mean
- Mean
- Effective Counts for Extent
- Extent

RANDOM SET-BASED CLUSTER TRACKING

CROSS-REFERENCES AND RELATED APPLICATIONS

This application claims priority to U.S. Provisional Application No. 60/466,817, filed on Apr. 29, 2003, and entitled "RANDOM SET-BASED CLUSTER TRACKING", which is herein incorporated by reference in its entirety for all purposes.

STATEMENT AS TO RIGHTS TO INVENTIONS MADE UNDER FEDERALLY SPONSORED RESEARCH OR DEVELOPMENT

NOT APPLICABLE TO THIS INVENTION.

BACKGROUND OF THE INVENTION

1. Field of the Invention

The present invention concerns a method and system for tracking clusters of objects based on a random set-based algorithm. More specifically the invention concerns performing random-set based cluster tracking of observable objects in a system having a plurality of detection sensor devices and a tracking processor unit, wherein a group of random objects (cluster) is tracked by utilizing group tracks, each group track having multiple tracks assigned to it for tracking multiple objects. A set of state parameters are maintained for the group track and when a new dataframe is received from one of the detection sensor devices, the state parameters are propagated forward in time to correspond to time of the dataframe measurements, and the propagated results are used to determine all feasible object and track assignments for the measured objects in the dataframe. Each group track is analyzed to resolve it into subtracks, if possible, and a joint assignment problem is solved to select the best set of track assignments.

2. Description of the Related Art

Tracking systems are used in a variety of capacities. In one use, tracking systems are used for monitoring airspace and space over a given geographic region of the earth for the presence of ballistic objects, such as missiles and missile warheads, and also space-borne objects, such as satellites. Such known systems can be implemented on multiple aircraft or satellites in a distributed fashion so as to provide sufficient tracking coverage over the given geographic region.

It can be appreciated that such tracking systems must be reliable and reasonably accurate in order to be of value when used for purposes such as national defense against a missile attack. In known systems, multiple platforms, such as satellites, are positioned in orbit, wherein each satellite has one or more sensors onboard which are directed at the desired portion of earth. When a sensor detects an object within its field of view, data is generated corresponding to the position of the object with respect to the sensor. Typically, the position data from all sensors in the tracking system is processed on a frequent basis, either by a common processor on a satellite or on earth, or by several processors distributed among the satellites. The path of the tracked object, as well as other pertinent information about the object, can then be used in a monitoring system, and/or provided to an anti-missile system which can attempt to destroy the object.

Many known tracking systems are designed to track a single type of object by positively identifying the object on a constant basis, and then tracking its movement by comparing location data of the object from one sensor reading to the next. These systems can be inadequate in a missile tracking system, because missiles can have the capability to release large numbers of decoy objects in addition to warheads, in an effort to confuse the defensive tracking system. Such decoys include balloons, chaff, and other clutter which can be released in large numbers at once to form clusters. In addition, a group of warheads may be released at the same time in a cluster. In such situations, known tracking systems may become unable to distinguish between the objects in the cluster, and are then unable to determine a track for each object from one sensor reading to the next.

Some existing tracking systems implement tracking methods which attempt to track clusters of objects based on the location information provided by the sensors, however the sensor location information can vary in quality from one sensor to the next. This is because each sensor may have a different resolution level due to the individual sensor characteristics, and due to the relative position of the sensor to the object being measured. Accordingly, object location data that shows up in one sensor reading may not appear in the next sensor reading, thereby resulting in an inability to track the objects in the cluster. In addition, known tracking systems are not believed to address the random nature of the relative movement of the objects within a cluster, whereby some objects may appear as one for a while, and whereby some objects may appear as two separate objects, from one sensor reading to the next. The aforementioned problems result in inadequate tracking of the objects in the cluster, thereby leading to an inadequate tracking of the objects of interest, such as warheads, for example.

SUMMARY OF THE INVENTION

The present invention solves the foregoing problems by providing a random-set based cluster tracking method for the tracking of observable objects in a system having a plurality of detection sensor devices and a tracking processor unit, wherein a group of random objects (cluster) is tracked by utilizing group tracks, each group track having multiple tracks assigned to it for tracking multiple objects. A set of state parameters is maintained for the group track and when a new dataframe is received from one of the detection sensor devices, the state parameters are propagated forward in time to correspond to the time of the dataframe measurements, and the propagated results are used to determine all feasible object and track assignments for the measured objects in the dataframe. Each group track is analyzed in an attempt to further resolve it into subtracks, if possible, and a joint assignment problem is solved to select the best set of observation node and track node assignments, based on probability scores for the feasible object and track assignments.

Specifically, according to one aspect of the invention, random-set based cluster tracking of observable objects is performed in a system having a plurality of detection sensor devices, each of which generates a series of dataframes, and a tracking processor unit which receives dataframes from one or more of the detection sensor devices. The invention includes receiving a dataframe from one of the detection sensor devices, the dataframe including a timestamp, and location data and amplitude data corresponding to each detected observable object in the dataframe, generating a new observation node for each observable object location data contained in the received dataframe, propagating forward, to a time value of the timestamp, a set of state parameters of a group track node to obtain a set of posterior observable positions, a plurality of previously-generated track nodes being assigned to the group track node, and projecting the posterior observable positions onto a field of regard of the received dataframe. Gates are generated for each posterior observable position and then projected over each respective posterior observable position on the received dataframe, a set of feasible track assignments are determined for the dataframe which correlate each one of a plurality of new track nodes to at least one of the new observation nodes based on the proximity of each new observation node to at least one of the gates over the posterior observable positions, a set of state parameters for each track node assigned to the group track node is updated based on the determined set of feasible track assignments, and a probability score is generated for the feasible track assignments.

The aforementioned aspect of the invention further includes determining a set of feasible observation assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments. A set of feasible composite assignments is determined for a composite set of track nodes and observation nodes which correspond to at least the received dataframe, a set of state parameters is updated for each track node assigned to the group track node based on the determined set of feasible composite assignments, and a probability score is generated for each feasible composite assignment based on the probability scores for the feasible track assignments and the feasible observation assignments corresponding to the track nodes and observation nodes in the composite set. A set of joint assignments is determined based on the set of feasible composite assignments and their respective probability scores by using a loss minimization algorithm and a set of constraints, the selected set of joint assignments including at least one of the feasible composite assignments.

Preferably, the invention further includes the use of a multi-frame resolution algorithm which further resolves each group track node into subtracks, when possible. Also, after determination of the set of joint assignments, the tracks are preferably pruned by deleting tracks having a below-marginal probability score in accordance with a loss minimization algorithm. The group track set of state parameters is updated by determining a new group track extent and new group track centroid based on the dataframe information, and probability scores are determined for the group track extent and group track centroid. In one aspect of the invention, the group track extent and the group track centroid, and their respective scores, are determined based on both location and amplitude information for each measured object in the dataframe. In another aspect, each dataframe preferably contains information from an infrared sensor and information from a radio frequency sensor, and both sets of information are used to determine the group track extent and the group track centroid, and their respective scores.

In this manner, the present invention tracks groups of objects in a coordinated fashion by maintaining estimates of state parameters for each group, including a centroid, a three-dimensional extent and an object count probability distribution. The group state parameters are used to better determine a set of joint assignments for all measured observables to tracks, and for all relationships among tracks. In addition, the signal strength of each measured object, in addition to location information, is used to estimate the state parameters of the group track, thereby making full use of the resolution capabilities of the detection sensors. The multi-frame resolution capability of the invention provides a further level of resolution of tracking by constantly attempting to resolve group tracks into viable subtracks. The foregoing features result in a more accurate tracking system which more quickly and accurately resolves the tracking of objects which are clustered in groups.

This brief summary has been provided so that the nature of the invention may be understood quickly. A more complete understanding of the invention can be obtained by reference to the following detailed description thereof in connection with the attached drawings.

BRIEF DESCRIPTION OF THE DRAWINGS

FIG. 1 depicts a space-based missile defense environment implementing the tracking method of the present invention according to one embodiment of the invention.

FIG. 2 is a schematic drawing depicting location and amplitude data corresponding to objects measured by a sensor for a dataframe according to one embodiment of the invention.

FIG. 3 depicts a tracking processor and a memory for implementing the tracking method according to one embodiment of the invention.

FIG. 4 is a basic schematic for explaining observation node relationships according to one embodiment of the invention.

FIGS. 5A and 5B are basic schematic drawings for explaining track node relationships according to one embodiment of the invention.

FIG. 6 is a basic schematic for explaining scene node relationships according to one embodiment of the invention.

FIG. 7 is a basic schematic for explaining the relationships between the scene, track and observation domains according to one embodiment of the invention.

FIGS. 8A to 8I are basic schematic for explaining the types of track node assignments according to one embodiment of the invention.

FIG. 9 is a graphic for explaining the assignment graph data structures contained in the assignment graph file according to one embodiment of the invention.

FIG. 10 is a flowchart for explaining the top level process steps of the tracking method according to one embodiment of the invention.

FIG. 11 is a flowchart for further explaining the function of updating group track state parameters and their related scores, as referenced in the process steps of FIG. 10.

FIG. 12 is a graphic for explaining the data structures used by the multi-frame resolution algorithm according to one embodiment of the invention.

FIG. 13 is a flowchart for explaining the top level process steps of the multi-frame resolution algorithm according to one embodiment of the invention.

FIG. 14 is a graph depicting the tracking of a ballistic missile during the release of clusters of objects according to one embodiment of the invention.

FIG. 15 is a graph depicting the spawning of new tracks and the pruning of tracks during tracking of a ballistic missile according to one embodiment of the invention.

DETAILED DESCRIPTION

As mentioned above, the present invention is generally directed to a random-set based cluster tracking method for the tracking of objects in a system having a plurality of detection sensor devices and a tracking processor unit, wherein groups of random objects (cluster) are tracked by utilizing group tracks. The tracking method of the present invention can be implemented in many different environments to track clusters of objects for many different purposes. Accordingly, although the invention is describe below in an embodiment in which the method is implemented in a missile defense system, it can be appreciated that the method can be used in many other settings and applications without departing from the spirit of the invention.

Turning to the drawings, FIG. 1 shows a space-based missile defense environment in which the tracking method of the present invention can be implemented. Specifically, FIG. 1 shows multiple satellites in orbit in a distributed fashion, each satellite having onboard detection sensors. FIG. 1 shows earth 10, and satellites 20, 30 and 40 in orbit above earth 10. Earthbound tracking processor 15 is provided to receive data from the satellites and then perform tracking according to the present invention. In the alternative, the processing necessary to implement the present invention can be distributed among one or more of processors 24, 34, and 44 which are onboard satellites 20, 30 and 40, respectively. In this regard, satellites 20, 30 and 40 can communicate between each other and can communicate with earthbound tracking processor 15 according to known communication methods and links.

As seen on FIG. 1, each of satellites has a platform, a processor unit, and two detection sensor devices. For example, satellite 20 has detection sensors 22 and 23 positioned onboard platform 21, each detection sensor facing toward the earth and having a specific field of regard and resolution capability. Preferably, detection sensors 22 and 23 are of different types in order to provide more robust detection capability of objects. In the embodiment discussed herein, the two sensors on each satellite are an infrared (IR) detection sensor and a radio-frequency (RF) detection sensor; Processor unit 24 is used to process the signals generated by detection sensors 22 and 23, and to determine location, amplitude, and other data related to objects detected by the sensors at a particular time. The data is then arranged in a dataframe, along with a timestamp, sensor resolution and sensor position data, among other data. Each satellite sends the dataframes it generates to a tracking processor unit which, as mentioned above, can be earthbound tracking processor 15 or can be distributed among one or more of processors 24, 34 and 44.

Also shown in FIG. 1 is cluster 50 which is generally traveling along trajectory 75. Cluster 50 represents a group of objects which generally travel along trajectory 75, but which have a degree of randomness regarding their movements relative to each other. In the depiction of FIG. 1, cluster 50 is represented as a cluster of objects released from a missile and includes warheads 70 and numerous other objects 60 which are often referred to as clutter. Clutter 60 can be comprised of decoys, such as balloons and chaff, or of debris from the missile, or other missiles, after being hit with anti-missile weapons. The present invention provides random set-based cluster tracking which tracks one or more clusters and continuously resolves the track of each cluster into subtracks in order to track each object in the cluster.

FIG. 2 graphically depicts location and amplitude data corresponding to objects which have been measured by a detection sensor for a dataframe. As seen in FIG. 2, dataframe 100 of location data is depicted as a rectangle which represents the field of view of the particular detection sensor. Dataframe 100 includes five sets of measurements corresponding to five observable objects 101 to 105, hereinafter referred to as observables, which have been detected by the detection sensor, such as sensor 22 of satellite 20, at time t1. Each object measurement set includes location data and an amplitude measurement corresponding to the measured observable. For example, observable 101 has x1 and y1 for measured location data in the coordinate system of the detection sensor which measured observable 101. Also, observable 101 has amplitude A1 which represents the signal strength of the measurement signal from the detection sensor that measured observable 101. As explained later, the amplitude of an observable is used in the present invention as a state variable in order to more accurately track the objects in a cluster. Dataframe 100 therefore provides a location and amplitude snapshot from a given sensor at a specific time. By comparing location data and amplitude data in each dataframe received from each sensor, the present invention determines group tracks which are resolved into subtracks and eventually into tracks which correspond to each observable.

FIG. 3 depicts a tracking processor and a memory for implementing the tracking method of the present invention in one embodiment of the invention. As seen in FIG. 3, bus 110, memory 120, output 130, input 140 and tracking processor unit 150 are provided. As mentioned above, the tracking processing for implementing the present invention may be performed on an earthbound station 15 or on one or more of satellites 20, 30 and 40. Accordingly, the components depicted in FIG. 3 may alternatively provided in earthbound station 15, or on one or more of satellites 20, 30 and 40, for implementing the present invention.

Bus 110 is a data bus for moving data, including executable program code, between memory 120 and tracking processor unit 150. Memory 120 is a known type of memory for storing data and executable code, either temporarily or on a permanent basis. Tracking processor unit 150 is a known type of processor for performing a sufficiently large number of calculations per second in order to implement the present invention. Output 130 is connected to bus 110 and is used to output tracking results from tracking processor unit 150 and memory 120. The results may be output to a missile monitoring system, to an anti-missile weapons system, or to some other system or device. Input 140 is also connected to bus 110 and is used to input data, such as dataframes from detection sensors, to memory 120 and tracking processor unit 150. It can be appreciated that computing environments other than that shown in FIG. 3 can also be used to implement the tracking method of the present invention.

Returning to FIG. 3, memory 120 is seen to store several items, including assignment graph file 121, dataframe files 122, tracking parameters file 123, track files 124, observation files 125, multi-frame resolution files 126 and executable program code 127. Each of these items are instrumental in the implementation of the tracking method of the present invention and are explained in more detail further herein. Of course it can be appreciated that memory 120 contains other files and data necessary to implement the invention as well as any other operations which are executed by tracking processor unit 150. Assignment graph file 121 is a data file which represents the ongoing data association and resolution problem for associating possible relationships of observed objects and their tracks from one dataframe to the next, and then resolving all possible relationships into a selected set of relationships.

Dataframe files 122 are dataframes received from the detection sensors. Each of dataframe files 122 contain zero or more measured observables, and it is assumed that if a target is in the field of regard (viewable region) of the detection sensor then at most one observable is measured in and reported in the dataframe for the detection sensor. Tracking parameters file 123 contains data required for implementing the tracking method and includes a set of estimated inter-sensor biases, algorithm thresholds and available resource information. Track files 124 contains track data for all track nodes created and maintained by the tracking method, and the track data for each track node includes a track ID, track state estimates, track objectives, track objective value, track existence value, and track genealogy. Observation files 125 contains data for all observation nodes created and maintained by the tracking method based on the observable data in the received dataframes, and the observation node data for each observation node includes an observation node ID, and observation node geneology, among other related data.

Multi-frame resolution files 126 contain the data structures necessary for implementing a multi-frame resolution algorithm as part of the overall tracking method according to the present invention. The multi-frame resolution algorithm constantly attempts to resolve group tracks into viable subtracks for more refined tracking of individual objects, with the ultimate goal of having a track assigned for each observable object in a cluster of objects. The multi-frame resolution algorithm is explained further herein. Executable program code 127 contains the executable program steps for implementing the tracking method of the present invention. These steps are explained further herein.

In general, as mentioned above, the goal of the tracking method is to continuously receive dataframes from the detection sensors on the satellites, assign all possible relationships between the observed objects from one dataframe to the next, and then resolve all possible relationships into a selected set of relationships. The relationships between observation nodes from one dataframe to the next are represented by track nodes, and the movement of an observable from one dataframe to the next is tracked through the use of a new track node representing a track segment. These relationships between track nodes and observation nodes as they change over time from one dataframe to the next are temporal relationships. The tracking method of the present invention also utilizes relationships between track nodes and observation nodes that represent different abstract levels of resolution, such as parent/child relationships for a group track node that has been resolved into multiple subtrack nodes.

Because the tracking method starts with the observable information in the dataframes from the detection sensors, the tracking method must consider all feasible variations of assigned relationships between observation nodes and track nodes, and then decide which set of feasible assigned relationships most likely represents the actual truth of the trajectory tracks of the objects observed by the sensors. Accordingly, the relationships between nodes can be AND relationships or OR relationships. For example, if a feasible track node for a current dataframe is one of two possible track nodes in the current dataframe that each represent a possible continuation of a track node from a previous dataframe, then the two possible track nodes of the current dataframe are in an OR relationship with the previous track node. In the alternative, if the a feasible track node for a current dataframe is one of two possible track nodes in the current dataframe that together represent a split of the track node from the previous dataframe, then the two possible track nodes of the current dataframe are in an AND relationship with the previous track node. Accordingly, the present invention uses different types of observation nodes and track nodes to indicate their relationships to other observation nodes and track nodes, either in the temporal or resolution dimension.

As mentioned above, observation nodes and track nodes are used in the present invention to represent the measured observables and their possible assigned tracks. In addition, scene nodes are used to provide a snapshot for each dataframe of all feasible relationships between the feasible track nodes and the feasible observation nodes generated for the dataframe. Accordingly, the possible relationships, both temporal and resolution, that are generated based on measured observable data in a given dataframe can be represented in different types of domains, including an observation domain, a track domain, and a scene domain. The track domain is consists of the track nodes, which represent the tracks, and has a temporal dimension and a resolution dimension. Linkages (assigned relationships) in the temporal dimension are defined as predecessor/successor relationships, and linkages in the resolution dimension are defined as parent/child relationships.

The observation domain consists of the observation (observation) nodes, which represent the measured observable data received in each dataframe. The observation domain is partitioned into independent dataframes, and, on a given dataframe, the observation nodes have a resolution dimension represented by an AND/OR tree. Temporal relationships between observation nodes, such as a relationship between a predecessor observation node from a previous dataframe and a successor observation node in the current dataframe, both of which are believed to represent the same detected object, are assigned and maintained as a track nodes. The scene domain consists of the scene nodes, which represent the joint assignment problems and sub-problems for deciding which set of feasible assignments for observation nodes (observation domain) and track nodes (track domain) for a given dataframe most likely represents the truth. The scene domain has a temporal dimension and a resolution dimension, where linkages in the temporal dimension are defined as predecessor/successor relationships, and linkages in the resolution dimension are defined as parent/child relationships. The structure in the scene domain on a given dataframe is an AND tree. The types of nodes, and their respective relationships, in each of these domains are now explained in more detail below.

The types of possible observation nodes in the observation domain are now explained. In general, an observation node is a type of assignment graph (AG) node that represents an observable, or multiple observables, that have been measured by a detection sensor on a given dataframe. In general, an can be an Object Observation Node, a Group/Cluster Observation Node, a Formation Observation Node or an Aggregate Observation Node. The observation nodes can be further defined in terms of whether or not the observation contains child observation nodes. Observation nodes with children are defined as Summation Observation Nodes, and can be of two types: Group/Cluster Observation Nodes or Aggregate Observation Nodes. Observation nodes without children are defined as Simple Observation Nodes.

FIG. 4 depicts the relationships of, and types of, observation nodes used in the present invention. As seen in FIG. 4, current observation node 160 can be in relationship with other observation nodes, with track nodes and with a scene node. Specifically, observation node 160 is seen to have possible relationships with zero or more parent observation nodes 161 and with zero or more child observation nodes 162 in the resolution dimension. The relationship between observation node 160 and parent observation nodes 161 can be an AND or an OR relationship. The relationship between observation node 160 and child observation nodes 162 can be an AND or an OR relationship. Observation node 160 can only be assigned to one scene node, which references the total domain of the current dataframe. Lastly, observation node 160 is assigned to zero or more track nodes 164 in an AND or an OR relationship.

In this manner, parent/child relationships explain how a group observation node is further resolved into one or more observation nodes, each of which directly reference an observable object. As for the other observation node types, a Summation Observation Node is an observation node that has children observation nodes, a Simple Observation Node is an observation node that has no children observation nodes, a Group/Cluster Observation Node is a Summation Observation Node that has AND children which are not cross correlated, a Formation Observation Node is a Summation Observation Node that has AND children which are cross correlated, and an Aggregate Observation Node is an Summation Observation Node that has OR children.

The types of possible track nodes in the track domain are now explained. In general, a track node is a type of assignment graph (AG) node that references a track and is used to support the association and resolution process in the tracking model. Each track node exists on a specified dataframe and at a certain level of resolution, is associated with zero or more observation nodes and is contained in a single scene node. A track node can be an Object Track, a Group Track, a Formation Track, a Cluster Track or an Aggregate Track. The tracks can further be defined in terms of whether or not they have track children. Track nodes with track children are defined as Summation Track Nodes, and can be of two types: Cluster Tracks or Aggregate Tracks. Track nodes without track children are defined as Simple Track Nodes.

FIG. 5A depicts the relationships of, and types of, track nodes used in the present invention. As seen in FIG. 5A, current track node 170 can be in relationship with other track nodes, with zero or more observation node nodes and with a scene node. Specifically, track node 170 is seen to have possible relationships with zero or more parent track nodes 171 and with zero or more child track nodes 172 in the resolution dimension. The relationship between track node 170 and parent track nodes 171 can be an AND relationship. The relationship between track node 170 and child track nodes 172 can be an AND or an OR relationship. Similarly, in the temporal dimension, track node 170 is seen to have possible relationships with zero or one predecessor track node 174 and with zero or more successor track node 175. Track node 170 can only be assigned to one scene node 173, which references the total domain of the current dataframe. Lastly, track node 170 can be assigned to zero or more observation nodes 176 in an AND relationship.

More specifically, a track predecessor node is a track node on a prior dataframe which may or may not be from the same sensor. If no track predecessor node exists, then the current track node is defined to be a temporal root. A track successor node is a track node on the next dataframe, which may or may not be from the same sensor. If no track successor node exists, then the track node is the last node in a sequence, and is defined to be a temporal, leaf. As for track parent nodes, the usual case is that a track node has one track parent node, but in the case of a merge, there may be multiple track parent nodes. If the track node has multiple track node parents, they are considered AND parents. There are no OR track node parents. If there are zero track node parents, then this track node is defined to be a resolution root. Similarly, as for track children nodes, there are two types of track children nodes: (1) AND track children nodes; and (2) OR track children nodes. The interpretation of AND track children nodes for a track node is that the track children nodes are all contained in the track node, and the track node is defined to be a cluster track or formation track. The interpretation of OR track children nodes for a track node is that the track children nodes are alternative extensions for the track node. A track node with OR track children nodes is defined to be a split track node. If there are zero track children nodes, then this track node is defined to be a resolution leaf.

In this manner, parent/child track node relationships explain how a group track node is further resolved into one or more track nodes. Similarly, predecessor/successor track node relationships represent continuation track segments of a previous track node. As for the other track node types, a Summation Track Node has children track nodes, a Simple Track Node does not have children track nodes, an Object Track Node is a Simple Track Node with zero or more observations assigned on each dataframe, a Group Track Node is a Simple Track Node with at least one frame in which multiple observations are assigned, a Cluster Track Node is a Summation Track Node that has AND children which are not cross correlated, a Formation Tack Node is a Cluster Track Node that has AND children which are cross correlated, and an Aggregate Track Node is a Summation Track Node that has OR children.

FIG. 5B depicts a progression of the track nodes in a track domain over a series of three dataframes. As seen in the initial dataframe for t1, only one observation node 190 is provided based on the measured observable data in the dataframe. Accordingly, object track node 180 is assigned to represent the path of observation node 180. In the next dataframe t2, two observation nodes 191 and 192 are provided, and so track node 180 from dataframe t1 now corresponds, and is the predecessor of, aggregate track node 181 in dataframe t2. This, is because it is unclear which of observation nodes 191 and 192 are a continuation of track node 180 from dataframe t1. So, observation nodes 191 and 192 are assigned to object track nodes 182 and 183, respectively, which are OR children track nodes of aggregate track node 181.

Next, in dataframe t3 of FIG. 5B, four observation nodes 193 to 196 are provided, and so all possible track node assignments must be determined for them. In this regard, aggregate track node 181 from dataframe t2 is the predecessor of aggregate track node 184 in dataframe t3. Under aggregate track node 184 are two children track nodes, which are group track node 185 and formation track node 186. Group track node 185 is assigned to observation nodes 193 and 194. Formation track node 186 has two children track nodes in a correlated AND relationship, which are group track node 187 and object track node 188. Group track node 187 is assigned to observation nodes 193 and 194 in an AND relationship. Object track node 188 is assigned to observation node 196. It can be seen that formation track node 186 is a successor of object track node 183 form dataframe t2, and is now spawned into two child tracks, group track node 187 and object track node 188. So, the track domain (track tree) for each dataframe depicts all possible assignments of observation nodes to track nodes, and among all possible track nodes.

The scene node is now explained. In general, a scene node is a type of assignment graph (AG) node that references a dataframe and the associated set of track nodes (track domain) and corresponding set of observation nodes (observation domain). FIG. 6 depicts the relationships of, and types of, scene nodes used in the present invention. As seen in FIG. 6, current scene node 200 can be in relationship with other track nodes, with zero or more observation node nodes and with zero or more track nodes. Specifically, scene node 200 is seen to have possible relationships with zero or more parent scene nodes 201 and with zero or more child scene nodes 202 in the resolution dimension. The relationship between scene node 200 and child scene nodes 202 can be an AND relationship. Similarly, in the temporal dimension, scene node 200 is seen to have possible relationships with zero or one predecessor scene node 203 and with zero or more successor scene node 204. Scene node 200 can be assigned to zero or more track nodes in an AND relationship. Lastly, scene node 200 can be assigned to zero or more observation nodes 206 in an AND relationship. In this manner, parent/child track node relationships explain how a group scene node is further resolved into one or more scene nodes. Similarly, predecessor/successor scene node relationships represent relationships with past and future scene nodes from other dataframes.

FIG. 7 represents the relationships between the scene domain, track domain and observation domain for each dataframe, over an entire series of received dataframes. As seen in FIG. 7, scene domain 210 is assigned to track domain 211 and observation domain 212 for the current (top) dataframe. In this manner, the scene domain ties together all possible track node assignments for a given dataframe, along with the possible observable node assignments for the observable nodes that are assigned to the possible track node assignments. As mentioned above, the purpose of the tracking method of the present invention is to determine which of the possible (feasible) track node assignments most likely represent the true tracks of the objects measured by the detection sensors. Accordingly, a scene node represents a dataframe joint assignment problem of feasible assignments which must be solved to determine the best set of joint assignments that represents the true state of the detected objects. However, a current scene node is only a partial joint assignment problem because the feasible joint assignments of all previously received dataframes provides a historical basis that must be taken into account in order to determine the best current set of joint assignments. FIG. 7 shows a series of scene domain relationships behind scene domain 210 which represent all dataframes received. The set of scene nodes depicted in FIG. 7 for all dataframes represents an assignment graph which must be solved to determine the best current state of assignments between observation nodes and track nodes. The assignment graph, and the process for solving the assignment graph, are described further herein.

The various types of assignments between observation nodes and track nodes are now explained. In general, an assignment is an assigned relationship of input track nodes to input observation nodes resulting in assigned output track nodes. Each assignment has zero or more predecessor track nodes, zero or more observation nodes and zero or more successor track nodes. The common assignment types are discussed below with respect to FIGS. 8A to 8I, and all assignment types are shown in Table I below along with the number of predecessors, observations and successors for each assignment type.

Turning to FIG. 8A, False Alarm Assignment 220 is shown in which the only input node is an observation node, but there is no output assigned track node. This represents an observation node for which no track node assignment is considered feasible. Next, in FIG. 8B, New Track Assignment 221 is shown in which the only input node is an observation node, and there is only one output assigned track node. This represents an observation node which is assigned to an object track node. FIG. 8C shows Miss Track Assignment 222 in which the only input node is a track node, and the only output node is an assigned track node. This represents an existing track node for which no observation node can be feasibly assigned. FIG. 8D shows Singleton Track Assignment 223 in which the input nodes are a track node and an observation node, and the only output node is an assigned track node. This represents a observation node which is assigned to an existing track node.

FIG. 8E shows Merge Track Assignment 224 in which the input nodes are two track nodes and only one observation node, and the only output node is an assigned track node. This represents the merging of two existing track nodes into one assigned track node, based on the path of a single observation. Next, FIG. 8F shows Shared Track Assignment 225 in which the input nodes are two track nodes and only one observation node, and the output nodes include two assigned track nodes. This represents an observation node that is assigned to two track nodes. FIG. 8G shows Spawn Track Assignment 226 in which the input nodes are one track node and two observation nodes, and the output nodes include two assigned track nodes. This represents two observation nodes in the current dataframe that cause an existing track node to spawn into an assigned track node for each observation node. FIG. 8H shows Pattern Track Assignment 227 in which the input nodes are two track nodes and two observation nodes, and the output nodes include two assigned track nodes. This represents two observation nodes in the current dataframe which became assigned to two existing track nodes. FIG. 8I shows Cluster Track Assignment 228 in which the input node is a track node and two observation nodes, and the output node is an assigned track node. This represents two observation nodes in the current dataframe which became assigned to one existing track node. The aforementioned assignment types, in addition to other general assignment types, are listed below in Table I, along with the number of predecessors, observations and successors for each assignment type.

TABLE 1

| Assignment Name | M-N* | Predecessors | Observations | Successors |
|---|---|---|---|---|
| New Object Track | 0-1 | 0 | 1 | 1 |
| False Alarm | 0-1 | 0 | 1 | 0 |
| New Group Track | 0-N | 0 | N > 1 | 1 |
| Miss | 1-0 | 1 | 0 | 1 |
| Object Update | 1-1 | 1 | 1 | 1 |
| Spawn | 1-N | 1 | N > 1 | M > 1 |
| AND Merge | M-1 | M > 1 | 1 | 1 |
| OR Merge | M-1 | M > 1 | 1 | 1 |
| Group Update | 1-N | 1 | N > 1 | 1 |
| Shared Update | M-1 | M > 1 | 1 | M > 1 |
| Formation | M-N | M > 1 | N > 1 | M > 1 |
| General | M-N | M >= 0 | M >= 0 | K >= 0 |

*M = Number of track nodes, and N = Number of observation nodes, in each assignment FIG. 9 depicts the assignment graph data structure associated with assignment graph files 121 according to the present invention. As discussed above with respect to FIG. 7, the purpose of the tracking method of the present invention is to determine which of the feasible track node assignments most likely represent the true tracks of the objects measured by the detection sensors, and a scene node is used to represent a single dataframe joint assignment problem. In a complete joint assignment problem, the sets of feasible track node assignments and the sets of feasible observation node assignments for all dataframes are analyzed and the best set of joint assignments that satisfies all conditions is selected. In the tracking method of the present invention, the determination of feasible joint assignments and the selection of the best set of joint assignments are based on a calculated probability score (evidence) corresponding to each feasible assignment, which is a loglikelihood.

In more detail, a Joint Assignment is a set of elementary assignments that satisfy the given constraints. The loglikelihood for the joint assignment is the sum of the loglikelihoods of the elementary assignments in the joint assignment. A Joint Assignment Problem is an instance of a set partition problem that determines in which an A* search algorithm is used to generate a set of joint assignments satisfying a certain criteria. The criteria could be K Best, all within a certain factor of the best, and all computed within a certain time period. Each Scene Node can be used to define a Joint Assignment Problem. The Joint Assignment Problem is computed from a given Scene Node by computing a set of Scene Nodes that include the given Scene Node and also the ancestors of the given Scene Node. This set of Scene Nodes constitutes a Joint Assignment Problem.

Returning to FIG. 9, data structures are depicted which provide a data representation of the Joint Assignment Problem. As seen in FIG. 9, the Joint Assignment Problem consists of Constraint Matrix A 250, right hand side (RHS) vector B 300, and score vector C 290. The rows of Constraint Matrix A 250 represent multiple sets of track nodes and multiple sets of observation nodes, wherein, for each dataframe, there is a corresponding set of track nodes and a corresponding set of observation nodes. The multiple sets of track nodes 270 is identified as track sets t0 to t(k−1), and the multiple sets of observation nodes 260 is identified as measurement sets M1 to Mk. For each track set, the number of track nodes in the track set is identified in far left column 271. Similarly, for each observation set, the number of track nodes in the observation set is identified in far left column 261. The columns of Constraint Matrix A 250 reference elementary feasible assignments. In this regard, the presence of a node (track or observation) in Constraint Matrix A 250 is indicated by a "1", and the presence of an successor node (track or observation) in Constraint Matrix A 250 is indicated by a "−1". Accordingly, an inspection of column 1 of Constraint Matrix A 250 shows an elementary False Alarm Assignment, the next column shows a Miss Assignment, and so on.

Each row of Constraint Matrix A 250 has a corresponding right hand side (RHS) vector B 300 value that is either 0 or 1. If it is 1, then the row is defined to be an unconditional constraint, and if it is 0, then the row is defined to be a conditional constraint. Each column of score vector C 290 represents a loglikelihood score (evidence) for the entire corresponding column of Constraint Matrix A 250, which can be considered a Partial Joint Assignment. The number of loglikelihood scores represented in score vector C 290 is identified in far left column 271. Coordinating a set of Partial Joint Assignment Problems at the same time can solve the complete Joint Assignment Problem, which is the end result of the tracking method of the present invention.

In this regard, A Complete Joint Assignment Problem is an instance of a set partition problem in which all relevant constraints and all feasible assignments are included. A complete connected component analysis is performed to generate the complete joint assignment problem. A Complete Joint Assignment Problem is derived from the Scene Node that is both a resolution root and a temporal leaf. A Partial Joint Assignment Problem is an instance of a set partition problem that does not include all relevant constraints and all feasible assignments. A partial connected component analysis is performed to generate the partial joint assignment problem. A Partial Joint Assignment Problem is derived from a Scene Node that is not a resolution root or a temporal leaf. A Feasible Joint Assignment Problem determines the feasible joint assignments, a0. The decision problem uses the feasibility loss function and feasibility resource constraints. A Selected Joint Assignment Problem determines the selected joint assignments, a1. The decision problem uses the selection loss function and selection resource constraints. Selection vector Z in FIG. 9 represents the solution to the complete Joint Assignment Problem and is a vector that includes feasible and selection indicators, each of which indicates which set of feasible joint assignments (columns of Constraint Matrix A 250) represents the solution. In this regard, in view of the structures shown in FIG. 9, the complete solution to the Joint Assignment Problem is represented by the formula Az=b.

FIG. 10 is a flowchart for explaining the top level process steps of the tracking method of the present invention. The top level steps are now briefly described, as each step is explained in greater detail further herein. In step S1001, a new dataframe is received and new observation nodes are generated corresponding to the measurement data for observed objects, if any, in the dataframe. Step S1002 consists of propagating track node state vectors corresponding to a group track forward to the time of the received dataframe in order to obtain propagated observation node positions, and in step S1003 the propagated observation node positions are projected onto the dataframe field of regard. Gates are generated in step S1004 for each propagated observation node based on a corresponding covariance value. In step S1005, feasible track node assignments are determined based on the proximity of the new observation nodes to the gates, and then the group track node state parameters are updated and the corresponding track node scores are calculated. The latter-mentioned functions of updating the group track state parameters and calculating their respective scores are explained in detail below with respect to FIG. 11. Step S1006 determines feasible observation node assignments based on the based on the proximity of the new observation nodes to the gates, and then the group track node state parameters are updated and corresponding track node scores are calculated.

Next, in step S1007, a multi-frame resolution algorithm is performed to resolve group track nodes into subtrack nodes, if possible. Feasible composite assignments are determined for each combination of based sets of track nodes and sets of observation nodes, based on the feasible track node assignments and the feasible observation node assignments, and then the group track node state parameters are updated and the corresponding track node scores are calculated in step S1008. In step S1009, a set of feasible joint assignments is determined from feasible composite assignments based on feasible loss minimization subject to feasible resource constraints, and in step S1010, a selected set of joint assignments are determined from the set of feasible joint assignments based on selection loss minimization subject to selection constraints. Non-selected feasible joint assignments are eliminated from the assignment graph in step S1011, and track nodes with marginal scores are pruned from the track domain in step S1012. The process then ends at step S1013. In this manner, the tracking method of the present invention solves the complete joint assignment problem of feasible assignments between track nodes and observation nodes by using state parameters of a group/cluster track which encompasses the observation nodes.

Each step of FIG. 10 is now explained in more detail. With regard to step S1001, each new dataframe is received by the tracking processor, and the information in the dataframe indicates the identification of the satellite and the detection sensor that provided the information, the time of measurement, the position and resolution of the sensor, and location and amplitude measurement data of each detected signal corresponding to each measured object, if any were detected. New observation nodes are generated based on the corresponding to the measurement data in the dataframe.

With regard to step S1002, the track node state vectors corresponding to a group track are propagated forward to the time of the received dataframe in order to obtain propagated observation node positions. Group/cluster tracking, and the maintenance of related state parameters of the group/cluster track is therefore an essential component of the tracking method of the present invention. A random set-based group/cluster tracking algorithm is used for this component.

This section further explains the random set-based cluster/group tracking algorithm utilized in the tracking method of the present invention. The group tracking algorithm maintains a state estimate of the centroid of a group of objects, the location extent of the objects and a probability distribution for the number of objects in the group. The centroid state vector includes position and velocity, with ballistic propagation, and can include additional propagator parameters. The location extent is measured in terms of the second moment of the group and is represented by 3×3 symmetric matrix. The count is represented as a probability distribution over the number of objects in the group.

A group track is represented as a finite random set of independent, identically distributed objects. Let p(n) denote the probability that there are n objects in the group, and let f(x) denote the probability density function for each object. Then, the Janossy density, which is defined below as:

$$j_n(x_1, \ldots, x_n)dx_1 \ldots dx =$$

$$Pr\left\{\begin{array}{l}\text{there are exactly } n \text{ points in the group, one in each} \\ \text{of the } n \text{ distinct infinitesimal regions } (x_i, x_i + dx_i)\end{array}\right\}$$

can be represented as $$j_n(x_1, \ldots, x_n)dx_1 \ldots dx_n = p(n)n!f(x_1) \ldots f(x_n)$$

for an i.i.d group.
The first moment density is defined as $$m_1(x) = \sum_{k=0}^{\infty} \frac{1}{n!} \int \int \int j_{1+n}(x, y_1, \ldots, y_n) dy_1 \ldots dy_n$$

which becomes $$m_1(x) = \bar{n}f(x)$$

for an i.i.d. group, where $$\bar{n} = k = \sum_{k=0}^{\infty} kp(k)$$

is the average number of objects in the group. The group track maintains an estimate for the density function $f(x)$ and the count distribution $p(n)$.

Definition Of Cluster Tracking Algorithm Terms. The terms for explaining the cluster tracking algorithm are set forth below:

Definition of Terms

Preliminaries

Let $\vec{z}$ represent the collection of prior measurements obtained on a group track. Let $\hat{z}$ represent a new set of data received on a group track on the current data frame. Let (X, E, n) represent the state of the group track, where X is the state vector for the centroid of the group track. E is the extent of the group track and n is the number of objects in the group track. The primary objective of the group tracking algorithm is to estimate the posterior probability $$P[X,E,n|\vec{z},\hat{z}]$$

which can be factored into $$P[X,E,n|\vec{z},\hat{z}]=P[X|E,n,\vec{z},\hat{z}]P[E|n,\vec{z},\hat{z}]P[n|\vec{z},\hat{z}].$$

The first term on the left is the posterior for the centroid, the second term is the posterior for the extent and the last term is the posterior for the count. To reduce the computational complexity of the above calculation some approximations will be made. The extent term in the posterior for the centroid will be replaced with the mean extent and the count term in the posterior for the centroid will be replaced with the mean count, i.e., $$P[X|E,n,\vec{z},\hat{z}] \cong P[X|\bar{E},\bar{n},\vec{z},\hat{z}].$$

so that the expression of interest in the group tracking algorithm becomes $$P[X|E,n,\vec{z},\hat{z}] \cong P[X|\bar{E},\bar{n},\vec{z},\hat{z}]P[E|n,\vec{z},\hat{z}]P[n|\vec{z},\hat{z}].$$

Further, the new data, $\hat{z}$, will be partitioned into two sets. One set conditions the centroid, $\hat{z}_x$, and the other conditions the extent, $\hat{z}_E$, i.e., $$\hat{z}=[\hat{z}_x, \hat{z}_E].$$

Centroid Distribution. The posterior for the centroid can be written:

$$P[X \mid \bar{E}, n, \hat{z}, \vec{z}] \cong \frac{P[\hat{z}_x \mid X, \bar{E}, n, \vec{z}]P[X \mid \bar{E}, n, \vec{z}]}{P[\hat{z}_x \mid \bar{E}, n, \vec{z}]}$$

The first term in the numerator on the right is the centroid likelihood, the second term in the numerator is the centroid prior and the denominator is the centroid evidence. The centroid evidence is defined by $$P[\hat{z}_x|\bar{E},n,\vec{z}]=\int P[\hat{z}_x|X, E,n,\vec{z}]P[X|E,n,\vec{z}]dX.$$

Extent Distribution

Extent Distribution
The posterior for the extent can be written $$P[E \mid n, \vec{z}, \hat{z}] \cong \frac{P[\hat{z}_E \mid E, n, \vec{z}]P[E \mid n, \vec{z}]}{P[\hat{z}_E \mid n, \vec{z}]}$$

The first term in the numerator on the right is the extent likelihood, the second term in the numerator is the extent prior and the denominator is the extent evidence. The extent evidence is defined by $$P[\hat{z}_E|n,\vec{z}]=\int P[\hat{z}_E|E,n,\vec{z}]P[E|n,\vec{z}]dE.$$

Count Distribution

Count Distribution
The posterior for the count can be written $$P[n \mid \vec{z}, \hat{z}] = \frac{P[\hat{z} \mid n, \vec{z}]P[n \mid \vec{z}]}{P[\hat{z} \mid \vec{z}]}$$

The first term in the numerator on the right is the count likelihood, the second term in the numerator is the count prior and the denominator is the count evidence. The count likelihood is defined by $$P[\hat{z}|n,\vec{z}]=\int\int P[\hat{z}|X,E,n,\vec{z}]P[X|E,n,\vec{z}]P[E|n,\vec{z}]dXdE$$

and is approximated by the product of the centroid evidence and the extent evidence $$P[\hat{z}|n,\vec{z}] \equiv P[\hat{z}_x|E,n\vec{z}]P[\hat{z}_E|n,\vec{z}]$$

The count evidence is obtained by the following summation $$P[\hat{z}|\vec{z}] = \sum_n P[\hat{z}|n\vec{z}]P[n|\vec{z}]$$

The likelihood, the prior and the evidence for the centroid, extent and count help to organize the computations in the group tracking algorithm.

Probability Distributions

Two probability distributions are needed, Gaussian and Wishart. The Gaussian distribution is defined as:

$$dN(X; \bar{X}, \Sigma) = \frac{\exp(-.5(X-\bar{X})'\Sigma^{-1}(X-\bar{X}))}{(2\pi)^{p/2}|\Sigma|^{1/2}}$$

The Wishart distribution is defined as $$dW(W; \bar{E}, NE) = c(p, NE)|\bar{E}|^{NE/2}|W|^{\frac{NE-p-1}{2}}\exp(-.5tr(\bar{E}W))dW$$

where
NE=The degrees of freedom
W=The Inverse Extent
p=The dimensionality of the extent (3 for an ECI extent).

$$c(p, NE) = \left[2^{\frac{NEp}{2}}\pi^{\frac{p(p-1)}{4}}\prod_{i=1}^{p}\Gamma\left(\frac{(NE+1-i)}{2}\right)\right]^{-1}$$

$$c(3, NE) = \left[2^{\frac{NEp}{2}}\pi^{\frac{3}{2}}\prod_{i=1}^{p}\Gamma\left(\frac{(NE+1-i)}{2}\right)\right]^{-1}.$$

Note that tr(A) refers to the tracks of the matrix A.

Bayesian Decision Logic

Bayesian Decision Logic
The generation of the count hypotheses is controlled through a Bayesian decision logic. The loss from deciding to limit the hypothesis set to a1 given a feasible set of hypotheses a0 is defined by $$\text{Loss}(a1 | a0, \vec{z}, \hat{z}) =$$

$$\left\{\begin{array}{c}\text{Decision Loss if the subset of hypotheses } a1 \text{ is selected}\\ \text{from a superset of feasible hypotheses } a0\end{array}\right\}$$

and computed using $$\text{Loss}(a1 | a0, \vec{z}, \hat{z}) = \sum_{n \in a0} \text{Loss}(n, a1 | \vec{z}, \hat{z})p(n | \vec{z}, \hat{z}, a0).$$

objects in the group is n and the subset of hypotheses a1 is selected is given by $$\text{Loss}(n, a1 | \vec{z}, \hat{z}) =$$

$$\left\{\begin{array}{c}\text{Decision Loss if the subset of hypotheses } n \text{ is true}\\ \text{and the subset of hypotheses } a1 \text{ is selected}\end{array}\right\}$$

and computed using $$\text{Loss}(n, a1 | \vec{z}, \hat{z}) = \left\{\begin{array}{c}ln[\exp(\text{Loss}(n, n | \vec{z}, z)/T)p(n | \vec{z}, z, a1)], n \in a1\\ \text{Loss}(n, a1 | \vec{z}, z)n \notin a]\end{array}\right\}$$

The individual loss terms are given by
Loss(n,n|$\vec{z}$,z)= −log[P[$\hat{z}$|n,$\vec{z}$]] (log count evidence)
T=Temperature (a pre-defined constant)
Loss(n,a1|$\vec{z}$,z)=L (a pre-defined constant)
The incremental loss from adding another count hypothesis is given by
ΔLoss(n,n+1)=Loss(a1|a0,$\vec{z}$,$\hat{z}$)−Loss(a0|a0,$\vec{z}$,$\hat{z}$)
where
a1={1,2, . . . ,n}
a0=a1∪{n+1}

Sensor Characteristics

Sensor Characteristics
The measurements consist of a set of location and amplitude parameters generated by the sensor signal processing algorithm and assigned to the group track, i.e.,
$\hat{z}$={($\hat{z}_j$,$\hat{A}_j$),j=1, . . . ,M},
where
$\hat{z}_j$=The estimated location of the jth measurement (2 dimensional for IR, 3 dimensional for RF)
$\hat{A}_j$=The estimated amplitude of the jth measurement (Intensity for IR, RCS for RF).
For IR, the location estimate is assumed to be (az, el) in sensor coordinates. For RF, the location estimate is assumed to be (range, az, el) in sensor coordinates. Note that (range, az, el) is used to update the centroid state, but that $(x,y,z)_{ECI}$ are used to update the extent. Define the following dimensionality parameter $$p = \begin{cases} 2, \text{ for } IR \\ 3, \text{ for } RF \end{cases}$$

Also, to support mapping from source to sensor, define the following exponent for the slant range to the target:

$$q = \begin{cases} 2, \text{ for } IR \\ 4, \text{ for } RF \end{cases}$$

From the measurement set, an amplitude map can be derived that represents the measured intensity with the random noise removed, that is, $$\hat{A}(l) = \sum_{j=1}^{M} \hat{A}_j g(z(l) - \hat{z}_j, E)|\delta z|$$

where
$\hat{A}(l)$ = The Derived Amplitude at location $z(l)$
$\hat{A}_j g(z-\hat{z}_j)|\delta z|$ = The response at location z given an object at $\hat{z}_j$ with amplitude $\hat{A}_j$
It is assumed that the point response function has a gaussian shape and can be expressed as
$g(z-\hat{z}_j, E) = \exp(-(z-\hat{z}_j)^t E^{-1}(z-\hat{z}_j))/|\delta z|$
where
E = The Extent of the point response function
$|\delta z|$ = The volume of resolution cell
Define the peak normalized exponential function
$g(\Delta z, S) = \exp(-\Delta z^t S^{-1} \Delta Z)/|\delta z|$.
Finally, the group tracking algorithm needs the rms error in amplitude estimation:
$\sigma$ = The rms amplitude measurement accuracy.

Group Track Parameters

Group Track Parameters
The parameters of the group track consist of parameters for the centroid, the extent and the count. The centroid is modeled as a Gaussian distribution with the following parameters:
$(X^+, \Sigma_x^+)$ = The Updated Mean and Covariance of the centroid state.
$(X^-, \Sigma_x^-)$ = The Propagated Mean and Covariance of the centroid state.
$(Z^-, \Sigma_z^-)$ = The Projected Mean and Covariance of the centroid state.
$(A^+, \Sigma_A^+)$ = The Updated Mean and Covariance of the group amplitude parameters, at the source.
$(A^-, \Sigma_A^-)$ = The Propagated Mean and Covariance of the group amplitude parameters, at the source.
$(A_S^-, \Sigma_{A_S}^-)$ = The Projected Mean and Covariance of the group amplitude, at the sensor.
The extent is modeled as a Wishart distribution, with the following parameters:
$(EX^+, N_{EX}^+)$ = The Updated Mean and Degrees of Freedom of the extent state.
$(EX^-, N_{EX}^-)$ = The Propagated Mean and Degrees of Freedom of the extent state.
$(EZ^-, N_{EZ}^-)$ = The Projected Mean and Degrees of Freedom of the extent state.
$(EA^+, N_{EA}^+)$ = The Updated Mean and Degrees of Freedom of the extent of the group amplitude parameters, at the source.
$(EA^-, N_{EA}^-)$ = The Propagated Mean and Degrees of Freedom of the extent of the group amplitude parameters, at the source.
$(EA_S^-, N_{EA_S}^-)$ = The Projected Mean and Degrees of Freedom of the extent of the group amplitude, at the sensor.
The count distribution is modeled as a discrete probability distribution, with the following parameters:
$P^+(n)$ = The Updated Count Probability Vector.
$P^-(n)$ = The Propagated Count Probability Vector.
$P_S^-(n)$ = The Projected Count Probability Vector.

Returning to step S1002 of FIG. 10, the propagation of the group state parameters is now described with respect to the group centroid, extent and count.

First, initialization of the parameters is performed. The apriori centroid state is used to initialize the centroid location state. The apriori centroid state is combined with the correlated measurements to create an initial updated state. Note that the a priori could come from another group track in the assignment graph. The amplitude state is at the source, so the amplitude at the sensor needs to be projected back to the source. For IR, a range estimate is assumed available.
Let $$\hat{A} = \sum_{j=1}^{M} \hat{A}_j$$

be the summation of the amplitudes of the measurements used to initiate this group track.
To initialize the group track,
$A^+ = \text{Range}^q \hat{A}$
$\Sigma_A^+ = \text{Range}^{2q} \sigma^2$
The location extent state is initialized:
$EX^+ = [(M-1)EZ_c + E_{min}]/M$ (Initialize Wishart parameter.)
$N_{EX}^+ = M$ (Update degrees of freedom.)
where EZc is computed further in the process with the location extent posterior. Next, initialize the amplitude extent, using the following equations:
$EA^+ = EA_c$ (Initialize Wishart parameter.)
$N_{EA}^+ = M$ (Update degrees of freedom.)
where EAc is computed further in the process with the amplitude extent posterior.

Propagation: First, propagate the mean and covariance of the centroid state by executing ballistic propagation of the mean and covariance:
$X^- = \text{BallisticPropagate}(X^+, \delta t)$  $\Sigma_x^- = \Phi \Sigma_x^- \Phi^t + Q_x$
Next, propagate the mean and covariance of the group amplitude parameters, at the source. In this regard, the amplitude parameters at the source, would be the source of radiance for IR, or the RCS for the RF. The source radiance is propagated as follows:
$A^- = A^+$
$\Sigma_A^- = \Sigma_A^+ + Q_A$
Set $Q_A = 100$ W/sr. Note that these are scalar quantities.
Propagate the mean and degrees of freedom of the extent state using the propagator:
$EX^- = EX^+$
$N_{EX}^- = \alpha N_{EX}^+$
set $\alpha = 0.9$.
Propagate the mean and degrees of freedom of the group amplitude parameters, at the source, using the propagator:
$EA^- = EA^+$
$N_{EA}^- = \alpha N_{EA}^+$
Set $\alpha = 0.9$.
Propagate the count distribution using a Markov transition matrix:
$p^- = \pi^-(\delta t) p^+$,
where $\pi(n, m)$ = The probability that a count of n could transition to a count of m over $\delta t$. Set the values of the Markov transition matrix to the identity.
In this manner, the group track state parameters are propagated to the time of the received dataframe to obtain propagated observation node positions.

Next, the propagated observation node positions are projected onto the field of regard of the dataframe in step S1003. First, project the propagated observation node positions onto the dataframe field of regard using location data. Note that the amplitude and amplitude extent will be projected after the centroid is updated in order to use a better slant range for projection of the amplitude data onto the dataframe field of regard. Project the mean and covariance of the centroid state by using the project function:

$Z^- = \text{Project}(X^-, \text{Sensor})$
$\Sigma_Z^- = H_{x2z} E_x^- H_{x2z}'$ where $H_{a2z}$ = The Jacobian of the Project Function that maps the centroid state vector into sensor measurement space. This Jacobian is 2×6 for IR and ballistic state, and 3×6 for RF and ballistic state.

Next, project the mean and degrees of freedom of the extent state. The extent state is in ECI. For RF, the location estimates can be converted to ECI so there is no need to project the extent state. Projection, however, is required for IR. The mean and covariance are projected using the following:

The extent state is in ECI. For RF, the location estimates can be converted to ECI so there is no need to project the extent state. Projection, though, is required for IR. For now, project the mean and covariance using the following:

$EZ^- = HEX^- H'$
$N_{EZ}^- = N_{EX}^-$

For RF, $H = I_{3 \times 3}$. For IR, extract the position projection part of the centroid projection matrix:

$H = H_{2 \times 3}$ submatrix of the centroid projection matrix, $H_{a2z}$.

Next, project the count distribution, using a Markov transition matrix:

$p_S^- = \pi_s p^-$ where the Markov transition matrix is defined as $\pi_s(n,m)$ = The probability that a count of n could appear as a count of m by sensor S Set the values of the Markov transition matrix to identity.

Accordingly, the propagated observable node positions are projected on the dataframe filed of regard.

Next, in step S1004, gates are generated for each of the propagated observable node positions, based on a covariance value of each propagated observable node position. The propagated tracks are traversed starting with Start Nodes that are the track nodes that are resolution roots and terminal leafs. For aggregate track nodes, child gates are calculated for the track children nodes, and for leaf nodes gates are calculated.

As mentioned above, in step S1005, feasible track node assignments are determined based on the proximity of the new observation nodes to the gates, and then the group track node state parameters are updated and the corresponding group track node scores are calculated. In this regard, the gates from step S1004 represent open nodes in the track node tree, and the track tree is traversed starting with the gates to determine track assignments for the new observable nodes. Each track node is analyzed to determine all feasible track node assignments for the new observable nodes (1 to N, where N is the number of new observation nodes.

The update of the group track parameters and the calculation of the group track scores (evidence) mentioned in step S1004 are now explained in more detail with respect to FIG. 11. In step S1101, after all feasible track node assignments are determined, the state parameters of all track nodes in the group track node are updated. Next, in step S1102, an updated (posterior) group location extent is determined based on location data of the measured objects from the dataframe, and also determine the new group location extent score (evidence).

The location extent depends upon whether the sensor measurements are from an IR sensor or an RF sensor. A direct update to the extent state can be made if the measurements are RF. However, if the measurements are IR, then an Expectation Measurement (EM) algorithm is executed to provide estimated parameters for the missing dimension. In this regard, the location extent posterior based on the radio frequency sensor location measurements is computed first. The track independent measurement quantities for computing the location extent posterior based on the radio frequency sensor location measurements are calculated as follows:

For RF, convert the location estimates to ECI. For IR, do nothing. Compute the following geometric properties of the measurements:

$$\hat{z}_c = \frac{1}{M} \sum_j \hat{z}_j$$

(Geometric Location Centroid)

$$\hat{A}_c = \frac{1}{M} \sum_j \hat{A}_j$$

(Geometric Amplitude Centroid, at the sensor)

$$EZ_c = \frac{1}{(M-1)} \sum_j (\hat{z}_j - \hat{z}_c)(\hat{z}_j - \hat{z}_c)'$$

(Geometric Location Extent)

$$EA_c = \frac{1}{(M-1)} \sum_j (\hat{A}_j - \hat{A}_c)(\hat{A}_j - \hat{A}_c)'$$

(Geometric Amplitude Extent)

Note that if the sensor measurements are from an RF sensor, then the location estimates are assumed to be in ECI.

The part of the new data that conditions the extent is defined as $$\hat{z}_E = [\hat{z}_c, \hat{A}_c, EZ_c, EA_c].$$

Then, the location extent posterior based on the radio frequency (RF) sensor location measurements is calculated as follows:

For RF, update the parameters of the extent posterior using the following:

$E^- = (N_{EZ}^-)EZ^-$ (Convert from extent to Wishart parameter.)

$$E^+ = E^- + M(EZ_c) + \frac{M(N_{EZ}^-)(\hat{z}_c - z^-)(\hat{z}_c - z^-)'}{M + (N_{EZ}^-)}$$

(Update to Wishart parameter.)

$N_{EX}^+ = N_{EX}^- + M$ (Update degrees of freedom.)

$$EX^+ = \frac{E^+}{N_{EX}^+}$$

(Convert back to extent.)
Note that $z^-$ in the update to the Wishart parameter is the projected centroid state converted to ECI.
Set the extent mean:
EX=EX$^+$,
and the projected extent mean:
EZ=HEXH$^1$.
Next, the location extent posterior based on the IR sensor location measurements is computed. First, the location extent parameters for determination of the location extent posterior based on the IR sensor location measurements are calculated as follows:

Initialize location extent parameters and projection/rotation matrices:
$E_0^-=(N_{EX}^-)EX^-$ (Predicted Location Wishart Parameter)
$N_{EZ}^-=(N_{EX}^-)$ (Predicted number of degrees of freedom.)
$PS_0^- = -99999.9$ (Initial Posterior Score)
$\Delta P_e^- = (Pos_e^- - SenPos_e)$ (Predicted Position in ECI Coordinates)
Range=$|\Delta P_e^-|$ (Range to the centroid)
$R_{e2s}$=Rotation Matrix from ECI to Sensor
$H_{e2z}$=Projection matrix from ECI to Sensor Coordinates Place the extent and relative position in sensor coordinates:
$E_{S0}^- = R_{e2s} E_0^- R_{e2s}'$ (Wishart Parameters in Sensor Coordinates
$z^- = R_{e2s} \Delta P_e^-$. (Relative Position in Sensor Coordinates)

Assume that the sensor coordinate system, has the following properties:
The X axis in Sensor Coordinates is normal to the sensor focal plane (X is the Unobservable direction)
The Y axis in Sensor Coordinates is in the Azimuth Direction.
The Z axis in Sensor Coordinates is in the Elevation Angle Direction.

With these conventions,
$(\hat{z}_j(1), \hat{z}_j(2))=(Az, El)$ of the jth observation.
Next the expectation (E) step is performed as follows:

$$EZ_{red} = \begin{bmatrix} EZ_{22} & EZ_{23} \\ EZ_{32} & EZ_{33} \end{bmatrix}$$

(Reduced Data Extent)

$$EZ_c = \begin{bmatrix} EZ_{11} & EZ_{12} & EZ_{13} \\ EZ_{21} & EZ_{22} & EZ_{23} \\ EZ_{31} & EZ_{32} & EZ_{33} \end{bmatrix}$$

(Complete Data Extent)
where the terms in the matrix are
$EZ_{12}=EZ_{21}=b_{21}EZ_{22}+b_{31}EZ_{23}$
$EZ_{13}=EZ_{31}=b_{21}EZ_{32}+b_{31}EZ_{33}$
$EZ_{11}=V_1$ $$EZ_{22} = \frac{1}{(M-1)} \sum_j (\text{Range } \hat{z}_j(1) - z^-(1))^2$$

$$EZ_{23} = EZ_{32} = \frac{1}{(M-1)} \sum_j (\text{Range } \hat{z}_j(1) - z^-(1))(\text{Range } \hat{z}_j(2) - z^-(2))$$

$$EZ_{33} = \frac{1}{(M-1)} \sum_j (\text{Range } \hat{z}_j(2) - z^-(2))^2$$

and the conditional weights are given by $$b_{21} = \frac{(S_{33}S_{21} - S_{23}S_{31})}{(S_{22}S_{33} - S_{23}^2)}$$

$$b_{31} = \frac{(S_{22}S_{31} - S_{23}S_{21})}{(S_{22}S_{33} - S_{23}^2)}$$

and the conditional variance is given by $$V_1 = S_{11} - \frac{(S_{33}S_{21}^2 - 2S_{23}S_{31}S_{21} + S_{22}S_{31}^2)}{(S_{22}S_{33} - S_{23}^2)}$$

and the covariance matrix is obtained from E:

$$S = \frac{(N_{EZ}^- + 1)}{N_{EZ}^- N_{EZ}^- - p - 1} E.$$

Compute the reduced and complete mean vector:

$$\hat{z}_{red} = \begin{bmatrix} \hat{z}_2 \\ \hat{z}_3 \end{bmatrix}$$

$$\hat{z}_c = \begin{bmatrix} \hat{z}_1 \\ \hat{z}_2 \\ \hat{z}_3 \end{bmatrix}$$

where the terms in the vector are
$\hat{z}_1 = z^-(1) + b_{21}(\hat{z}_2 - z^-(2)) + b_{31}(\hat{z}_3 - z^-(3))$ $$\hat{z}_2 = \frac{\text{Range}}{M} \sum_j \hat{z}_j(1)$$

$$\hat{z}_3 = \frac{\text{Range}}{M} \sum_j \hat{z}_j(2).$$

Next, perform the maximization (M) step as set forth below:

Compute the posterior extent as follows:

$$E_s^+ = E_s^- + M(EZ_c) + \frac{M(N_{EZ}^-)(\hat{z}_c - z^-)(\hat{z}_c - z^-)^t}{M + (N_{EZ}^-)}$$

(Update to Wishart parameter.)
$N_{EX}^+ = N_{EX}^- + M$ (Update degrees of freedom.)
Finally, perform termination of the EM algorithm as follows:
Compute the current posterior score $$PS = \frac{(N_{EX}^+ - p - 1)}{2} \log(|E_S^+|) - \frac{1}{2}tr(E_S^+ E_{SO}^-) - \frac{1}{2}tr(EZ_{red} E_{redSO}^+)$$

where
$E_{redSO}^+ = H_{e2s} E_{SO}^- H_{e2s}^t$.
Perform the termination test:
If $|PS - PS_0| \leq \epsilon$ then $$EX^+ = R_{e2s}^t \frac{E_s^+}{N_{EX}^+} R_{e2s}$$

(Convert back to extent and to ECI.)
$EZ_c = R_s EZ_c R_{e2s}$ (Convert back to extent and to ECI.)
Break.
Else
Continue to iterate.
Endif The location extent evidence (score) is calculated as set forth below:
$\alpha^- = N_{EX}^-$
$E^- = \alpha^- EX^-$
$\alpha^+ = N_{EX}^+$
$E^+ = \alpha^+ EX^+$
and compute $$P_{LowExt} = (2\pi)^{pM/2} \left(\frac{\alpha^-}{\alpha^+}\right)^{p/2} \frac{c(p, \alpha^-)|E^-|^{\alpha^-/2}}{c(p, \alpha^+)|E^+|^{\alpha^+/2}}$$

(Extent Evidence for Location)
Next, in step S1103 of FIG. 11, the updated (posterior) group location centroid is determined, and the corresponding group location centroid score (evidence) is calculated. First, the track dependent measurement quantities are calculated as follows according to either one of the two possible sets of equations:
Compute the following quantities:
$E_m = H_{e2t} EZ_c H_{e2z}' + E$ (Measurement Extent)
$E_t = EZ^- + E$ (Predicted Track Extent)

$$D' = \frac{2^{p/2}|EZ + E|^{1/2}}{|EZ + 2E|^{1/2}}$$

$$D' = \frac{2^{p/2}|E_t|^{1/2}}{|E_m + E_t|^{1/2}}$$

$$\tilde{D} = \frac{\pi^{p/2}|E|}{|\delta z||EZ + E|^{1/2}}$$

$$\tilde{D} = \frac{\pi^{p/2}|E_m|}{|\delta z||E_t|^{1/2}}$$

Next, the group location centroid update and the group location centroid score (evidence) are calculated by performing a Kalman Filter update using the following expressions (alternative expressions are provided for most expressions) for the relevant matrices:

Measurement Matrix
$H_{x2a} = H_{z2a} H_{x2z}$ (Jacobian of Projection from State Space to Amplitude Space)
$H_{x2z}$ = Jacobian of Projection from State to Measurement $$H_{z2a} = \frac{A_s^-}{2\hat{A}} [(\overline{EZ} + 2E)(\overline{EZ} + E)^{-1}]$$

(Jacobian of Projection from Measurement Space to Amplitude $$H_{z2a} = \frac{A_s^-}{2\hat{A}} [(E_m + E_t)(E_j)^{-1}]$$

(Jacobian of Projection from Measurement Space to Amplitude Space)
Innovation
$\Delta z = \hat{z} - z^-$ (Innovation)
where
$z^-$ (Projected Centroid State)

$$\hat{z} = \frac{\sum_{j=1}^{M} D' \hat{A}_j \hat{z}_j g(\hat{z}_j - z^-, \overline{EZ} + 2E)|\delta z|}{\hat{A}}$$

(Average measured location.)

$$\hat{z} = \frac{\sum_{j=1}^{M} D' \hat{A}_j g(\hat{z}_j - z^-, E_m + E_t)|\delta z|}{\hat{A}}$$

(Average measured location.)

$$\hat{A} = \sum_{j=1}^{M} D'\hat{A}_j g(\hat{z}_j - z^-, \overline{EZ} + 2E)|\delta z|$$

(Average measured amplitude.)

$$\hat{A} = \sum_{j=1}^{M} D'\hat{A}_j g(\hat{z}_j - z^-, E_m + E_t)|\delta z|$$

(Average measured amplitude.)
Measurement Covariance (in amplitude space)

$$R = \frac{(EZ/2 + E)(EZ + E)^{-1}(EZ/2 + E)}{\left[\frac{\bar{D}\hat{A}^2}{2\sigma^2}\right]}$$

$$R = \frac{(E_m + E_t)(E_t)^{-1}(E_m + E_t)}{\left[\frac{2\bar{D}\hat{A}^2}{\sigma^2}\right]}$$

Update Equations
$K = \Sigma_X^- H_{x2a}'(H_{x2a}\Sigma_Z^- H_{x2a}' + R)^{-1}$ (Gain Matrix)
$X^+ = X^- + K\Delta z$ (Centroid State Update)
$\Sigma_X^+ = (I - KH_{x2a})\Sigma_X^-$ (Centroid Covariance Update)
Note that under certain conditions, the update equations are independent of n.

In step S1104, the group track amplitude onto the dataframe field of regard. First, the group amplitude mean and covariance, at the sensor, is projected as set forth below:
For now, project the group amplitude using the following:
$A_S^- = A^-/R^q$
$\Sigma_{A_S}^- = \Sigma_A^-/R^{2q}$
where R=Updated Range to the Group.

Next, project the mean and degrees of freedom of the group amplitude, at the sensor, as follows:
For now, project the extent and degrees of freedom using the following:
$EA_S^- = EA^-/Range^{2q}$
$N_{EA_S}^- = N_{EA}^-$
where Range=Updated Range to the Group.

In step S1105, determine the group amplitude extent update (posterior) based on the projected amplitude data, as follows (alternative expressions are provided):
For both RF and IR, the amplitude extents are computed as follows:
$E^- = (N_{EA_S}^-)EA_S^-$ (convert from extent to Wishart parameter.)

$$E^+ = E^- + M(EA_c) + \frac{M(N_{EA_S}^-)(\hat{A}_c - A_S^-)(\hat{A}_c - A_S^-)'}{M + (N_{EA_S}^-)}$$

(Update to Wishart parameter.)
$N_{EA}^+ = N_{EA}^- + M$ (Update degrees of freedom.)

$$EA^+ = \frac{E^+}{N_{EA}^+} Range^{2q}$$

(Convert back to extent and back to the source.)
Set the extent mean:
$\overline{EA} = EA^+$
and the projected extent mean:
$\overline{EA_S} = EA/Range^{2q}$.
The group amplitude extent score (evidence) is calculated as follows:
For the amplitude extent, let
$\alpha^- = N_{EA}^-$
$E^- = \alpha^- EA^-$
$\alpha^+ = N_{EA}^+$
$E^+ = \alpha^+ EA^+$
and compute $$P_{AmpExt} = (2\pi)^{pM/2}\left(\frac{\alpha^-}{\alpha^+}\right)^{p/2} \frac{c(p, \alpha^-)|E^-|^{\alpha^-/2}}{c(p, \alpha^+)|E^+|^{\alpha^+/2}}$$

(Extent Evidence for Amplitude)
In step S1106, the group amplitude centroid and the group update (posterior) and the group amplitude centroid score (evidence) are computed using a Kalman filter using the following expressions for the relevant matrices (alternative expressions are provided):
Measurement Matrix
$H_{a2s} = 1/Range^q$ (Jacobean of projection from source to sensor, partial of sensor wrt source)
Innovation
$\Delta A = \hat{A} - A_S^-$ (Innovation)
where
$A_S^-$ (Projected Amplitude State)

$$\hat{A} = \sum_{j=1}^{M} D'\hat{A}_j g(\hat{z}_j - z^-, \overline{EZ} + 2E)|\delta z|$$

(Average measured amplitude.)

$$\hat{A} = \sum_{j=1}^{M} D'\hat{A}_j g(\hat{z}_j - z^-, E_m + E_t)|\delta z|$$

(Average measured amplitude.)
Measurement Covariance (in amplitude space)

$$R = \left[\frac{2\sigma^2}{\bar{D}\hat{A}^2}\right]$$

(Effective measurement covariance.)
Update Equations
$K = \Sigma_A^- H_{a2s}'(H_{a2s}\Sigma_A^- H_{a2s}' + R)^{-1}$ (Gain Matrix)
$A^+ = A^- + K\Delta A$ (Centroid Amplitude State Update)
$\Sigma_A^+ = (I - KH_{s2a})\Sigma_A^-$ (Centroid Amplitude Covariance Update)

In step S1107, the total group track extent is calculated based on the group location extent from step S1102 and the group amplitude extent from step S1105, and output as the group track extent. Similarly, in step S1108, the total group track centroid is calculated based on the group location centroid from step S1103 and the group amplitude centroid from step S1106, and output as the group track centroid. In step S1109, the total group extent evidence (score) is calculated based on the group location extent evidence from step S1102 and the group amplitude extent evidence from step S1105, as follows:

The total extent evidence is the product of the location extent evidence and the amplitude extent evidence:

$$P[\hat{z}_E | \vec{z}] = P_{LocExt} P_{AmpExt}$$

Next, In step S1110, the total group centroid evidence (score) is calculated based on the group location centroid evidence from step S1103 and the group amplitude centroid evidence from step S1106, as follows (note that two alternative expressions are provided for the C expression):

The total (extent plus centroid) evidence is computed using $$P[\hat{z}_x | \overline{E}, \hat{z}] = \frac{\exp^{-.5(\bullet)}}{|H_{22a} R^- H'_{22a} + R|^{1/2} sqrt\left(\frac{\sigma^2}{\tilde{D}} + \Sigma_{A_s}\right)}$$

where
(•)=A+B+C+D $$A = \frac{(\hat{A} - A_s^-)^2}{\left(\sigma^2 / \tilde{D} + \sum_{A_s}^-\right)}$$

('Usual' Amplitude Chisq)
$B = (\hat{z} - z^-)'(H_{z2a} R^- H_{z2a}' + R)^{-1} (\hat{z} - z^-)$ ('Usual' Location Chisq)

$$C = \left(\frac{\tilde{D}}{\sigma^2}\right) \left[\frac{|\overline{EZ} + E|^{1/2}}{|E|^{1/2}} \sum_{j=1}^{M} \hat{A}_j \hat{A}_j, g(\hat{z}_j - z^-, 2E)|\delta z| - \hat{A}^2\right]$$

C=0.0
$D = -(\hat{z} - z^-)' R^{-1} (\hat{z} - z^-)$

The process depicted in FIG. 11 then ends at step S1111. Based on the foregoing, the group track state parameters and associated scores are updated based on both location and amplitude data from the sensors, for a more accurate tracking of the observed objects associated with the track nodes under the group track.

Returning to FIG. 10, in step S1006, the feasible observation node assignments are determined, and then the group track state parameters and associated scores are updated. In this regard, the feasible observation node assignments are determined by traversing the observation nodes starting with the observation root nodes, and feasible assignments of each observation node to the track nodes are determined (M track nodes to 1 observation node). The update of the group track state parameters and associated scores is performed in the same manner as discussed above with respect to the steps shown in FIG. 11, and is therefore not repeated here.

Next, in step S1007, a multi-frame resolution algorithm is performed in an attempt to resolve group track nodes into subtrack nodes (children). In general, the multi-frame resolution algorithm of the present invention centers around an Expectation (E) Measurement (M) algorithm applied to a plurality of possible model starts corresponding to possible group track resolutions. FIG. 12 depicts the components of multi-frame resolution files 126, and includes MFRModel 401, OrderModel 402, Model 403, SubgroupModel 404, Dataframe 405, Measurement 406, Decomposed Measurement 407 and Hyperparameters 408. The elements of each of these components are shown in FIG. 12 and are further explained in Appendix I, which is attached to this specification and incorporated herein in its entirety for all purposes.

The process of the multi-frame resolution algorithm is further explained with respect to FIG. 13. In step S1301, the multi-frame resolution (MFR) parameters are set-up. Next, the next model order from the set of model orders is obtained in step S1302. For each model order, the model order parameters are set-up in step S1303. The next model start is obtained from the set of model starts corresponding to the current model order in step S1304. For the current model start, the model start parameters are set-up in step S1305, and then the EM algorithm is performed. Specifically, the Expectation (E) step is performed in step S1306 to compute decomposed measurement responsibilities. Next, the Maximization (M) step is performed in step S1307 to update hyperparameter estimates (posterior). In step S1308, an EM score for the EM iteration is calculated.

In step S1309, it is determined whether the EM algorithm has converged on a result for the current model start. If it has, process flow passes to step S1310 in which scoring and selection determination is performed for the current model start. If there is not convergence at step S1309, flow passes back to step s1306 in order to perform another iteration of the E and M steps for the current model start. After step S1310, it is determined in step S1311 whether there are any more model starts to process for the current model order. If there are, then process flow passes to step S1304 to obtain the next model start, and then repeat the model start processing steps. If there are no more model starts for the current model order at step S1311, then process flow passes to step S1312 in which scoring and selection determination is performed for the current model order. Flow then passes to step S1313 in which it is determined whether there are any more model orders to be processed for the multi-frame resolution algorithm. If there are more model orders, process flow passes to step S1302 in which the next model order is obtained, and the model order steps are repeated. If there are no more model orders to be processed, then the multi-frame resolution algorithm is complete, and any group tracks that have been resolved into one or more children subtracks are incorporated into the track node domain. Process flow then ends at step S1315. It should be noted that a more detailed implementation of the multi-frame resolution algorithm according to one embodiment of the invention is provided in Appendix I, which is attached to this specification and incorporated herein in its entirety for all purposes.

Returning to the top-level tracking method process steps in FIG. 10, all sets of feasible composite assignments are determined in step S1008 for each combined set of track node sets and observation node sets (e.g. one column of the assignment graph (AG)), based on the set of feasible track node assignments and their respective scores, and on the set of feasible observation node assignments and their respective scores. The update of the group track state parameters and associated scores is performed in the same manner as discussed above with respect to the steps shown in FIG. 11, and is therefore not repeated here. These feasible composite joint assignment scores are represented in C vector 290 of FIG. 9.

In step S1009, a set of feasible joint assignments is determined based on the set of feasible composite assignments and their respective scores and based on a feasible loss minimization algorithm subject to feasible resource constraints. These feasible joint assignments are indicated in Z vector 280 of FIG. 9. Next, in step S1010, a selected set of joint assignments are determined from the set of feasible joint assignments and their respective scores, and based on a selection loss minimization algorithm subject to selection resource constraints. These selected joint assignments are also indicated in Z vector 280 of FIG. 9. The determination of the feasible joint assignments and of the selected joint assignments is further explained below.

The following section describes the logic for deciding which feasible joint assignments are selected and which should be pruned. The logic is based on the computation of Free Energy and attempts to find the subset of joint hypotheses that minimize the free energy. Free Energy, in this context, also corresponds to Bayesian Decision Loss. A joint hypothesis is a collection of assignments that satisfy the assignment constraints. Let Zα be the indicator function for the joint hypothesis, that is, Zα=Indicator Function for Hypothesis a
$z_\alpha$=Indicator Function for Hypothesis α

$$z_\alpha(j) = \begin{cases} 1 & \text{If Assignment } A_j \text{ is contained is } \alpha \\ 0 & \text{If Assignment } A_j \text{ is not contained in } \alpha \end{cases}$$

Each assignment, Aj, is a hyperarc with a loglikelihood score:
Aj=Assignment={Predj,Succj,Obsj}
Predj=Predecessor Tracks in Aj
Succj=Successor Tracks in Aj
Obsj=Observations in Aj
cj=LogLikelihood of Assignment Aj
The joint assignment problem is to determine the set of joint assignments that satisfy the assignment criterion:
$a_0$=Best Set of Joint Assignments based on the Assignment Criteria={$z_\alpha$:$Az_\alpha$=B and c'$z_\alpha$ satisfies the Assignment Criteria}
Best Joint Assignment=arg max c'∈∋Az=B
where
A=[$A_1$ $A_2$ ... $A_N$]=Constrain Matrix.

$$A_1 = \begin{cases} 1 & \text{If Track Mapped to Row, is in Pred}_j \\ 1 & \text{If Observation Mapped to Row, is in Pred}_j \\ -1 & \text{If Track Mapped to Row, is in Succ}_j \\ 0 & \text{Otherwise} \end{cases}$$

$$B_1 = \begin{cases} 1 & \text{If Object Mapped to Row, is Unconditional} \\ 0 & \text{If Object Mapped to Row, is Conditional} \end{cases}$$

The determination of feasible joint assignments and the selection of the best joint assignments finds the best subset of hypotheses based on a minimum loss or min free energy criteria:

min Loss(a0,a1|$\vec{z}$,z)

where
a1=Selected Set of Joint Hypotheses ⊆ a0
The Loss is defined as

Loss(a0,a1|$\vec{z}$,z)=Loss given that the true hypothesis is in a0 but we decide a1
and is equal to the posterior expected loss:

Loss(a0,a1|$\vec{z}$,z)=$G_1$=$U_1$−$TH_1$+$PV_1$ (Posterior Expected loss of a1=Free Energy of a1).
where $$U_1 = -\sum_{\alpha \subset a1} c_\alpha p(\alpha | \vec{z}, z, a1)$$

(Energy of a1)

$$H_1 = -\sum_{\alpha \subset a1} \ln(p(\alpha | \vec{z}, z, a1)) p(\alpha | \vec{z}, z, a1)$$

(Entropy of a1)
$V_1$=−ln(Q(a1)) (Effective Volume a1)
and $$Q(a0) = \sum_{\alpha \in a0} \exp(c_\alpha)$$

(Partition Function of a0)

$$Q(a1) = \sum_{\alpha \in a1} \exp(c_\alpha)$$

(Partition Function of a1)

$$c_\alpha = \sum_j z_\alpha(j) c(j)$$

(Log Likelihood of Joint Hypothesis α)
The processing for determining the selected set of best joint assignments is as follows:
Inputs:
A0={(α, $z_\alpha$, $c_\alpha$), $z_\alpha$=Indicator, $c_\alpha$=LogLikelihood} (Initial Hypothesis Set)
T=Temperature
P=Pressure
Outputs:
α1={(α, $z_\alpha$, $c_\alpha$), $z_\alpha$=Indicator, $c_\alpha$=LogLikelihood} (Final Hypothesis Set)
The process steps are described in the processing hierarchy set forth below:
 1. Compute Posterior Probabilities for a0: p(α|$\vec{z}$,z,α0)
  1.1. Compute Partition Function of a0:

$$Q(a0) = \sum_{\alpha \in a0} \exp(c_\alpha)$$

1.2. Compute Posterior Probabilities: p(α|$\vec{z}$,z,α0)=exp($c_\alpha$)/Q(a0)

2. Compute Posterior Expected Loss of a0 wrt a0: G0=Loss
$(a0, a0 | \vec{z}, z) = U_0 - TH_0 + PV_0$
3. Set a1=a0; G1=G0.
4. Loop over a0 in reverse order of score
    4.1. Let α be the next highest scoring joint hypothesis
    4.2. Set a2=a1\α
    4.3. Compute Posterior Probabilities for a2: $p(\alpha | \vec{z}, z, a2)$
        4.3.1 Compute Partition Function of a2:

$$Q(a2) = \sum_{a \in a2} \exp(c_a)$$

4.3.2. Compute Posterior Probabilities of a2: $p(\alpha | \vec{z}, z, a2) = \exp(c_a)/Q(a2)$
    4.4. Compute Posterior Expected Loss of a1 wrt a2:
$G_2 = Loss(a1, a2 | \vec{z}, z) = U_2 - TH_2 + PV_2$
    4.5. Compute Loss Delta (Free Energy Change): $\Delta(a1, a2) = G_2 - G_1$
    4.6. If Loss Delta is positive, Return a1
    4.7. If Loss Delta is negative
        4.7.1. Set a1=a; $G_1 = G_2$ In this manner, the best set of joint assignments is selected in the Assignment Graph (AG). In step S1011, non-selected feasible joint assignments are eliminated from the track domain of the Assignment Graph, and in step S1012, track nodes with below marginal scores are pruned from the track domain of the Assignment Graph. In particular, for the pruning process, marginal scores are identified for certain track nodes in the AG. These correspond to track nodes that are also unconditional constraints, i.e., have Bi=and the track nodes in this set are new track nodes or track nodes that are at the beginning of the AG. In general, new track nodes have a lower probability score (evidence) than that of a track node corresponding to a continuing track segment. A Minimum Loss prune decision logic is executed on these identified track nodes. Tracks not selected are pruned and the AG is updated. Process flow of the tracking algorithm then ends at step S1013.

FIG. 14 depicts the tracking of a ballistic missile during the release of clusters of objects. As seen in FIG. 14, a general ballistic trajectory track 355 is shown for the ballistic missile, and release points 351, 352 and 353 represent points during the ballistic trajectory that the missile releases a cluster of objects. After each release point, it can be seen that the released cluster of objects is tracked as a group of tracks having an overall trajectory which departs from the ballistic trajectory of the missile, and then resolved into multiple tracks by the multi-frame resolution algorithm of the present invention. The resolution of group tracks becomes more distinct as the racked objects separate from each other during their trajectory. FIG. 15 depicts the spawning of new tracks and the pruning of tracks during tracking of a ballistic missile. As seen in FIG. 15, spawned tracks at points 362 and 364 depict new tracks which are children tracks of a previous track, where each spawned track is now resolved to be assigned to an observation node that used to be assigned to the previous track. Prune points 361 and 363 depict points at which previous tracks no longer become viable, such as when they have been resolved into more specific tracks by the multi-frame resolution algorithm of the present invention (e.g. spawns).

Accordingly, the arrangement of the present invention results in a system and method for tracking groups of objects in a coordinated fashion by maintaining estimates of state parameters for each group, the group state parameters being used to determine a set of joint assignments for all measured observables to tracks, and for all relationships among tracks. In addition, the present invention uses the signal strength of each measured object, in addition to location information, to estimate the state parameters of the group track, thereby making full use of the resolution capabilities of the detection sensors. The multi-frame resolution capability of the invention provides a further level of tracking resolution by constantly attempting to resolve group tracks into viable sub-tracks for more refined tracking of individual objects. The foregoing features of the present invention result in a more accurate tracking system which more quickly and accurately resolves the tracking of objects which are clustered in groups.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A system for performing random-set based cluster tracking of observable objects, the system comprising:

a plurality of detection sensor devices, each of which generates a series of dataframes, each dataframe containing a timestamp and containing location data and amplitude data corresponding to each detected observable object in the dataframe;

a tracking processor unit which receives dataframes from one or more of the detection sensor devices, the tracking processor unit including a memory and at least one processing unit, the memory storing scene nodes, track nodes and observation nodes, and also storing program steps for execution by the processing unit, the program steps including:

an observation node generation step of generating a new observation node for each observable object location data contained in a received dataframe;

a propagating step of propagating forward, to a time value of the timestamp, a set of state parameters of a group track node to obtain a set of posterior observable positions, a plurality of previously-generated track nodes being assigned to the group track node;

a projecting step of projecting the posterior observable positions onto a field of regard of the received dataframe;

a gate generation step of generating a gate for each posterior observable position and projecting each gate over each respective posterior observable position on the received dataframe;

a feasible track assignment step of determining a set of feasible track assignments for the dataframe which correlate each one of a plurality of new track nodes to at least one of the new observation nodes based on the proximity of each new observation node to at least one of the gates over the posterior observable positions, updating a set of state parameters for each track node assigned to the group track node based on the determined set of feasible track assignments, and generating a probability score for the feasible track assignments;

a feasible observation assignment step of determining a set of feasible observation assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments;

a feasible composite assignment step of determining a set of feasible composite assignments for a composite set of track nodes and observation nodes which correspond to at least the received dataframe, updating a set of state parameters for each track node assigned to the group track node based on the determined set of feasible composite assignments, and generating a probability score for each feasible composite assignment based on the probability scores for the feasible track assignments and the feasible observation assignments corresponding to the track nodes and observation nodes in the composite set; and a joint assignment determination step of determining a set of joint assignments based on the set of feasible composite assignments and their respective probability scores by using a loss minimization algorithm and a set of constraints, the selected set of joint assignments including at least one of the feasible composite assignments.

2. A system according to claim 1, further comprising:
a multi-frame resolution step of analyzing all group track nodes and resolving one or more of the group track nodes into one or more new track nodes, based on a set of group track parameters for each group track node, the parameters including a group track history, a group track probability score and a number of observation nodes assigned to the group track node.

3. A system according to claim 1, further comprising:
a pruning step of pruning all track nodes by deleting selected track nodes, the selection being based on whether the probability score of each track node is below a predetermined marginal score and on the application of a loss minimization algorithm to each track node.

4. A system according to claim 1, wherein, in the feasibility track assignment step, the feasibility observation assignment step and the feasibility composite assignment step, the update of the state parameters for all track nodes assigned to the group track node, and the generation of a probability score, include:
a track node update step of updating the state parameters of each track node assigned to the group track node;
a group track extent update step of determining an updated value of an extent for the group track node based on the location data corresponding to each observable object in the received dataframe and on a sensor resolution in the received dataframe;
a group track centroid update step of determining an updated value of a centroid for the group track node based on the location data corresponding to each observable object in the received dataframe and on a sensor resolution in the received dataframe;
a group track extend scoring step of determining an extent probabilty score for the group track node based on the group track extent; and
a group track centroid scoring step of determining a centroid probability score for the group track node based on the group track centroid.

5. A system according to claim 4, wherein the group track extent update step further includes:
a group location extent update step of determining an updated value of a location extent for the group track node based on the location data corresponding to each observable object in the received dataframe;
a group amplitude extent update step of determining an updated value of an amplitude extent for the group track node based on the amplitude data corresponding to each observable object in the received dataframe; and
a group track extent calculation step of calculating the group track extent based on the group location extent and the group amplitude extent, using separate weight factors for the group location extent and the group amplitude extent, respectively.

6. A system according to claim 5, wherein the group track extent scoring step further includes:
a group track location extent scoring step of determining a group location extent probability score for the group track node based on the group track location extent;
a group track amplitude extent scoring step of determining a group amplitude extent probability score for the group track node based on the group track amplitude extent; and
a group extent score calculation step of calculating the group extent probability score based on the group location extent probability score and the group amplitude extent probability, using separate weight factors for the group location extent probability score and the group amplitude extent probability score, respectively.

7. A system according to claim 4, wherein the group track centroid update step further includes:
a group location centroid update step of determining an updated value of a location centroid for the group track node based on the location data corresponding to each observable object in the received dataframe;
a group amplitude centroid update step of determining an updated value of an amplitude centroid for the group track node based on the amplitude data corresponding to each observable object in the received dataframe; and
a group track centroid calculation step of calculating the group track centroid based on the group location centroid and the group amplitude centroid, using separate weight factors for the group location centroid and the group amplitude centroid, respectively.

8. A system according to claim 7, wherein the group track centroid scoring step further includes:
a group track location centroid scoring step of determining a group location centroid probability score for the group track node based on the group track location centroid;
a group track amplitude centroid scoring step of determining a group amplitude centroid probability score for the group track node based on the group track amplitude centroid; and
a group centroid score calculation step of calculating the group centroid probability score based on the group location centroid probability score and the group amplitude centroid probability, using separate weight factors for the group location centroid probability score and the group amplitude centroid probability score, respectively.

9. A system according to claim 1, wherein the joint assignment determination step of determining a set of joint assignments further includes:
a feasible joint assignment determination step of determining a set of feasible joint assignments based on the set of feasible composite assignments and on the probability scores for the feasible composite assignments, the determination based on a posterior feasibility loss minimization algorithm subject to a set of feasibility resource constraints;
a joint assignment selection step of selecting a set of joint assignments from the set of feasible joint assignments based on a selection loss minimization algorithm subject to a set of selection resource constraints; and an elimination step of eliminating each feasible joint assignment that was not selected in the joint assignment selection step.

10. A system according to claim 1, wherein the plurality of detection sensor devices are respectively mounted on a plurality of platforms.

11. A system according to claim 10, wherein the plurality of platforms are a plurality of satellites, each of which is positioned in an earth orbit.

12. A system according to claim 10, wherein at least two detection sensors are included in each detection sensor device.

13. A system according to claim 12, wherein the at least two detection sensors include an infrared (IR) detection sensor and a radio frequency (RF) detection sensor.

14. A system according to claim 1, wherein, in the projecting step, the posterior observable positions are transformed from an earth-based coordinate system to a sensor-based coordinate system that corresponds to the detection sensor which generated the received dataframe.

15. A system according to claim 1, wherein, in the gate generation step, the generation of each gate is based on a covariance value of the respective posterior observable position.

16. A system according to claim 1, wherein the tracking processor unit comprises a plurality of processors.

17. A system according to claim 1, wherein the plurality of processors are distributed over a plurality of platforms.

18. A method for performing random-set based cluster tracking of observable objects in a system having a plurality of detection sensor devices, each of which generates a series of dataframes, and a tracking processor unit which receives dataframes from one or more of the detection sensor devices, the method comprising:

a receiving step of receiving a dataframe from one of the detection sensor devices, the dataframe including a timestamp, and location data and amplitude data corresponding to each detected observable object in the dataframe;

an observation node generation step of generating a new observation node for each observable object location data contained in the received dataframe;

a propagating step of propagating forward, to a time value of the timestamp, a set of state parameters of a group track node to obtain a set of posterior observable positions, a plurality of previously-generated track nodes being assigned to the group track node;

a projecting step of projecting the posterior observable positions onto a field of regard of the received dataframe;

a gate generation step of generating a gate for each posterior observable position and projecting each gate over each respective posterior observable position on the received dataframe;

a feasible track assignment step of determining a set of feasible track assignments for the dataframe which correlate each one of a plurality of new track nodes to at least one of the new observation nodes based on the proximity of each new observation node to at least one of the gates over the posterior observable positions, updating a set of state parameters for each track node assigned to the group track node based on the determined set of feasible track assignments, and generating a probability score for the feasible track assignments;

a feasible observation assignment step of determining a set of feasible observaiton assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments;

a feasible composite assignment step of determining a set of feasible composite assignments for a composite set of track nodes and observation nodes which correspond to at least the received dataframe, updating a set of state parameters for each track node assigned to the group track node based on the determined set of feasible composite assignments, and generating a probability score for each feasible composite assignment based on the probability scores for the feasible track assignments and the feasible observation assignments corresponding to the track nodes and observation nodes in the composite set; and a joint assignment determination step of determining a set of joint assignments based on the set of feasible composite assignments and their respective probability scores by using a loss minimization algorithm and a set of constraints, the selected set of joint assignments including at least one of the feasible composite assignments.

19. A method according to claim 18, further comprising:

a multi-frame resolution step of analyzing all group track nodes and resolving one or more of the group track nodes into one or more new track nodes, based on a set of group track parameters for each group track node, the parameters including a group track history, a group track probability score and a number of observation nodes assigned to the group track node.

20. A method according to claim 18, further comprising:

a pruning step of pruning all track nodes by deleting selected track nodes, the selection being based on whether the probability score of each track node is below a predetermined marginal score and on the application of a minimum loss algorithm to each track node.

21. A method according to claim 18, wherein, in the feasibility track assignment step, the feasible observation assignment step and the feasibility composite assignment step, the update of the state parameters for all track nodes assigned to the group track node, and the generation of a probability score, include:

a track node update step of updating the state parameters of each track node assigned to the group track node;

a group track extent update step of determining an updated value of an extent for the group track node based on the location data corresponding to each observable object in the received dataframe and on a sensor resolution in the received dataframe;

a group track centroid update step of determining an updated value of a centroid for the group track node based on the location data corresponding to each observable object in the received dataframe and on a sensor resolution in the received dataframe;

a group track extent scoring step of determining an extent probability score for the group track node based on the group track extent; and a group track centroid scoring step of determining a centroid probability score for the group track node based on the group track centroid.

22. A method according to claim 21, wherein the group track extent update step further includes:

a group location extent update step of determining an updated value of a location extent for the group track node based on the location data corresponding to each observable object in the received dataframe;

a group amplitude extent update step of determining an updated value of an amplitude extent for the group track node based on the amplitude data corresponding to each observable object in the received dataframe; and a group track extent calculation step of calculating the group track extent based on the group location extent and the group amplitude extent, using separate weight factors for the group location extent and the group amplitude extent, respectively.

23. A method according to claim 22, wherein the group track extent scoring step further includes:

a group track location extent scoring step of determining a group location extent probability score for the group track node based on the group track location extent;

a group track amplitude extent scoring step of determining a group amplitude extent probability score for the group track node based on the group track amplitude extent; and a group extent score calculation step of calculating the group extent probability score based on the group location extent probability score and the group amplitude extent probability, using separate weight factors for the group location extent probability score and the group amplitude extent probability score, respectively.

24. A method according to claim 21, wherein the group track centroid update step further includes:

a group location centroid update step of determining an updated value of a location centroid for the group track node based on the location data corresponding to each observable object in the received dataframe;

a group amplitude centroid update step of determining an updated value of an amplitude centroid for the group track node based on the amplitude data corresponding to each observable object in the received dataframe; and a group track centroid calculation step of calculating the group track centroid based on the group location centroid and the group amplitude centroid, using separate weight factors for the group location centroid and the group amplitude centroid, respectively.

25. A method according to claim 24, wherein the group track centroid scoring step further includes:

a group track location centroid scoring step of determining a group location centroid probability score for the group track node based on the group track location centroid;

a group track amplitude centroid scoring step of determining a group amplitude centroid probability score for the group track node based on the group track amplitude centroid; and a group centroid score calculation step of calculating the group centroid probability score based on the group location centroid probability score and the group amplitude centroid probability, using separate weight factors for the group location centroid probability score and the group amplitude centroid probability score, respectively.

26. A method according to claim 18, wherein the joint assignment determination step of determining a set of joint assignments further includes:

a feasible joint assignment determination step of determining a set of feasible joint assignments based on the set of feasible composite assignments and on the probability scores for the feasible composite assignments, the determination based on a posterior feasibility loss minimization algorithm subject to a set of feasibility resource constraints;

a joint assignment selection step of selecting a set of joint assignments from the set of feasible joint assignments based on a selection loss minimization algorithm subject to a set of selection resource constraints; and an elimination step of eliminating each feasible joint assignment that was not selected in the joint assignment selection step.

27. A method according to claim 18, wherein the plurality of detection sensor devices are respectively mounted on a plurality of platforms.

28. A method according to claim 27, wherein the plurality of platforms are a plurality of satellites, each of which is positioned in an earth orbit.

29. A method according to claim 27, wherein at least two detection sensors are included in each detection sensor device.

30. A method according to claim 29, wherein the at least two detection sensors include an infrared (IR) detection sensor and a radio frequency (RF) detection sensor.

31. A method according to claim 18, wherein, in the projecting step, the posterior observable positions are transformed from an earth-based coordinate system to a sensor-based coordinate system that corresponds to the detection sensor which generated the received dataframe.

32. A method according to claim 18, wherein, in the gate generation step, the generation of each gate is based on a covariance value of the respective posterior observable position.

33. A method according to claim 18, wherein the tracking processor unit comprises a plurality of processors.

34. A method according to claim 33, wherein the plurality of processors are distributed over a plurality of platforms.

35. A system for performing random-set based cluster tracking of observable objects, the system comprising:

a plurality of detection sensor means, each sensor means for generating a series of dataframes;

tracking processor means which receives dataframes from one or more of the detection sensor devices;

receiving means for receiving a dataframe from one of the detection sensor devices, the dataframe including a timestamp, and location data and amplitude data corresponding to each detected observable object in the dataframe;

observation node generation means for generating a new observation node for each observable object location data contained in the received dataframe;

propagating means for propagating forward, to a time value of the timestamp, a set of state parameters of a group track node to obtain a set of posterior observable positions, a plurality of previously-generated track nodes being assigned to the group track node;

projecting means for projecting the posterior observable positions onto a field of regard of the received dataframe;

gate generation means for generating a gate for each posterior observable position and projecting each gate over each respective posterior observable position on the received dataframe;

feasible track assignment means for determining a set of feasible track assignments for the dataframe which correlate each one of a plurality of new track nodes to at least one of the new observation nodes based on the proximity of each new observation node to at least one of the gates over the posterior observable positions, updating a set of state parameters for each track node assigned to the group track node based on the determined set of feasible track assignments, and generating a probability score for the feasible track assignments;

feasible observation assignment means for determining a set of feasible observation assignments for the dataframe which correlate each new observation node to at least one new track node based on the proximity of each new observation node to at least one of the gates over the posterior observable positions, updating a set of state parameters for each track node assigned to the group track node based on the determined set of feasible observation assignments, and generating a probability score for the feasible observation assignments;

feasible composite assignment means for determining a set of feasible composite assignments for a composite set of track nodes and observation nodes which correspond to at least the received dataframe, updating a set of state parameters for each track node assigned to the group track node based on the determined set of feasible composite assignments, and generating a probability score for each feasible composite assignment based on the probability scores for the feasible track assignments and the feasible observation assignments corresponding to the track nodes and observation nodes in the composite set; and joint assignment determination means for determining a set of joint assignments based on the set of feasible composite assignments and their respective probability scores by using a loss minimization algorithm and a set of constraints, the selected set of joint assignments including at least one of the feasible composite assignments.

* * * * *